United States Patent
Nagai et al.

(10) Patent No.: US 9,110,243 B2
(45) Date of Patent: Aug. 18, 2015

(54) LAMINATE FILM, OPTICALLY COMPENSATORY FILM, POLARIZING PLATE, AND LIQUID CRYSTAL DISPLAY DEVICE

(75) Inventors: Michio Nagai, Kanagawa (JP); Shigeaki Nimura, Kanagawa (JP); Ryo Nakamura, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 739 days.

(21) Appl. No.: 13/431,640

(22) Filed: Mar. 27, 2012

(65) Prior Publication Data

US 2012/0251781 A1 Oct. 4, 2012

(30) Foreign Application Priority Data

Mar. 31, 2011 (JP) ................... 2011-078203
Oct. 31, 2011 (JP) ................... 2011-238233
Mar. 15, 2012 (JP) ................... 2012-058462

(51) Int. Cl.
*B32B 3/00* (2006.01)
*G02B 5/30* (2006.01)

(52) U.S. Cl.
CPC ....... *G02B 5/3033* (2013.01); *Y10T 428/24479* (2015.01)

(58) Field of Classification Search
CPC ................................ B32B 3/00; G02B 5/3033
USPC ............ 428/1.1, 1.3, 1.31, 1.5, 156, 161, 172
See application file for complete search history.

(56) References Cited

U.S. PATENT DOCUMENTS

| | | | |
|---|---|---|---|
| 7,247,358 B2 * | 7/2007 | Hashimoto et al. | 428/1.54 |
| 8,488,241 B2 * | 7/2013 | Watanabe et al. | 359/488.01 |
| 2008/0247045 A1 * | 10/2008 | Suzuki et al. | 359/601 |
| 2010/0028554 A1 * | 2/2010 | Ogawa et al. | 427/487 |
| 2010/0055356 A1 | 3/2010 | Takeda et al. | |

FOREIGN PATENT DOCUMENTS

JP  2010-058331 A  3/2010
WO  WO 2010005065 A1 * 1/2010

* cited by examiner

*Primary Examiner* — Catherine A Simone
(74) *Attorney, Agent, or Firm* — Jean C. Edwards, Esq.; Edwards Neils PLLC

(57) ABSTRACT

Disclosed is a laminate film comprising an inner layer formed of a composition comprising a polymer material as a main component and an outer layer formed of a composition comprising a polymer material as a main component and laminated on at least one surface of the inner layer, wherein a film thickness of the outer layer differs depending upon a position in the width direction of the laminate film.

14 Claims, 1 Drawing Sheet

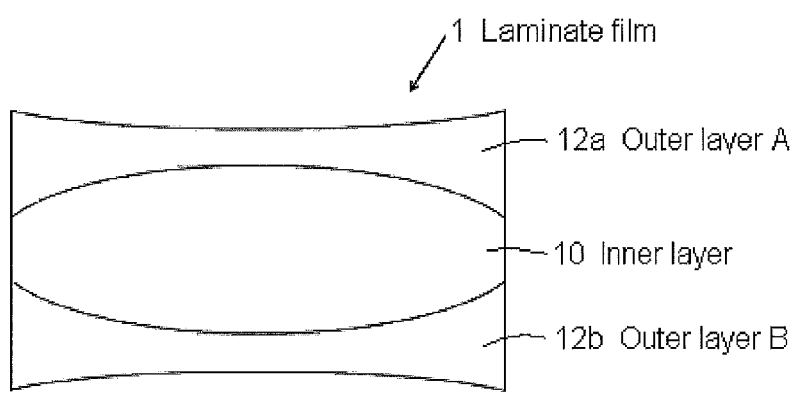

LAMINATE FILM, OPTICALLY COMPENSATORY FILM, POLARIZING PLATE, AND LIQUID CRYSTAL DISPLAY DEVICE

CROSS-REFERENCE TO RELATED APPLICATIONS

The present application claims the benefit of priority from Japanese Patent Application No. 2011-078203, filed on Mar. 31, 2011, Japanese Patent Application No. 2011-238233, filed on Oct. 31, 2011, and Japanese Patent Application No. 2012-058462, filed on Mar. 15, 2012, the contents of which are herein incorporated by reference in their entirety.

BACKGROUND OF THE INVENTION

1. Field of the Invention

The present invention relates to a laminate film having good winding suitability and high uniformity of optical properties and to an optically compensatory film, a polarizing plate, and a liquid crystal display device each having the same.

2. Background Art

Patent Document 1 discloses a cellulose acylate laminate film in which an outer layer containing a prescribed cellulose acylate and an inner layer containing a prescribed cellulose acylate are laminated. A laminate film in which an outer layer is laminated on an inner layer, as disclosed in JP-A-2010-58331, is useful for various optical films, for example, various optical films used for liquid crystal display device, in view of the fact that optical properties which cannot be achieved by only an inner layer can be achieved.

Now, in general, a longitudinal film to be continuously manufactured is wound up in a roll form for the purpose of storage, conveyance, etc. But, when a film having a uniform film thickness is wound up in a roll form, there may be the case where fine scratches are produced on the surface of the film due to tightness of winding. When used for various applications, there may be the case where such a scratch becomes a fault to cause a reduction of the performance. For example, though an optically compensatory film formed of a support film having thereon an optically anisotropic layer having alignment of a liquid crystal composition immobilized thereto has hitherto been used for liquid crystal display devices, there may be the case where if a film having a fine scratch on the surface thereof is used as the support film of the optically compensatory film, the alignment of the liquid crystal composition to be coated on the surface is affected, and the scratch portion becomes a luminescent spot, thereby reducing the display performance of the liquid crystal display device.

Then, as for the continuously produced film, in order to suppress the tightness of winding, in general, it is performed to make the thickness of the both end parts thicker than that in the central part in the width direction. But, in the foregoing laminate film in which an outer layer is laminated on an inner layer, in general, the inner layer and the outer layer are different from each other with respect to a formulation of the raw material composition. Since the difference in a formulation of the raw material composition affects optical properties of the film, a difference of the thickness in the film width direction brings ununiformity of the optical properties in the film width direction. Since in the both end parts, the thickness is thick, a concentration of additives is high. The higher the concentration of additives, the lower the elastic modulus is. Therefore, for example, when a stretching treatment is applied for the purpose of revealing optical properties, the end parts tend to be more stretched, and the ununiformity of optical properties in the width direction becomes larger depending upon a difference in degree of stretching.

SUMMARY OF THE INVENTION

In view of the foregoing various problems, the present invention has been made, and the invention is aimed to provide a laminate film which is improved in ununiformity of optical properties in the width direction without impairing winding suitability and also to provide an optically compensatory film, a polarizing plate, and a liquid crystal display device each using the same.

<1> A laminate film comprising:
  an inner layer formed of a composition comprising a polymer material as a main component and
  an outer layer formed of a composition comprising a polymer material as a main component and laminated on at least one surface of the inner layer, wherein
  a film thickness of the outer layer differs depending upon a position in the width direction of the laminate film.

<2> The laminate film according to <1>, wherein a total film thickness expressed by a total sum of a film thickness of the inner layer and a film thickness of the outer layer differs depending upon a position in the width direction of the laminate film.

<3> The laminate film according to <1> or <2>, wherein the total thickness of both end parts in the width direction is thick, and the total thickness in a central part is thin.

<4> The laminate film according to any one of <1> to <3>, wherein at least one of the inner layer and the outer layer comprises at least one additive.

<5> The laminate film according to <4>, wherein the at least one additive is an aromatic group-containing oligomer.

<6> The laminate film according to <5>, wherein the at least one additive is an ultraviolet ray absorber having an absorption maximum at from 250 to 400 nm.

<7> The laminate film according to any one of <1> to <6>, wherein each of the inner layer and the outer layer comprises at least one additive, and the at least one additive in the inner layer and the at least one additive in the outer layer are different from each other in at least one of a kind and a concentration.

<8> The laminate film according to any one of <1> to <7>, wherein the polymer material is a cellulose acylate.

<9> The laminate film according to any one of <1> to <7>, wherein the polymer material is a norbornene base polymer.

<10> The laminate film according to any one of <1> to <9>, wherein the laminate film is longitudinal, and a molecule of the polymer material is aligned in a direction orthogonal to the longitudinal direction.

<11> The laminate film according to any one of <1> to <10>, wherein a variation in the width direction of at least one of retardation in plane Re and retardation along the thickness direction Rth is not more than 10 nm.

<12> An optically compensatory film comprising the laminate film according to any one of <1> to <11> and an optically anisotropic layer formed of a composition comprising a polymerizable liquid crystal compound.

<13> A polarizing plate comprising at least a polarizer and the laminate film according to any one of <1> to <11> or an optically compensatory film according to <12>.

<14> A liquid crystal display device comprising at least the polarizing plate according to <13>.

<15> The liquid crystal display device according to <14>, which is of a TN mode.

According to the present invention, a laminate film which is improved in ununiformity of optical properties in the width direction without impairing winding suitability and also an optically compensatory film, a polarizing plate, and a liquid crystal display device each using the same, can be provided.

BRIEF DESCRIPTION OF THE DRAWINGS

FIG. 1 is a cross-sectional schematic view of an example of a laminate film of the present invention.

EXPLANATIONS OF LETTERS OR NUMERALS

1: Laminate film
10: Inner layer
12a, 12b: Outer layer

DETAILED DESCRIPTION OF THE INVENTION

The present invention is hereunder described in detail by reference to embodiments. Incidentally, in this specification, a numerical range expressed by the terms "a number to another number" means a range falling between the former number indicating a lower limit value of the range and the latter number indicating an upper limit value thereof.

Also, in this specification, a "retardation regulator" as referred to herein means a compound capable of enhancing or reducing at least one of retardation in plane of a film (hereinafter also referred to as "Re") and retardation along the thickness direction of a film (hereinafter also referred to as "Rth"). Also, a "retardation enhancer" as referred to herein means a compound capable of enhancing at least one of Re and Rth, and a "retardation reducer" as referred to herein means a compound capable of reducing at least one of Re and Rth.

Also, in this specification, an "inner layer" as referred to herein means a layer having the thickest film thickness, and an "outer layer" as referred to herein means a layer having a film thickness thinner than that of the inner layer and contacting with the inner layer.

Also, in this specification and drawing, the case of referring to the "outer layer" refers to both an "outer layer A" and an "outer layer B". Incidentally, the "outer layer A" is sometimes referred to as an "air layer", and the "outer layer B" is sometimes referred to as a "support surface layer". Furthermore, the "inner layer" is sometimes referred to as a "basic layer".

1. Laminate Film:

The invention relates to a laminate film comprising an inner layer formed of a composition containing a polymer material as a main component and an outer layer formed of a composition containing a polymer material as a main component and laminated on at least one surface of the inner layer, wherein a film thickness of the outer layer differs depending upon a position in the width direction of the laminate film.

It is advantageous that the outer layer is laminated on the inner layer by means co-casting or the like in terms of the fact that optical properties or manufacturing suitability which cannot be achieved by only the inner layer can be achieved. For example, in the case where a composition to be used for forming the inner layer has low properties of stripping from a support, the stripping properties can be improved by forming an outer layer in which the addition amount of a plasticizer is smaller than that in the inner layer, or an outer layer containing a matting agent, on the support surface side of the inner layer. Also, in order to achieve desired optical properties without damaging the stripping properties, there may be the case where the kind of the polymer material as a main component is made different between the inner layer and the outer layer. On the other hand, a longitudinal film to be continuously manufactured is in general wound up in a roll form for the purpose of storage, conveyance, etc., and in order to secure winding suitability, it is preferable to make the both end parts thick. But, as described above, as to a laminate film of an inner layer and an outer layer, it is general that an outer layer formed of raw materials of a different formulation is laminated on an inner layer. Therefore, when the thickness in the width direction is nonuniform, the ununiformity of optical properties in the width direction becomes remarkable. That is, in the conventional technologies, as to a laminate film of an inner layer and an outer layer, it was difficult to secure the winding suitability while securing the uniformity of optical properties. In the invention, the uniformity of optical properties in the width direction is improved by varying the film thickness of the outer layer depending upon a position in the width direction of the laminate film. For the purpose of securing the winding suitability, even when a total thickness differs in the width direction, for example, even when a total thickness of the both end parts is thick, whereas a total thickness of the central part is thin, the ununiformity of optical properties is reduced by varying the thickness of the outer layer in the width direction.

A cross-section schematic view of an example of the laminate film of the invention is shown in FIG. 1. A laminate film 1 shown in FIG. 1 has an inner layer 10 formed of a composition containing a polymer material as a main component; and an outer layer A 12a and an outer layer B 12b to be laminated on the both surfaces of the inner layer 10, each of which is formed of a composition containing a polymer material as a main component. In the laminate film 1, since the total thickness of the both end parts in the width direction is thick, whereas the total thickness of the central part is thin, the winding suitability in the case of being manufactured in a longitudinal form is good.

The inner layer 10 occupies almost all of the total thickness of the laminate film 1, and the outer layers 12a and 12b are layers which are complementarily formed for the stripping properties. Accordingly, the overall optical properties of the laminate film 1 rely chiefly on the development of optical properties of the raw material composition of the inner layer 10, and the development of optical properties of the raw material composition of the outer layers 12a and 12b is lower than that of the inner layer 10. In general, the thicker the thickness of a film, the larger the absolute values of Re and Rth. However, in the laminate film 1, in the both end parts in which the total thickness is thick, the thickness of the outer layers 12a and 12b with low development of optical properties is thick, and therefore, even when the thickness in the both end parts is thick, the contribution of the outer layers A and B with low development of optical properties to the optical properties is large. On the other hand, in the central part in the width direction, the thickness of the outer layers 12a and 12b is thin, whereas the thickness of the inner layer 10 is thick, and the contribution of the inner layer 10 with high development of optical properties is large. As shown in FIG. 1, by allowing the thickness of the outer layers 12a and 12b to have distribution in the width direction, it is possible to make the development of optical properties of the both end parts having a thick thickness low and the development of optical properties of the central part having a thin thickness high, respectively. Therefore, the ununiformity of optical properties resulted from the fact that the total thickness is distributed in the width direction, can be reduced.

Though the thickness of the laminate film 1 is not particularly limited, in general, it is preferably from 20 to 1,000 μm, and more preferably from 30 to 100 μm. From the viewpoint of winding suitability, a difference in the thickness between the central part and the both end parts is preferably from 0.1 to 10 μm, and more preferably from 1 to 5 μm. The thickness of the inner layer 10 is preferably from 20 to 1,000 μm, and more preferably from 30 to 100 μm on average. Also, in the example of FIG. 1, it is preferable that the inner layer 10 is thick in the central part and thin in the both end parts, and a difference therebetween is preferably from 0 to 20 μm, and more preferably from 0 to 10 μm. The thickness of the outer layers 12a and 12b is preferably from 1 to 10 μm, and more preferably from 1 to 5 μm on average. Also, in the example of FIG. 1, it is preferable that the thickness of the outer layers 12a and 12b is thick in the both end parts and thin in the central part, and a difference therebetween is preferably from 0.5 to 20 μm, and more preferably from 1 to 10 μm.

However, it should not be construed that the preferred ranges of the total thickness and the thickness of each layer are limited to the foregoing ranges. Also, in a laminate film fabricated by means of co-casting or the like, there may be the case where an interface between the inner layer and the outer layer is vague. However, by following up the concentration of an additive (for example, a matting agent) or the like added in each layer, the thickness of each layer can be indirectly measured, too.

The laminate film of the invention is not limited to the example shown in FIG. 1. The inner layer may be constituted of two or more layers, and the outer layer may be constituted of a single layer or three or more layers. Also, the profile of the film thickness distribution is not limited to the example shown in FIG. 1, and all of embodiments in which the thickness of the outer layer is regulated in the width direction such that the optical properties become uniform are included in the scope of the invention.

Materials and methods which can be utilized for manufacturing the laminate film of the invention are hereunder described in detail.

(1) Raw Material:

Any polymer material(s) is used for preparing the laminate film of the invention. Examples of the polymer material include acetate base polymers, polyethersulfones, polysulfones, polycarbonates, norbornene-base polymers (occasionally referred to as "polynorbornene"), polyolefins, acryl-base polymers, cellulose-base resins, polyacrylates, polystyrenes, polyvinylalcohols, polyvinyl chloride, polyvinylidene chloride, liquid crystal polymers, and thermal-curing or ultraviolet-curing resins such as thermal-curing or ultraviolet-curing acryl-, urethane-, acrylic urethane-, epoxy- and silicone-base resins. Especially, cellulose acylates are preferable.

Preferably, each of the inner layer and the outer layer of the laminate film of the invention is formed of a composition containing a cellulose acylate as a main component. The kind of the cellulose acylate as a main component and the kinds of additives and concentrations thereof may be different, respectively. In one example, a composition having a high concentration of additives contributing to the development of optical properties (for example, a retardation regulator, a plasticizer, etc.) can be used for the raw material of the inner layer, whereas a composition having a low concentration of additives contributing to the development of optical properties (for example, a retardation regulator, a plasticizer, etc.) and containing an additive contributing to an improvement of stripping properties, such as a matting agent, can be used for the raw material of the outer layer (in particular, the outer layer on the co-casting support side).

Cellulose Acylate:

The composition for forming each of the inner layer and the outer layer preferably contains a cellulose acylate as a main component. In this specification, in an embodiment in which the raw material is formed of one kind of a component, the "main component" means this component; and in an embodiment in which the raw material is formed of two or more kinds of components, the "main component" means a component having the highest mass fraction. The cellulose acylate may be used singly or in combination of two or more kinds thereof. A composition containing a cellulose acylate in which the acyl substituent of the cellulose acylate is, for example, an acetyl group alone, or containing a cellulose acylate having a plurality of acyl substituents, may be used.

The cellulose acylate is an ester of cellulose and an acid. The acid constituting the ester is preferably an organic acid, more preferably a carboxylic acid, still more preferably a fatty acid having a carbon atom number of from 2 to 22, and most preferably a lower fatty acid having a carbon atom number of from 2 to 4. In the cellulose acylate, all or a part of hydrogen atoms of hydroxyl groups present at the 2-position, 3-position and 6-position of a glucose unit constituting the cellulose is substituted with an acyl group. Examples of the acyl group include an acetyl group, a propionyl group, a butyryl group, an isobutyryl group, a pivaloyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, a cyclohexanecarbonyl group, an oleoyl group, a benzoyl group, a naphthylcarbonyl group, and a cinnamoyl group. As the acyl group, an acetyl group, a propionyl group, a butyryl group, a dodecanoyl group, an octadecanoyl group, a pivaloyl group, an oleoyl group, a benzoyl group, a naphthylcarbonyl group, and a cinnamoyl group are preferable; and an acetyl group, a propionyl group, and a butyryl group are the most preferable.

When a substitution degree of the acetyl group (carbon number: 2) substituting on the hydroxyl groups of cellulose of the cellulose acylate is defined as "SA", and a substitution degree of the acyl group having a carbon number of 3 or more substituting on the hydroxyl groups of cellulose of the cellulose acylate is defined as "SB", by regulating SA and SB, the development of Re of the manufactured cellulose acylate laminate film and the humidity dependency of retardation can be regulated. Incidentally, the humidity dependency of retardation as referred to herein means a change of reversible retardation by the humidity.

(SA+SB) is properly regulated depending upon the optical properties required for the cellulose acylate laminate film. A relation of 2.70≤(SA+SB)≤3.00 is preferable; a relation of 2.80≤(SA+SB)≤2.97 is more preferable; and a relation of 2.83≤(SA+SB)≤2.89 is still more preferable.

Also, by regulating SB, the humidity dependency of retardation of the cellulose acylate laminate film which is manufactured by the manufacturing method of the invention can be regulated. By making SB large, the humidity dependency of retardation can be reduced, and a melting point is decreased. When a balance between the humidity dependency of retardation and a decrease of the melting point is taken into consideration, the range of SB is preferably 0≤SB≤3.0, and more preferably 0≤SB≤1.0. Incidentally, when the all of the hydroxyl groups of cellulose are substituted, then the substitution degree is 3.

Also, it is preferable to use a cellulose acylate having a low substitution degree as the main component of the inner layer and a cellulose acylate having a high substitution degree as the main component of the outer layer, respectively. For example, a cellulose acylate with a low substitution degree, in which a substitution degree $Z1$ satisfies a relation of $2.0<Z<2.7$, can be used as the main component of the inner layer; and a cellulose acylate in which a substitution degree $Z2$ satisfies a relation of $Z1<Z2$ (for example, $2.7<Z2$), can be used as the main component of the outer layer. Though there may be the case where by using a cellulose acylate with a low substitution degree as the main component, optical properties which cannot be achieved by a film containing a cellulose acylate with a high substitution degree as a main component can be achieved, there is encountered such a problem that when a film contains a cellulose acylate with a low substitution degree as a main component, releasability from a cast support is poor. By laminating an outer layer containing a cellulose acylate with a high substitution degree, such a problem can be solved.

The cellulose acylate can be synthesized by a known method.

For example, a basic principle of the synthesis method of a cellulose acylate is described in Nobuhiko Migita, et al., *Wood Chemistry*, pages 180 to 190 (Kyoritsu Shuppan, 1968). A representative synthesis method of a cellulose acylate is a liquid phase acetylation method by a carboxylic acid anhydride-carboxylic acid-sulfuric acid catalyst. Specifically, a cellulose raw material such as cotton linter and wood pulps is subjected to a pretreatment with an appropriate amount of a carboxylic acid such as acetic acid and then thrown into a previously cooled acylating mixed liquid to achieve esterification, thereby synthesizing a complete cellulose acylate (the total acyl substitution degree at the 2-position, 3-position and 6-position is substantially 3.00). In general, the foregoing acylating mixed liquid contains a carboxylic acid as a solvent, a carboxylic acid anhydride as an esterifying agent, and sulfuric acid as a catalyst. Also, it is general that the carboxylic acid anhydride is used in a stoichiometrically excessive amount to the total sum of the cellulose with which the carboxylic acid anhydride reacts and the moisture existing in the system.

Subsequently, after completion of the acylation reaction, in order to achieve hydrolysis of the excessive carboxylic acid anhydride remaining in the system, water or water-containing acetic acid is added. Furthermore, in order to neutralize a part of the esterification catalyst, an aqueous solution containing a neutralizing agent (for example, carbonates, acetates, hydroxide, or oxides of calcium, magnesium, iron, aluminum, or zinc) may be added. Furthermore, the resulting cellulose acylate is kept at from 20 to 90° C. in the presence of a small amount of an acetylation reaction catalyst (in general, residual sulfuric acid) to achieve saponification ripening, whereby it is converted into a cellulose acylate having desired acyl substitution degree and polymerization degree. At a point of time of obtaining the desired cellulose acylate, the catalyst remaining in the system is completely neutralized using the foregoing neutralizing agent or the like, or the polymer solution is thrown into water or dilute acetic acid without neutralizing the foregoing catalyst (or water or dilute acetic acid is thrown into the polymer solution) to separate the cellulose acylate, followed by washing and stabilization. There can be thus obtained the desired cellulose acylate.

The polymerization degree of the cellulose acylate is preferably from 150 to 500, more preferably from 200 to 400, and still preferably from 220 to 350 in terms of a viscosity average polymerization degree. The viscosity average polymerization degree can be measured according to an intrinsic viscosity method proposed by Uda, et al. (Kazuo Uda and Hideo Saito, *Jour of Soc. of Textile and Cellulose Industry Japan*, Vol. 18, No. 1, pages 105 to 120, 1962). The measuring method of a viscosity average polymerization degree is also described in JP-A-9-95538.

Also, in a cellulose acylate with a less low molecular component, though its average molecular weight (polymerization degree) is high, its viscosity is a value lower than that of usual cellulose acylates. Such a cellulose acylate with a less low molecular component can be obtained by removing the low molecular component from the synthesized cellulose acylate by a usual method. The removal of the low molecular component can be performed by washing the cellulose acylate with an appropriate organic solvent. Also, the cellulose acylate with a less low molecular component can be obtained by means of synthesis. In the case of synthesizing a cellulose acylate with a less low molecular component, it is preferable that the amount of the sulfuric acid catalyst in the acetylation reaction is regulated to from 0.5 to 25 parts by mass based on 100 parts by mass of the cellulose. By allowing the amount of the sulfuric acid catalyst to fall within the foregoing range, it is possible to synthesize a cellulose acylate which is also preferable from the standpoint of molecular weight distribution (uniform molecular weight distribution). The polymerization degree and molecular weight distribution of the cellulose acylate can be measured by means of gel permeation chromatography (GPC) or the like.

The raw material cotton and synthesis method of the cellulose ester are also described on pages 7 to 12 of *Journal of Technical Disclosure*, No. 201-1745, issued Mar. 15, 2001 by Japan Institute of Invention and Innovation.

As the cellulose acylate which is used as the raw material at the time of manufacturing a cellulose acylate laminate film, a powdered or granular material can be used, and a pelletized material can also be used. A water content of the cellulose acylate at the time of using it as the raw material is preferably not more than 1.0% by mass, more preferably not more than 0.7% by mass, and most preferably not more than 0.5% by mass. Further, in some cases, the water content is preferably not more than 2.0% by mass. In the case where the water content of the cellulose acylate does not fall within the preferred range, it is preferable to use the cellulose acylate after drying by dry air or heating.

Norbornene-base Polymer:

Any norbornene-base polymer(s) may be used for forming the inner or outer layer. Examples of the norbornene-base polymer include ring-opening polymerization polymers of any polycyclic monomers. Examples of the polycyclic monomer include, but are not limited to, the compounds described below.

bicyclo[2.2.1]hept-2-en,
tricyclo[4.3.0.1$^{2,5}$]-8-decene,
tricyclo[4.4.0.1$^2$,5]-3-undecene,
tetracyclo[4.4.0.1$^2$,5.1$^7$,10]-3-dodecene,
pentacyclo[6.5.1.1$^3$,6.0$^2$,7.0$^9$,13]-4-pentadecene,
5-methyl bicyclo[2.2.1]hept-2-en,
5-ethyl bicyclo[2.2.1]hept-2-en,
5-methoxycarbonyl bicyclo[2.2.1]hept-2-en,
5-methyl-5-methoxycarbonyl bicyclo[2.2.1]hept-2-en,
5-cyano bicyclo[2.2.1]hept-2-en,
8-methoxycarbonyl tetracyclo[4.4.0.1$^2$,5.1$^7$,10]-3-dodecene,
8-ethoxycarbonyl tetracyclo[4.4.0.1$^2$,5.1$^7$, 10]-3-dodecene,
8-n-propoxycarbonyl tetracyclo[4.4.0.1$^2$,5.1$^7$,10]-3-dodecene,
8-isopropoxycarbonyl tetracyclo[4.4.0.1$^2$,5.1$^7$,10]-3-dodecene,
8-n-butoxycarbonyl tetracyclo[4.4.0.1$^2$,5.1$^7$,10]-3-dodecene, 8-methyl-8-methoxycarbonyl tetracyclo[4.4.0.1$^2$,5.1$^7$,10]-3-dodecene,
8-methyl-8-ethoxycarbonyl tetracyclo[4.4.0.1$^2$,5.1$^7$,10]-3-dodecene,
8-methyl-8-n-propoxycarbonyl tetracyclo[4.4.0.1$^2$,5.1$^7$,10]-3-dodecene,
8-methyl-8-isopropoxtcarbonyl tetracyclo[4.4.0.1$^2$,5.1$^7$,10]-3-dodecene,
8-methyl-8-n-butoxycarbonyl tetracyclo[4.4.0.1$^2$,5.1$^7$,10]-3-dodecene,
5-ethylidene bicyclo[2.2.1]hept-2-en,
8-ethylidene tetracyclo[4.4.0.1$^2$,5.1$^7$,10]-3-dodecene,
5-phenyl bicyclo[2.2.1]hept-2-en,
8-phenyl tetracyclo[4.4.0.1$^2$,5.1$^7$,10]-3-dodecene,
5-fluoro bicyclo[2.2.1]hept-2-en,
5-fluoromethyl bicyclo[2.2.1]hept-2-en,
5-trifluoromethyl bicyclo[2.2.1]hept-2-en,
5-pentafluoroethyl bicyclo[2.2.1]hept-2-en,
5,5-difluoro bicyclo[2.2.1]hept-2-en,
5,6-difluoro bicyclo[2.2.1]hept-2-en,
5,5-bis(trifluoromethyl)bicyclo[2.2.1]hept-2-en,
5,6-bis(trifluoromethyl)bicyclo[2.2.1]hept-2-en,
5-methyl-5-trifluoromethyl bicyclo[2.2.1]hept-2-en,
5,5,6-trifluoro bicyclo[2.2.1]hept-2-en,
5,5,6-tris(fluoromethyl)bicyclo[2.2.1]hept-2-en,
5,5,6,6-tetrafluoro bicyclo[2.2.1]hept-2-en,
5,5,6,6-tetrakis(trifluoromethyl)bicyclo[2.2.1]hept-2-en,
5,5-difluoro-6,6-bis(trifluoromethyl)bicyclo[2.2.1]hept-2-en,
5,6-difluoro-5,6-bis(trifluoromethyl)bicyclo[2.2.1]hept-2-en,
5,5,6-trifluoro-5-trifluoromethyl bicyclo[2.2.1]hept-2-en,
5-fluoro-5-pentafluoroethyl-6,6-bis(trifluoromethyl)bicyclo[2.2.1]hept-2-en,
5,6-difluoro-5-heptafluoro-iso-propyl-6-trifluoromethyl bicyclo[2.2.1]hept-2-en,
5-chloro-5,6,6-trifluoro bicyclo[2.2.1]hept-2-en,
5,6-dichloro-5,6-bis(trifluoromethyl)bicyclo[2.2.1]hept-2-en,
5,5,6-trifluoro-6-trifluoromethoxy bicyclo[22.1]hept-2-en,
5,5,6-trifluoro-6-heptafluoropropoxy bicyclo[2.2.1]hept-2-en,
8-fluoro tetracyclo[4.4.0.1$^2$,5.1$^7$,10]-3-dodecene,
8-fluoromethyl tetracyclo[4.4.0.1$^2$,5.1$^7$,10]-3-dodecene,
8-difluoromethyl tetracyclo[4.4.0.1$^2$,5.1$^7$,10]-3-dodecene,
8-trifluoromethyl tetracyclo[4.4.0.1$^2$,5.1$^7$,10]-3-dodecene,
8-pentafluoroethyl tetracyclo[4.4.0.1$^2$,5.1$^7$,10]-3-dodecene,
8,8-difluoro tetracyclo[4.4.0.1$^2$,5.1$^7$, 10]-3-dodecene,
8,9-difluoro tetracyclo[4.4.0.1$^2$,5.1$^7$,10]-3-dodecene,
8,8-bis(trifluoromethyl)tetracyclo[4.4.0.1$^2$,5.1$^7$,10]-3-dodecene,
8,9-bis(trifluoromethyl)tetracyclo[4.4.0.1$^2$,5.1$^7$,10]-3-dodecene,
8-methyl-8-trifluoromethyl tetracyclo[4.4.0.1$^2$,5.1$^7$,10]-3-dodecene,
8,8,9-trifluoro tetracyclo[4.4.0.12,5.17,10]-3-dodecene,
8,8,9-tris(trifluoromethyl)tetracyclo[4.4.0.12,5.17,10]-3-dodecene,
8,8,9,9-tetrafluoro tetracyclo[4.4.0.1$^2$,5.1$^7$, 10]-3-dodecene,
8,8,9,9-tetrakis(trifluoromethyl)tetracyclo[4.4.0.1$^2$,5.1$^7$,10]-3-dodecene,
8,8-difluoro-9,9-bis(trifluoromethyl)tetracyclo[4.4.0.1$^2$,5.1$^7$,10]-3-dodecene,
8,9-difluoro-8,9-bis(trifluoromethyl)tetracyclo[4.4.0.1$^2$,5.1$^7$,10]-3-dodecene,
8,8,9-trifluoro-9-trifluoromethyl tetracyclo[4.4.0.1$^2$,5.1$^7$,10]-3-dodecene,
8,8,9-trifluoro-9-trifluoromethoxy tetracyclo[4.4.0.1$^2$,5.1$^7$,10]-3-dodecene,
8,8,9-trifluoro-9-pentafluoropropoxy tetracyclo[4.4.0.1$^2$,5.1$^7$,10]-3-dodecene,
8-fluoro-8-pentafluoroethyl-9,9-bis(trifluoromethyl)tetracyclo[4.4.0.1$^2$,5.1$^7$,10]-3-dodecene,
8,9-difluoro-8-heptafluoro iso-propyl-9-trifluoromethyl tetracyclo[4.4.0.1$^2$,5.1$^7$,10]-3-dodecene,
8-chloro-8,9,9-trifluoro tetracyclo[4.4.0.1$^2$,5.1$^7$,10]-3-dodecene,
8,9-dichloro-8,9-bis(trifluoromethyl)tetracyclo[4.4.0.1$^2$,5.1$^7$,10]-3-dodecene,
8-(2,2,2-trifluoroethoxycarbonyl)tetracyclo[4.4.0.1$^2$,5.1$^7$,10]-3-dodecene, and
8-methyl-8-(2,2,2-trifluoroethoxycarbonyl)tetracyclo[4.4.0.1$^2$,5.1$^7$,10]-3-dodecene These compounds may be used singly or in combination with one or more others.

The molecular weight of the polymer to be used is not limited, and in general, is preferably from 5000 to 500000 or more preferably from 10000 to 100000. Examples of the commercially-available cycloolefin-base polymer which can be used in the invention include ARTON series products (products of JSR), ZEONOR series products (products of ZEON CORPORATION), ZEONEX series products (products of ZEON CORPORATION) and S-SINA series products (products of SEKISUI CHEMICAL CO., LTD).

The method using a norbornene-base polymer for preparing a polymer film is not limited, and the polymer films prepared according to any method may be used. For examples, the polymer films prepared according to any melt-casting method or any solution-casting method may be used. The conditions for the film-forming are described in JP-A-2004-198952, and the same may be applied to the present invention.

Aromatic Group-containing Oligomer:

It is preferable that each of the composition for forming the inner layer and the composition for forming the outer layer contains an aromatic group-containing oligomer. The aromatic group-containing oligomer acts as a plasticizer. In the example shown in FIG. 1, it is preferable that a concentration of the plasticizer in the inner layer is higher than a concentration of the plasticizer in the outer layer. The plasticizer is an essential raw material for increasing a volatilization rate of the solvent and reducing an amount of the residual solvent. In order to act as the plasticizer, a number average molecular weight of the oligomer is preferably from 500 to 2,000, and more preferably from 500 to 1,500. Also, from the viewpoints of bleeding of the oligomer, handling of a web, and the like, an amount of the oligomer is preferably not more than 20 parts by mass, and more preferably not more than 15 parts by mass based on 100 parts by mass of the polymer material. On the other hand, from the viewpoints of a drying rate of the web and the like, the amount of the oligomer is preferably 3 parts by mass or more, and more preferably 5 parts by mass or more based on 100 parts by mass of the polymer material.

Incidentally, the aromatic group-containing oligomer may be used singly or in combination of two or more kinds thereof.

Also, the aromatic group-containing oligomer may be a liquid or a solid at an environmental temperature or humidity to be used (in general, in a room-temperature state, so-called at 25° C. and a relative humidity of 60%). Also, the smaller its tint, the better, and in particular, the oligomer is preferably colorless. From the thermal standpoint, it is preferable that the oligomer is stable at a high temperature. A decomposition initiation temperature of the oligomer is preferably 150° C. or higher, more preferably 200° C. or higher, and still more preferably 250° C. or higher.

It is one of characteristic features that the aromatic group-containing oligomer which can be used in the invention contains an aromatic group. By allowing the aromatic group to be regularly contained in a part of repeating units in the oligomer, an alignment degree of the molecule of the oligomer after heat treatment can be effectively increased. The aromatic group-containing oligomer is preferably a polycondensed ester containing at least one dicarboxylic acid residue and at least one diol residue. The aromatic group may be contained in the dicarboxylic acid residue, or may be contained in the diol residue. Above all, a polycondensed ester in which the aromatic group is contained in the dicarboxylic acid residue is preferable. More specifically, it is preferable that the aromatic group-containing oligomer is selected from polycondensed esters containing at least one aromatic dicarboxylic acid residue and at least one aliphatic diol residue.

The polycondensed ester-based plasticizer which can be utilized as the aromatic group-containing oligomer in the invention is hereunder described in detail.

Polycondensed Ester:

In the invention, it is preferable to use, as the aromatic group-containing oligomer, a polycondensed ester obtained by a reaction of an aromatic dicarboxylic acid and an aliphatic glycol. Though the both ends of a reaction product may be in a state of the reaction product as it is, sealing of the both ends may be further carried out upon a reaction with a monocarboxylic acid or a monoalcohol. In particular, when this end sealing is carried out in order that the oligomer may not contain a free carboxylic acid, it is effective from the standpoint of storage properties or the like. The dicarboxylic acid which is used for the polycondensed ester is preferably an aromatic dicarboxylic acid, and more preferably an aromatic dicarboxylic acid having a carbon number of from 8 to 12. The glycol which is used for the polycondensed ester is preferably an aliphatic glycol, and more preferably an aliphatic glycol having a carbon number of from 2 to 12. Incidentally, the aliphatic glycol also includes an alicyclic glycol.

Examples of the aromatic dicarboxylic acid having a carbon number of from 8 to 12 include phthalic acid, terephthalic acid, 1,5-naphthalenedicarboxylic acid, and 1,4-naphthalenedicarboxylic acid. Of these, terephthalic acid is preferable because the Re development of film is high. Such an aromatic dicarboxylic acid is used singly or in admixture of two or more kinds thereof.

The polycondensed ester may contain an aliphatic dicarboxylic acid residue. Examples of the aliphatic dicarboxylic acid residue include an aliphatic dicarboxylic acid residue having a carbon number of from 4 to 12. Examples of an alkylene dicarboxylic acid having a carbon number of from 4 to 12 include succinic acid, maleic acid, fumaric acid, glutaric acid, adipic acid, azelaic acid, sebacic acid, dodecanedicarboxylic acid, and 1,4-cyclohexanedicarboxylic acid.

Examples of the aliphatic glycol having a carbon number of from 2 to 12 include ethylene glycol, 1,2-propylene glycol, 1,3-propylene glycol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylpentane), 2-n-butyl-2-ethyl-1,3-propanediol (3,3-diemthylolheptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, and 1,12-octadecanediol. Such a glycol is used singly or in admixture of two or more kinds thereof.

Also, in order that the both ends of the polycondensed ester may not become a carboxylic acid, it is preferable to protect them with a monoalcohol residue or a monocarboxylic acid residue. In that case, as a preferred embodiment as the monoalcohol residue, for example, an embodiment described in JP-A-2009-262551 can be exemplified.

Also, examples of the monocarboxylic acid which can be utilized for sealing include substituted or unsubstituted monocarboxylic acids having a carbon number of from 1 to 30. Such a substituted or unsubstituted monocarboxylic acid may be an aliphatic monocarboxylic acid or an aromatic carboxylic acid. First of all, examples of the preferred aliphatic monocarboxylic acid include acetic acid, propionic acid, butanoic acid, caprylic acid, caproic acid, decanoic acid, dodecanoic acid, stearic acid, and oleic acid. As a preferred embodiment as the aromatic monocarboxylic acid, for example, an embodiment described in JP-A-2009-262551 can be exemplified. Such a monocarboxylic acid can be used singly or in admixture of two or more kinds thereof.

As described, as specific preferred synthesis methods and commercial products of the polycondensed ester, for example, embodiments described in JP-A-2009-262551 can be exemplified.

Specific examples of the polycondensed ester which can be utilized in the invention are given below, but it should not be construed that the polycondensed ester is limited thereto.

PP-1: Condensate of ethanediol/terephthalic acid (1/1 by mole) (number average molecular weight: 1,000)

PP-2: Condensate of 1,2-propanediol/terephthalic acid (1/1 by mole) (number average molecular weight: 1,000)

PP-3: Condensate of ethanediol/1,2-propanediol/terephthalic acid (0.5/0.5/1 by mole) (number average molecular weight: 1,000)

PP-4: Condensate of ethanediol/1,2-propanediol/terephthalic acid/succinic acid (0.5/0.5/0.7/0.3 by mole) (number average molecular weight: 1,000)

PP-5: Condensate of ethanediol/1,2-propanediol/terephthalic acid/succinic acid (0.5/0.5/0.55/0.45 by mole) (number average molecular weight: 1,000)

PP-6: Condensate of ethanediol/1,2-propanediol/terephthalic acid/succinic acid (0.5/0.5/0.7/0.3 by mole) esterified with octyl at an end thereof (number average molecular weight: 1,000)

PP-7: Condensate of 1,3-propanediol/1,5-naphthalenedicarboxylic acid (1/1 by mole) (number average molecular weight: 1,500)

PP-8: Condensate of 2-methyl-1,3-propanediol/isophthalic acid (1/1 by mole) (number average molecular weight: 1,200)

PP-9: Condensate of 1,3-propanediol/terephthalic acid (1/1 by mole) esterified with benzyl at both ends thereof (number average molecular weight: 1,500)

PP-10: Condensate of 1,3-propanediol/1,5-naphthalenedicarboxylic acid (1/1 by mole) esterified with propyl at both ends thereof (number average molecular weight: 1,500)

PP-11: Condensate of 2-methyl-1,3-propanediol/isophthalic acid (1/1 by mole) esterified with butyl at both ends (number average molecular weight: 1,200)

Oligomer Having Aliphatic Group:

The composition to be used for forming the inner or outer layer may contain one oligomer having an aliphatic group alone or as a mixed plasticizer along with other plasticizer(s) such as oligomer.

Examples of the oligomer having an aliphatic group include polycondensation products (referred to as "aliphatic high-molecular weight plasticizer (PA)" hereinafter) of an aliphatic dicarboxylic acid and an aliphatic diol and, if necessary, an aliphatic monocarboxylic acid or an aliphatic monoalcohol. The number-averaged molecular weight thereof is preferably from 700 to 10000.

As the aliphatic dicarboxylic acid, $C_{2-20}$ alkylene dicarboxylic acid is preferable, it may form a cyclic structure; and examples thereof include oxalic acid, malonic acid, succinic acid, maleic acid, fumaric acid, glutaric acid, adipic acid, pimelic acid, suberic acid, azelaic acid, sebacic acid, dodecanedicarboxylic acid, 1,4-cyclohexanedicarboxylic acid and dicyclohexane dicarboxylic acid. Among these, preferred are malonic acid, succinic acid, maleic acid, fumaric acid, glutaric acid, adipic acid, azelaic acid, sebacic acid and 1,4-cyclohexanedicarboxylic acid.

The aliphatic diol to be used in the aliphatic high-molecular weight plasticizer (PA), is preferably a $C_{2-20}$ aliphatic diol or a $C_{4-20}$ alkyl ether diol, and these may be form a cyclic structure. Examples of the $C_{2-20}$ aliphatic diol include alkyl diols and aliphatic cyclic diols; and examples thereof include an 1,2-ethandiol (that is, ethandiol or ethylene glycol), 1,2-propandiol, 1,3-propandiol, 1,2-butandiol, 1,3-butandiol, 2-methyl-1,3-propandiol, 1,4-butandiol, 1,5-pentandiol, 2,2-dimethyl-1,3-propandiol(neopentyl glycol), 2,2-diethyl-1,3-propandiol(3,3-dimethylpentane), 2-n-buthyl-2-ethyl-1,3-propandiol (3,3-dimethylolheptane), 3-methyl-1,5-pentandiol, 1,6-hexandiol, 2,2,4-trimethyl-1,3-pentandiol, 2-ethyl-1,3-hexandiol, 2-methyl-1,8-octandiol, 1,9-nonandiol, 1,10-decandiol, 1,12-octadecandiol, 1,4-cyclohexanediol, 1,4-cyclohexane dimethanol, etc. One or more of these glycols may be used either singly or as combined mixture.

Preferable examples of the aliphatic diol include ethanediol, 1,2-propandiol, 1,3-propandiol, 1,2-butandiol, 1,3-butandiol, 2-methyl-1,3-propandiol, 1,4-butandiol, 1,6-hexandiol, 1,4-cyclohexanediol and 1,4-cyclohexane dimethanol; more preferable examples thereof include ethanediol, 1,2-propandiol, 1,3-propandiol, 1,2-butandiol, 1,6-hexandiol, 1,4-cyclohexanediol and 1,4-cyclohexane dimethanol Specific examples of preferred $C_{4-20}$ alkyl ether diols to be used in the aliphatic high-molecular weight plasticizer (PA) are polytetramethylene ether glycol, polyethylene ether glycol, polypropylene ether glycol, and combinations of these. The average degree of polymerization is not limited in particular, and it is preferably from 2 to 20, more preferably from 2 to 10, further preferably from 2 to 5, especially preferably from 2 to 4. As these examples, Carbowax resin, Pluronics resin and Niax resin are commercially available as typically useful polyether glycols.

In the invention, especially preferred is an aliphatic high-molecular weight plasticizer (PA) of which the terminal is blocked with an alkyl group or an aromatic group. The terminal protection with a hydrophobic functional group is effective against aging at high temperature and high humidity, by which the hydrolysis of the ester group is retarded. Preferably, the aliphatic high-molecular weight plasticizer (PA) is protected with a monoalcohol residue or a monocarboxylic acid residue in order that both ends of the aliphatic high-molecular weight plasticizer (PA) are not a carboxylic acid or a hydroxyl group.

In this case, the monoalcohol residue is preferably a substituted or unsubstituted monoalcohol residue having from 1 to 30 carbon atoms, including, for example, aliphatic alcohols such as methanol, ethanol, propanol, isopropanol, butanol, isobutanol, pentanol, isopentanol, hexanol, isohexanol, cyclohexyl alcohol, octanol, isooctanol, 2-ethylhexyl alcohol, nonyl alcohol, isononyl alcohol, tert-nonyl alcohol, decanol, dodecanol, dodecahexanol, dodecaoctanol, allyl alcohol, and oleyl alcohol.

In blocking with a monocarboxylic acid residue, the monocarboxylic acid for use as the monocarboxylic acid residue is preferably a substituted or unsubstituted monocarboxylic acid having from 1 to 30 carbon atoms or more preferably from 1 to 22 carbon atoms. Preferable examples thereof include acetic acid, propionic acid, butanoic acid, hexane acid, octane acid, decanoic acid, dodecanoic acid, stearic acid, oleic acid, cyclohexyl carboxylic acid and dicyclohexyl carboxylic acid. One or more of these may be used either singly or as combined. Preferable examples thereof include acetic acid, propionic acid, oleic acid and cyclohexyl carboxylic acid; and even more preferable examples thereof include acetic acid and propionic acid. It may be selected from aromatic monocarboxylic acid, and examples thereof include those described in JP-A 2009-262551. One or more of these may be used either singly or as combined.

Examples of the aliphatic high-molecular weight plasticizer (PA), which is a polycondensation product of an aliphatic dicarboxylic acid and an aliphatic diol and, if necessary, an aliphatic monocarboxylic acid or an aliphatic monoalcohol and has the number-averaged molecular weight of from 700 to 10000, include, but are not limited, those described below.

PA-1: condensation product (the number-averaged molecular weight 1100) of ethane diol/succinic acid (1/1 molar ratio)

PA-2: condensation product (the number-averaged molecular weight 1500) of 1,3-propane diol/glutaric acid (1/1 molar ratio)

PA-3: condensation product (the number-averaged molecular weight 900) of 1,3-propane diol/adipic acid (1/1 molar ratio)

PA-4: condensation product (the number-averaged molecular weight 1500) of 1,3-propane diol/ethylene glycol/adipic acid (1/1/2 molar ratio)

PA-5: condensation product (the number-averaged molecular weight 1400) of 2-methyl-1,3-propane diol/adipic acid (1/1 molar ratio)

PA-6: condensation product having the acetylated both terminals (the number-averaged molecular weight 1000) of ethane diol/succinic acid/adipic acid (2/1/1 molar ratio)

PA-7: condensation product (the number-averaged molecular weight 1800) of 1,4-cyclohexane diol/succinic acid (1/1 molar ratio)

PA-8: condensation product having the butylated both terminals (the number-averaged molecular weight 1200) of 1,3-propane diol/succinic acid (1/1 molar ratio)

PA-9: condensation product having the both terminals esterified with cyclohexyl (the number-averaged molecular weight 1500) of 1,3-propane diol/glutaric acid (1/1 molar ratio)

PA-10: condensation product having the acetylated both terminals (the number-averaged molecular weight 3000) of ethanediol/succinic acid (1/1 molar ratio)

PA-11: condensation product having the both terminals esterified with isononyl (the number-averaged molecular weight 1500) of 1,3-propane diol/ethylene glycol/adipic acid (1/1/2 molar ratio)

PA-12: condensation product having the both terminals esterified with propyl (the number-averaged molecular weight 1300) of 2-methyl-1,3-propane diol/adipic acid (1/1 molar ratio)

PA-13: condensation product having the acetylated both terminals (the number-averaged molecular weight 1700) of 2-methyl-1,3-propane diol/adipic acid (1/1 molar ratio)

PA-14: condensation product having the both terminals esterified with isononyl (the number-averaged molecular weight 1500) of 2-methyl-1,3-propane diol/adipic acid (1/1 molar ratio)

PA-15: condensation product having the butylated both terminals (the number-averaged molecular weight 1100) of 1,4-butane diol/adipic acid (1/1 molar ratio)

PA-16: condensation product (the number-averaged molecular weight 2800) of poly (the averaged degree of polymerization of 5) propylene ether glycol/succinic acid (1/1 molar ratio)

PA-17: condensation product (the number-averaged molecular weight 2300) of poly (the averaged degree of polymerization of 3) ethylene ether glycol/glutaric acid (1/1 molar ratio)

PA-18: condensation product (the number-averaged molecular weight 2200) of poly (the averaged degree of polymerization of 4) propylene ether glycol/adipic acid (1/1 molar ratio)

PA-19: condensation product having the butylated both terminals (the number-averaged molecular weight 1900) of poly (the averaged degree of polymerization of 5) propylene ether glycol/succinic acid (1/1 molar ratio)

PA-20: condensation product having the both terminals esterified with 2-ethylhexyl (the number-averaged molecular weight 2500) of poly (the averaged degree of polymerization of 3) ethylene ether glycol/glutaric acid (1/1 molar ratio)

PA-21: condensation product having the acetylated both terminals (the number-averaged molecular weight 1500) of poly (the averaged degree of polymerization of 4) propylene ether glycol/adipic acid (1/1 molar ratio)

PA-22: condensation product having the both ends esterified with propionyl (the number-averaged molecular weight 1900) of poly (the averaged degree of polymerization of 4) propylene ether glycol/phthalic acid (1/1 molar ratio)

PA-23: condensation product (the number-averaged molecular weight 1000) of ethanediol/adipic acid (1/1 molar ratio)

It was confirmed that these specific examples were prepared so that the existing ratio of the components having the averaged molecular weight of 500 or less was equal to or less than 10% by mass. The rates of decrease in mass thereof were measured according to the thermal balance method by heating them at 200 degrees for 10 minutes, and it was confirmed that they were equal to or less than 5%. The rates of decrease in mass thereof were measured by heating them at 140 degrees for 60 minutes, and it was confirmed also that they were equal to or less than 1%. Any component having the number-averaged molecular weight of 10000 or more was not found.

Sugar Ester Compound:

The laminate film, especially the cellulose acylate laminate film, of the invention may contain at least one sugar ester compound. The sugar ester compound acts as a plasticizer or the like. The sugar ester compound means a sugar derivative obtained by esterifying at least a part of OHs of a monosaccharide or polysaccharide. A part of OHs may remain as it is. Also, a sugar ester compound obtained by esterification of OHs contained originally in a substituent-containing monosaccharide or polysaccharide derivative may be used. The ester group may be an aromatic group-containing ester group or an aliphatic group-containing ester group. Examples of the sugar ester compound include an aromatic sugar ester compound represented by the following general formula (a), an aromatic sugar ester compound represented by the following general formula (b), and an aliphatic sugar ester compound represented by the following general formula (c). Two or more kinds of these sugar ester compounds may be used, and it is preferable that one kind of each of the sugar ester compounds represented by the following general formulae (a) to (c) is contained. As described above, a part of OHs may remain in the sugar ester compound as it is, namely, an average esterification rate need not be 100%. It is preferable that the aromatic sugar ester compound having an aromatic ester group has an average esterification rate of less than 94%. In an embodiment of using the sugar esters represented by the following general formulae (a) and (b) in combination, it is preferable that each of the aromatic sugar ester compound represented by the general formula (a) and the aromatic sugar ester compound represented by the general formula (b) has an average ester substitution degree of less than 94%.

  (a)

  (b)

  (c)

In the general formulae (a) to (c), each of G and G' independently represents a monosaccharide residue or a disaccharide residue. Each $R^1$ independently represents an aliphatic group or an aromatic group, and at least one $R^1$ represents an aromatic group. Each $R^2$ independently represents an aliphatic group. Each of L and L' independently represents a divalent connecting group. m represents an integer of 0 or more; each of n, p, and q independently represents an integer of 1 or more; r represents an integer of 3 or more; and t represents an integer of 0 or more, provided that $(m+n) \geq 4$, $(p+q) \geq 4$, $m > p$, and $n < q$. Also, each of $(m+n)$ and $(p+q)$ is equal to a number of hydroxyl groups in the case of supposing that G is not a residue but an unsubstituted saccharide of a cyclic acetal structure of the same skeleton; and $(r+t)$ is equal to a number of hydroxyl groups in the case of supposing that G' is not a residue but an unsubstituted saccharide of a cyclic acetal structure of the same skeleton.

It is preferable to use a sugar ester compound mixture obtained by mixing a plurality of the aromatic sugar ester compounds having a different ester substitution degree from each other, which are represented by the foregoing general formulae (a) and (b), respectively, and the aliphatic sugar ester compound represented by the foregoing general formula (c) so as to satisfy the foregoing conditions. By adding the foregoing sugar ester compound mixture to the inner layer or the outer layer (in particular, the inner layer) of the laminate film of the invention, it is possible to obtain a laminate film which is less in planar failure and small in change with time of optical performance and which, when incorporated as a protective film into a polarizing plate, is small in change with time of performance of the polarizing plate.

Wavelength Dispersion Characteristics Regulator:

For controlling the wavelength dispersion characteristics, any wavelength dispersion characteristics regulator(s) may be added to the inner or outer layer (especially inner layer).

The wavelength dispersion characteristics regulator is selected from compounds having an absorption peak within a wavelength range of from 250 to 400 nm, preferably from 250 to 400 nm or more preferably from 360 to 400 nm. The wavelength dispersion characteristics regulator may be selected from compounds having an absorption peak within a wavelength range of from 250 to 400 nm and another absorption peak within a wavelength range other than the range of from 250 to 400 nm.

The wavelength dispersion characteristics regulator to be used in the invention is preferably selected from compounds which don't vaporize in the whole process for producing any optical compensatory film or liquid crystal display device. One wavelength dispersion characteristics regulator may be used alone or two or more wavelength dispersion characteristics regulators may be used in combination. A total amount of the wavelength dispersion characteristics regulator(s) may be varied depending on the desired optical properties, preferably from 0.2 to 20% by mass, more preferably from 02. to 10% by mass, or even more preferably from 0.5 to 5% by mass. The wavelength dispersion characteristics regulator is preferably added to or mixed with a melt or a solution to form a film before film-forming step.

The wavelength dispersion characteristics regulator to be used in the invention is preferably a compound represented by any one of formulas (I)-(VIII). Among the formulas (I)-(VIII), the compound represented by formula (I) is preferable.

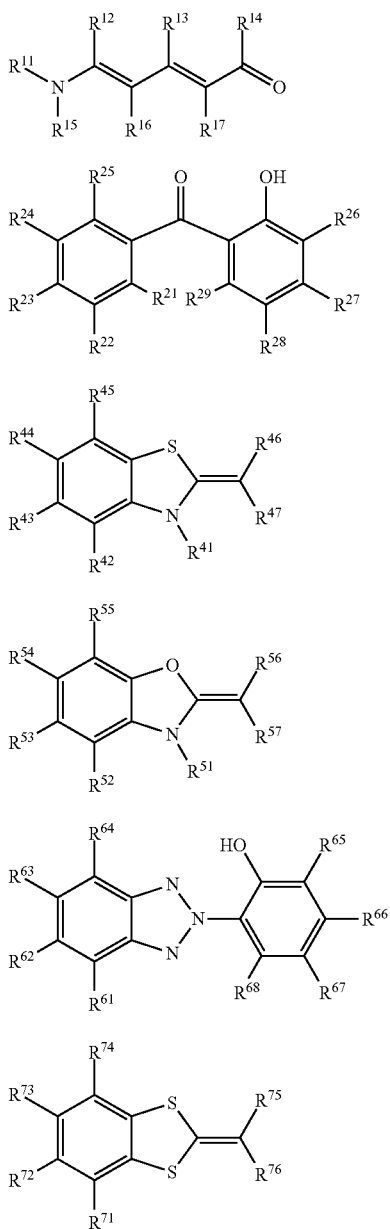

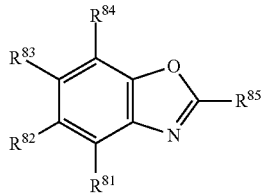

$R^{11}$, $R^{12}$, $R^{13}$, $R^{14}$, $R^{15}$, $R^{16}$ and $R^{17}$ in formula (I), $R^{21}$, $R^{22}$, $R^{23}$, $R^{24}$, $R^{25}$, $R^{26}$, $R^{27}$, $R^{28}$ and $R^{29}$ in formula (II), $R^{41}$, $R^{42}$, $R^{43}$, $R^{44}$, $R^{45}$, $R^{46}$ and $R^{47}$ in formula (III), $R^{51}$, $R^{52}$, $R^{53}$, $R^{54}$, $R^{55}$, $R^{56}$ and $R^{57}$ in formula (IV), $R^{61}$, $R^{62}$, $R^{63}$, $R^{64}$, $R^{65}$, $R^{66}$, $R^{67}$ and $R^{68}$ in formula (V), $R^{71}$, $R^{72}$, $R^{73}$, $R^{74}$, $R^{75}$ and $R^{76}$ in formula (V), $R^{81}$, $R^{82}$, $R^{83}$, $R^{84}$ and $R^{85}$ in formula (VII), and $R^{86}$, $R^{87}$ and $R^{88}$ in formula (VIII) each independently represent a hydrogen atom or substituent.

In the formulas (I)-(VIII), combining the substituents so that the molecular long axis is a horizontal direction (left-right direction) of the plane of paper is preferable.

Preferable examples of the substituent include a halogen atom (for example, a fluorine atom, a chlorine atom, a bromine atom, an iodine atom), an alkyl group (preferably an alkyl group having from 1 to 30 carbon atoms, more preferably from 1 to 10 carbon atoms, for example, a methyl group, an ethyl group, an n-propyl group, an isopropyl group, a tert-butyl group, an n-octyl group, a 2-ethylhexyl group), a cycloalkyl group (preferably a substituted or un-substituted cycloalkyl group having from 3 to 30 carbon atoms, more preferably from 3 to 10 carbon atoms, for example, a cyclohexyl group, a cyclopentyl group, a 4-n-dodecylcyclohexyl group), a bicycloalkyl group (preferably a substituted or unsubstituted bicycloalkyl group having from 5 to 30 carbon atoms, more preferably from 5 to 10 carbon atoms, or that is, a monovalent group derived from a bicycloalkane preferably having from 5 to 30 carbon atoms, more preferably from 5 to 10 carbon atoms, by removing one hydrogen atom from it, for example, a bicyclo[1.2.2]heptan-2-yl group, a bicyclo[2.2.2]octan-3-yl group), an alkenyl group (preferably a substituted or unsubstituted alkenyl group having from 2 to 30 carbon atoms, more preferably from 2 to 10 carbon atoms, for example, a vinyl group, an allyl group), a cycloalkenyl group (preferably a substituted or unsubstituted cycloalkenyl group having from 3 to 30 carbon atoms, more preferably from 3 to 10 carbon atoms, of that is, a monovalent group derived from a cycloalkene preferably having from 3 to 30 carbon atoms, more preferably from 3 to 10 carbon atoms, by removing one hydrogen atom from it, for example, a 2-cyclopenten-1-yl group, a 2-cyclohexen-1-yl group), a bicycloalkenyl group (a substituted or unsubstituted bicycloalkenyl group, preferably a substituted or unsubstituted bicycloalkenyl group having from 5 to 30 carbon atoms, more preferably from 5 to 10 carbon atoms, or that is, a monovalent group derived from a bicycloalkene having one double bond, by removing one hydrogen atom from it, for example, a bicyclo[2.2.2]hept-2-en-1-yl group, a bicyclo[2.2.2]oct-2-en-4-yl group), an alkynyl group (preferably a substituted or unsubstituted alkynyl group having from 2 to 30 carbon atoms, more preferably from 2 to 10 carbon atoms, for example, an ethynyl group, a propargyl group), an aryl group (preferably a substituted or unsubstituted aryl group having from 6 to 30 carbon atoms, more preferably from 6 to 10 carbon atoms, for example, a phenyl group, a p-tolyl group, a naphthyl group), a heterocyclic group (preferably a monovalent group derived from a 5- or 6-membered, substituted or unsubstituted, aromatic or non-aromatic heterocyclic compound, by removing one hydrogen atom from it, more preferably a 5- or 6-membered aromatic heterocyclic group having from 3 to 30 carbon atoms, even more preferably having from 3 to 10 carbon atoms, for example, a 2-furyl group, a 2-thienyl group, a 2-pyrimidinyl group, a 2-benzothiazolyl group), a cyano, a hydroxyl group, a nitro group, a carboxyl group, an alkoxy group (preferably a substituted or unsubstituted alkoxy group having from 1 to 30 carbon atoms, more preferably from 1 to 10 carbon atoms, for example, a methoxy group, an ethoxy group, an isopropoxy group, a tert-butoxy group, an n-octyloxy group, a 2-methoxyethoxy group), an aryloxy group (preferably a substituted or unsubstituted aryloxy group having from 6 to 30 carbon atoms, more preferably from 6 to 10 carbon atoms, for example, a phenoxy group, a 2-methylphenoxy group, a 4-tert-butylphenoxy group, a 3-nitrophenoxy group, a 2-tetradecanoylaminophenoxy group), a silyloxy group (preferably a silyloxy group having from 3 to 20 carbon atoms, more preferably from 3 to 10 carbon atoms, for example, a trimethylsilyloxy group, a tert-butyldimethylsilyloxy group), a heterocyclic-oxy group (preferably a substituted or unsubstituted heterocyclic-oxy group having from 2 to 30 carbon atoms, more preferably from 2 to 10 carbon atoms, for example, a 1-phenyltetrazol-5-oxy group, a 2-tetrahydropyranyloxy group), an acyloxy group (preferably a formyloxy group, a substituted or unsubstituted alkylcarbonyloxy group having from 2 to 30 carbon atoms, more preferably from 2 to 10 carbon atoms, a substituted or unsubstituted arylcarbonyloxy group having from 6 to 30 carbon atoms, more preferably from 6 to 10 carbon atoms, for example, an acetyloxy group, a pivaloyloxy group, a stearoyloxy group, a benzoyloxy group, a p-methoxyphenylcarbonyloxy group), a carbamoyloxy group (preferably a substituted or unsubstituted carbamoyloxy group having from 1 to 30 carbon atoms, more preferably from 1 to 10 carbon atoms, for example, an N,N-dimethylcarbamoyloxy group, an N,N-diethylcarbamoyloxy group, a morpholinocarbonyloxy group, an N,N-di-n-octylaminocarbonyloxy group, an N,N-n-octylcarbamoyloxy group), an alkoxycarbonyloxy group (preferably a substituted or unsubstituted alkoxycarbonyloxy group having from 2 to 30 carbon atoms, more preferably from 2 to 10 carbon atoms, for example, a methoxycarbonyloxy group, an ethoxycarbonyloxy group, a tert-butoxycarbonyloxy group, an n-octylcarbonyloxy group), an aryloxycarbonyloxy group (preferably a substituted or unsubstituted aryloxycarbonyloxy group having from 7 to 30 carbon atoms, more preferably from 7 to 10 carbon atoms, for example, a phenoxycarbonyloxy group, a p-methoxyphenoxycarbonyloxy group, a p-n-hexadecyloxyphenoxycarbonyloxy group), an amino group (preferably, an amino group, a substituted or unsubstituted alkylamino group having from 1 to 30 carbon atoms, more preferably from 1 to 10 carbon atoms, or a substituted or unsubstituted anilino group having 6 to 30 carbon atoms, more preferably from 6 to 10 carbon atoms, for example, a methylamino group, a dimethylamino group, an anilino group, an N-methylanilino group, a diphenylamino group), an acylamino group (preferably a formylamino group, a substituted or unsubstituted alkylcarbonylamino group having from 1 to 30 carbon atoms, more preferably from 1 to 10 carbon atoms, or a substituted or unsubstituted arylcarbonylamino group having from 6 to 30 carbon atoms, more preferably from 6 to 10 carbon atoms, for example, an acetylamino group, a pivaloylamino group, a lauroylamino group, a benzoylamino group), an aminocarbonylamino group (preferably a substituted or unsubstituted aminocarbonylamino group having from 1 to 30 carbon atoms, more preferably from to 10 carbon atoms, for example, a carbamoylamino group, an N,N-dimethylaminocarbonylamino group, an N,N-diethylaminocarbonylamino group, a morpholinocarbonylamino group), an alkoxycarbonylamino group (preferably a substituted or unsubstituted alkoxycarbonylamino group having from 2 to 30 carbon atoms, more preferably from 2 to 10 carbon atoms, for example, a methoxycarbonylamino group, an ethoxycarbonylamino group, a tert-butoxycarbonylamino group, an n-octadecyloxycarbonylamino group, an N-methyl-methoxycarbonylamino group), an aryloxycarbonylamino group (preferably a substituted or unsubstituted aryloxycarbonylamino group having from 7 to 30 carbon atoms, more preferably from 7 to 10 carbon atoms, for example, a phenoxycarbonylamino group, a p-chlorophenoxycarbonylamino group, an m-n-octyloxyphenoxycarbonylamino group), a sulfamoylamino group (preferably a substituted or unsubstituted sulfamoylamino group having from 0 to 30 carbon atoms, more preferably from 0 to 10 carbon atoms, for example, a sulfamoylamino group, an N,N-dimethylaminosulfonylamino group, an N-n-octylaminosulfonylamino group), an alkyl and arylsulfonylamino group (preferably a substituted or unsubstituted alkylsulfonylamino group having from 1 to 30 carbon atoms, more preferably from 1 to 10 carbon atoms, or a substituted or unsubstituted arylsulfonylamino group having from 6 to 30 carbon atoms, more preferably from 6 to 10 carbon atoms, for example, a methylsulfonylamino group, a butylsulfonylamino group, a phenylsulfonylamino group, a 2,3,5-trichlorophenylsulfonylamino group, a p-methylphenylsulfonylamino group), a mercapto group, an alkylthio group (preferably a substituted or unsubstituted alkylthio group having from 1 to 30 carbon atoms, more preferably from 1 to 10 carbon atoms, for example, a methylthio group, an ethylthio group, an n-hexadecylthio group), an arylthio group (preferably a substituted or unsubstituted arylthio group having from 6 to 30 carbon atoms, more preferably from 6 to 10 carbon atoms, for example, a phenylthio group, a p-chlorophenylthio group, a m-methoxyphenylthio group), a heterocyclic-thio group (preferably a substituted or unsubstituted heterocyclic-thio group having from 2 to 30 carbon atoms, more preferably from 2 to 10 carbon atoms, for example, a 2-benzothiazolylthio group, a 1-phenyltetrazol-5-ylthio group), a sulfamoyl group (preferably a substituted or unsubstituted sulfamoyl group having from 0 to 30 carbon atoms, more preferably from 0 to 10 carbon atoms, for example, an N-ethylsulfamoyl group, an N-(3-dodecyloxypropyl)sulfamoyl group, an N,N-dimethylsulfamoyl group, an N-acetylsulfamoyl group, an N-benzoylsulfamoyl group, an N—(N'-phenylcarbamoyl)sulfamoyl group), a sulfo group, an alkyl and arylsulfinyl group (preferably a substituted or unsubstituted alkylsulfinyl group having from 1 to 30 carbon atoms, more preferably from 1 to 10 carbon atoms, or a substituted or unsubstituted arylsulfinyl group having from 6 to 30 carbon atoms, more preferably from 6 to 10 carbon atoms, for example, a methylsulfinyl group, an ethylsulfinyl group, a phenylsulfonyl group, a p-methylphenylsulfinyl group), an alkyl and arylsulfonyl group (preferably a substituted or unsubstituted alkylsulfonyl group having from 1 to 30 carbon atoms, more preferably from 1 to 10 carbon atoms, or a substituted or unsubstituted arylsulfonyl group having from 6 to 30 carbon atoms, more preferably from 6 to 10 carbon atoms, for example, a methylsulfonyl group, an ethylsulfonyl group, a phenylsulfonyl group, a p-methylphenylsulfonyl group), an acyl group (preferably a formyl group, a substituted or unsubstituted alkylcarbonyl group having from 2 to 30 carbon atoms, more preferably from 2 to 10 carbon atoms, or a substituted or unsubstituted arylcarbonyl group having from 7 to 30 carbon atoms, more preferably from 7 to 10 carbon atoms, for example, an acetyl group, a pivaloyl group, a benzoyl group), an aryloxycarbonyl group (preferably a substituted or unsubstituted aryloxycarbonyl group having from 7 to 30 carbon atoms, more preferably from 7 to 10 carbon atoms, for example, a phenoxycarbonyl group, an o-chlorophenoxycarbonyl group, an m-nitrophenoxycarbonyl group, a p-tert-butylphenoxycarbonyl group), an alkoxycarbonyl group (preferably a substituted or unsubstituted alkoxycarbonyl group having from 2 to 30 carbon atoms, more preferably from 2 to 10 carbon atoms, for example, a methoxycarbonyl group, an ethoxycarbonyl group, a tert-butoxycarbonyl group, an n-octadecyloxycarbonyl group), a carbamoyl group (preferably a substituted or unsubstituted carbamoyl group having from 1 to 30 carbon atoms, more preferably from 1 to 10 carbon atoms, for example, a carbamoyl group, an N-methylcarbamoyl group, an N,N-dimethylcarbamoyl group, an N,N-di-n-octylcarbamoyl group, an N-(methylsulfonyl)carbamoyl group), an aryl and heterocyclic-azo group (preferably a substituted or unsubstituted arylazo group having from 6 to 30 carbon group, more preferably from 6 to 10 carbon atoms, or a substituted or unsubstituted heterocyclic-azo group having from 3 to 30 carbon atoms, more preferably from 3 to 10 carbon atoms, for example, a phenylazo group, a p-chlorophenylazo group, a 5-ethylthio-1,3,4-thiadiazol-2-ylazo group), an imide group (preferably an N-succinimide group, an N-phthalimide group), a phosphino group (preferably a substituted or unsubstituted phosphino group having from 2 to 30 carbon atoms, more preferably from 2 to 10 carbon atoms, for example, a dimethylphosphino group, a diphenylphosphino group, a methylphenoxyphosphino group), a phosphinyl group (preferably a substituted or unsubstituted phosphinyl group having from 2 to 30 carbon atoms, more preferably from 2 to 10 carbon atoms, for example, a phosphinyl group, a dioctyloxyphosphinyl group, a diethoxyphosphinyl group), a phosphinyloxy group (preferably a substituted or unsubstituted phosphinyloxy group having from 2 to 30 carbon atoms, more preferably from 2 to 10 carbon atoms, for example, a diphenoxyphosphinyloxy group, a dioctyloxyphosphinyloxy group), a phosphinylamino group (preferably a substituted or unsubstituted phosphinylamino group having from 2 to 30 carbon atoms, more preferably from 2 to 10 carbon atoms, for example, a dimethoxyphosphinylamino group, a dimethylaminophosphinylamino group), a silyl group (preferably a substituted or unsubstituted silyl group having from 3 to 30 carbon atoms, more preferably from 3 to 10 carbon atoms, for example, a trimethylsilyl group, a tert-butyldimethylsilyl group, a phenyldimethylsilyl group).

Of the above substituents, those having a hydrogen atom may be further substituted with any of the above-mentioned substituents by removing the hydrogen atom. Examples of the functional group are an alkylcarbonylaminosulfonyl group, an arylcarbonylaminosulfonyl group, an alkylsulfonylaminocarbonyl group, an arylsulfonylaminocarbonyl group. Concretely, they include a methylsulfonylaminocarbonyl group, a p-methylphenylsulfonylaminocarbonyl group, an acetylaminosulfonyl group, a benzoylaminosulfonyl group.

Among those, a halogen atom, alkyl group, aryl group, alkoxy group, cyano, hydroxyl, carboxyl and arylsulfonyl group are more preferable; and an alkyl group, alkoxy group, hydroxy, carboxyl and phenylsulfonyl are even more preferable.

The compounds having two or more substituents which are same or different from each other may be used. If possible, they may bond each other to form a ring (including the condensed ring of the ring contained in each of the formulas).

The molecular-weight of the wavelength dispersion characteristics regulator is preferably from 100 to 5000, more preferably from 150 to 3000, or even more preferably from 200 to 2000.

(Merocyanine Compound)

Examples of the wavelength dispersion characteristics regulator which can be used in the invention include merocyanine compounds represented by formula (IX). Among those, the merocyanine compounds whose λmax satisfies the relation of 370 nm≤λmax≤400 nm are preferable.

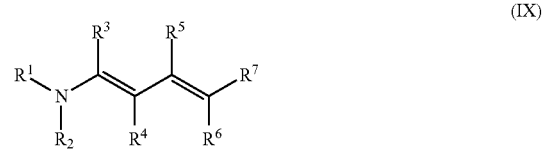

(IX)

In formula (IX), N represents a nitrogen atom; and $R^1$-$R^7$ respectively represents a hydrogen atom or substituent. In formula (IX) the substituents are preferably combined so that the compound has the molecular long axis along the horizontal direction (right and left direction) in plane of paper.

Examples of the substituent represented by $R^1$-$R^7$ include those exemplified above as the substituent represented by $R^{11}$ or the like in formula (I).

In formula (IX), preferably, $R^1$ and $R^2$ respectively represent a substituted or non-substituted alkyl group, or may bond to each other to form a ring containing a nitrogen atom; $R^6$ and $R^7$ respectively represent a substituent having a Hammett's σp value of 0.2 or more, or bond to each other to form a cyclic active methylene structure; and $R^3$, $R^4$ and $R^5$ are preferably hydrogen atoms.

The alkyl represented by $R^1$ or $R^2$ is preferably a $C_{1-20}$ alkyl (more preferably $C_{1-10}$ alkyl, or even more preferably $C_{1-5}$ alkyl) such as methyl, ethyl and propyl. The alkyl may be a linear or branched chain. The alkyl may have at least one substituent. Examples of the substituent include a halogen atom (e.g., fluorine atom, chlorine atom, bromine atom, iodine atom), an aryl group (e.g., phenyl, naphthyl), a cyano, a carboxyl group, an alkoxycarbonyl group (e.g., methoxycarbonyl), an aryloxycarbonyl group (e.g., phenoxycarbonyl), a substituted or unsubstituted carbamoyl group (e.g., carbamoyl, N-phenylcarbamoyl, N,N-dimethylcarbamoyl), an alkylcarbonyl group (e.g., acetyl), an arylcarbonyl group (e.g., benzoyl), a nitro group, a substituted or unsubstituted amino group (e.g., amino, dimethylamino, anilino), an acylamino group (e.g., acetamide, ethoxycarbonylamino), a sulfonamide group (e.g., methanesulfonamide), an imide group (e.g., succinimide, phthalimide), an imino group (e.g., benzylideneamino), a hydroxyl group, an alkoxy group (e.g., methoxy), an aryloxy group (e.g., phenoxy), an acyloxy group (e.g., acetoxy), an alkylsulfonyloxy group (e.g., methanesulfonyloxy), an arylsulfonyloxy group (e.g., benzenesulfonyloxy), a sulfo group, a substituted or unsubstituted sulfamoyl group (e.g., sulfamoyl, N-phenylsulfamoyl), an alkylthio group (e.g., methylthio), an arylthio group (e.g., phenylthio), an alkylsulfonyl group (e.g., methanesulfonyl), an arylsulfonyl group (e.g., benzenesulfonyl), a heterocyclic group (e.g., pyridyl, morpholino), etc. The substituent may be further substituted. In case where the compound has multiple substituents, they may be the same or different, or the substituents may bond to form a ring.

$R^1$ and $R^2$ may bond to each other to form a ring containing the nitrogen atom. The ring is preferably a saturated ring, more preferably a saturated 6-membered ring, even more preferably a piperidine ring.

Preferably, $R^1$ and $R^2$ respectively represent a non-substituted alkyl or an alkyl substituted with a cyano, alkoxycarbonyl or phenyl group or they preferably bond to each other to form a piperidine ring.

$R^6$ and $R^7$ each may be a substituent having a Hammett substituent constant σp of at least 0.2, or $R^6$ and $R^7$ may bond to each other to form a ring. The Hammett substituent constant σp is described. The Hammett equation is a rule of thumb proposed by L. P. Hammett in 1935 for qualitatively discussing the influence of a substituent on the reaction or equilibrium of benzene derivatives, and now its reasonability is widely accepted in the art. The substituent constant developed by the Hammett equation includes σp and σm; and these data are found in a large number of general literature. For example, these are described in detail in J. A. Dean "Lange's Handbook of Chemistry", Ver. 12, 1979 (McGraw-Hill); "Field of Chemistry", extra edition, No. 122, pp. 96-103, 1979 (Nanko-do); Chem. Rev., 1991, Vol. 91, pp. 165-195, etc. The substituent having a Hammett substituent constant σp of at least 0.2 in the present invention is an electron-attractive group. σp of the substituent is preferably at least 0.25, more preferably at least 0.3, even more preferably at least 0.35.

Examples of $R^6$ and $R^7$ include a cyano group (0.66), a carboxyl group (—COOH: 0.45), an alkoxycarbonyl group (—COOMe: 0.45), an aryloxycarbonyl group (—COOPh: 0.44), a carbamoyl group (—CONH$_2$: 0.36), an alkylcarbonyl group (—COMe: 0.50), an arylcarbonyl group (—COPh: 0.43), an alkylsulfonyl group (—SO$_2$Me: 0.72), or an arylsulfonyl group (—SO$_2$Ph: 0.68), etc. In this description, Me means a methyl group, Ph means a phenyl group. The data in the parenthesis are the σp value of the typical substituent, as extracted from Chem., Rev., 1991, Vol. 91, pp. 165-195.

$R^6$ and $R^7$ may bond to each other to form a cyclic active methylene compound structure. "Active methylene compound" means a series of compounds each having a methylene group (—CH$_2$—) sandwiched between two electron-attractive groups. Preferably, the carbon atom to which $R^6$ and $R^7$ bond is active methylene.

Of the above merocyanine compounds, those of the following formula (IXa) are preferred.

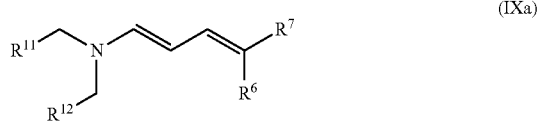

(IXa)

In the formula (IXa), $R^{11}$ and $R^{12}$ each represent an alkyl group, an aryl group, a cyano group or —COOR$^{13}$, or they bond to each other to form a ring containing the nitrogen atom; $R^6$ and $R^7$ each represent a cyano group, —COOR$^{14}$, or —SO$_2$R$_{15}$, or they bond to each other to form any of the following cyclic active methylene structures (IXa-1) to (IXa-6); $R^{13}$, $R^{14}$ and $R^{15}$ each represent an alkyl group, an aryl group, or a heterocyclic group.

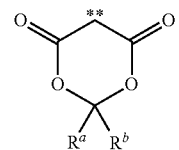

(IXa-1)

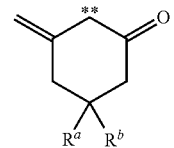

(IXa-2)

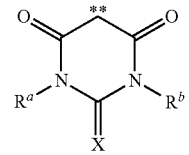

(IXa-3)

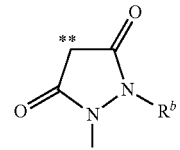

(IXa-4)

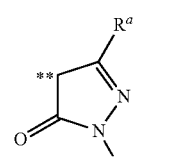

(IXa-5)

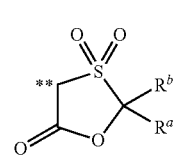

(IXa-6)

In the formulae (IXa-1)-(IXa-6), "**" indicates the position at which the group bonds to the formula (IXa); $R^a$ and $R^b$ each represent a hydrogen atom, or a $C_1$-$C_{20}$ (preferably $C_1$-$C_{10}$, more preferably $C_1$-$C_5$) alkyl group; X represents an oxygen atom or a sulfur atom.

The alkyl group to be represented by $R^{11}$ and $R^{12}$ may be unsubstituted or may have a substituent. Examples of the substituent are the same as those of the substituent to be represented by $R^1$ and $R^2$. The alkyl group preferably has from 1 to 20 carbon atoms, more preferably from 1 to 15 carbon atoms, even more preferably from 1 to 6 carbon atoms.

The aryl group to be represented by $R^{11}$ and $R^{12}$ may be unsubstituted or may have a substituent. Examples of the substituent are the same as those of the substituent to be represented by $R^1$ and $R^2$. The aryl group is preferably a phenyl group, more preferably an unsubstituted phenyl group.

In —COOR$^{13}$ represented by $R^{11}$ or $R^{12}$, $R^{13}$ is preferably an alkyl group, more preferably an unsubstituted alkyl group. The alkyl group preferably has from 1 to 20 carbon atoms, more preferably from 1 to 15 carbon atoms, even more preferably from 1 to 6 carbon atoms.

The ring to be formed by $R^{11}$ and $R^{12}$ bonding to each other is preferably a saturated ring, more preferably a 6-membered saturated ring, even more preferably a piperidine ring.

Preferably, $R^{11}$ and $R^{12}$ are both a cyano group or an unsubstituted phenyl group, or they bond to each other to form a piperidine group, and even more preferably, the two are both a cyano group or an unsubstituted phenyl group.

In —COOR$^{14}$ represented by $R^6$ or $R^7$, $R^{14}$ is preferably an alkyl group, more preferably an unsubstituted alkyl group. The alkyl group preferably has from 1 to 20 carbon atoms, more preferably from 5 to 15 carbon atoms.

In —SO$_2$R$^{15}$ represented by $R^6$ or $R^7$, $R^{15}$ is preferably an aryl group, more preferably a phenyl group.

Of examples of the cyclic active methylene structure to be formed by $R^6$ and $R^7$ bonding to each other, preferred are those of the formula (IXa-1) or (IXa-4), and more preferred are those of the formula (IXa-1).

Preferably, at least one of $R^6$ and $R^7$ is a cyano group, or they bond to each other to form any of the above-mentioned, cyclic active methylene structure (IXa-1) to (IXa-6); more preferably, at least one of these is a cyano group, or they bond to each other to form the above-mentioned, cyclic active methylene structure (IXa-1) or (IXa-4); and even more preferably, both the two are a cyano group, or bond to each other to form the above-mentioned, cyclic active methylene structure (IXa-1) or (IXa-4).

Preferred examples of the merocyanine compound of the formula (I) include compounds of the following formulae (IXa-a), (IXa-b), (IXa-c) and (IXa-d). More preferred are the compounds of the following formulae (IXa-a), (IXa-b) and (IXa-d).

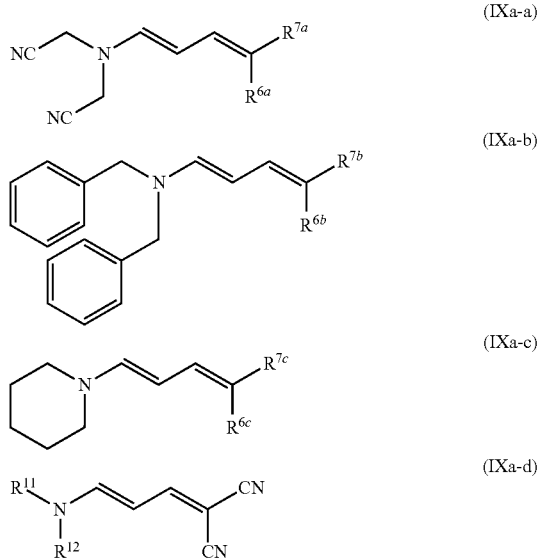

In formula (IXa-a), $R^{6a}$ and $R^{7a}$ have the same meanings as $R^6$ and $R^7$ in formula (IXa), respectively, and their preferred range is also the same as that of the latter. Above all, compounds in which the substituents form any of the cyclic active methylene structures (IXa-1) to (IXa-6) are preferred from the viewpoint of the ability thereof to prevent discoloration and to secure lightfastness.

In formula (Ixa-b), $R^{6b}$ and $R^{7b}$ have the same meanings as $R^6$ and $R^7$ in formula (IXa), respectively, and their preferred range is also the same as that of the latter. Above all, compounds in which the substituents are both a cyano group, or form any of the cyclic active methylene structures (IXa-1) to (IXa-6) (more preferably, (IXa-1) or (IXa-4), even more preferably (IXa-1)) are preferred from the viewpoint of the ability thereof to prevent discoloration and to secure lightfastness. Especially preferred are the compounds where the two substituents are both a cyano group.

In formula (Xa-c), $R^{6c}$ and $R^{7c}$ have the same meanings as $R^6$ and $R^7$ in formula (IXa), respectively, and their preferred range is also the same as that of the latter. Above all, compounds in which one of the substituents is a cyano group and the other is —COOR$^{14}$ (the definition and the preferred range of $R^{14}$ are the same as above), or the substituents form any of the cyclic active methylene structures (IXa-1) to (IXa-6) are preferred.

In formula (Xa-d), $R^{11}$ and $R^{12}$ have the same meanings as those in formula (IXa), respectively, and their preferred range is also the same as that of the latter.

The compound represented by formula (IXa-a), (IXa-b), (IXa-c), or (IXa-d) has a function improving the lightfastness of the compound represented by formula (IX); and using the compound represented by any one of formulas (IXa-a), (IXa-b), (IXa-c) and (IXa-d) in combination with the merocyanine compound represented by formula (IX) or (IXa) is preferable in terms of the improvement of the lightfastness. The ratio of mixing the compound represented by formula (Ix) and the compound represented by formula (IXa-a), (IXa-b), (IXa-c) or (IXa-d) is preferably from 10/90 to 90/10, more preferably from 30/70 to 70/30, or even more preferably from 40/60 to 60/40.

An amount of the wavelength dispersion characteristics regulator is preferably from 1.0 to 20% by mass, more preferably from 1.0 to 10% by mass, even more preferably from 1.5 to 8.0% by mass, or even much more preferably from 2.0 to 6.0% by mass, with respect to the amount of the polymer material.

Preferable examples of the compound represented by formula (IXa-a), (IXa-b), (IXa-c) or (IXa-d) include, but are not limited to, those described below.

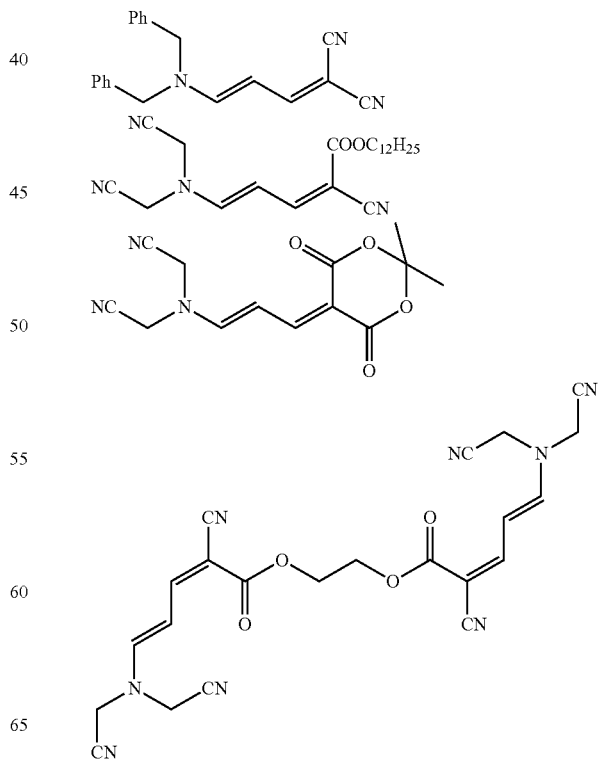

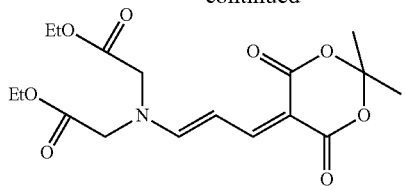

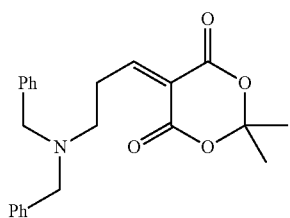

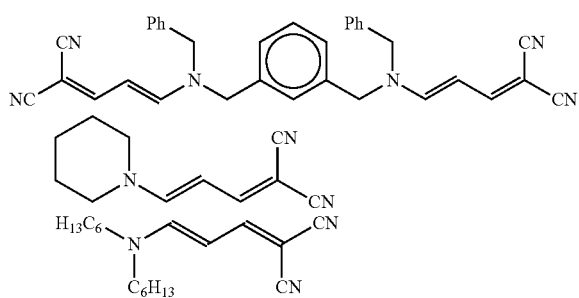

The inner or outer layer (especially inner layer) may further contain a triazine compound represented by formula (X).

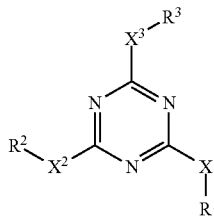

In the formula, $X^1$ represents —$NR^4$—, —O— or —S—; $X^2$ represents —$NR^5$—, —O— or —S—; $X^3$ represents —$NR^6$—, —O— or —S—; $R^1$, $R^2$, and $R^3$ respectively represent an alkyl group, an alkenyl group, an aryl group or a heterocyclic group; and $R^4$, $R^5$ and $R^6$ respectively represent a hydrogen atom, an alkyl group, an alkenyl group, an aryl group or a heterocyclic group.

In the formula, $R^1$, $R^2$, and $R^3$ respectively represent an alkyl group, an alkenyl group, an aryl group or a heterocyclic group, and preferably represent an aryl group or a heterocyclic group. The aryl group represented by formula $R^1$, $R^2$ or $R^3$ is preferably phenyl or naphthyl, or more preferably phenyl.

In the formula, $R^1$, $R^2$, and $R^3$ may have at least one substituent in the aryl or heterocyclic group. Examples of the substituent include halogen atoms, hydroxyl, cyano, nitro, carboxyl, alkyls, alkenyls, aryls, alkoxys, alkenyloxys, aryloxys, acyloxys, alkoxycarbonyls, alkenyloxycarbonyls, aryloxycarbonyls, sulfamoyls, alkyl-substituted sulfamoyls, alkenyl-substituted sulfamoyls, aryl-substituted sulfamoyls, sulfonamides, carbamoyls, alkyl-substituted carbamoyls, alkenyl-substituted carbamoyls, aryl-substituted carbamoyls, amides, alkylthios, alkenylthios, arylthios and acyls.

The heterocyclic group represented $R^1$, $R^2$ or $R^3$ is preferably aromatic. Usually, an aromatic heterocycle belongs to unsaturated heterocycles, and the heterocycle in the heterocyclic group is preferably selected from unsaturated heterocycles having the maximum number of double bonds. The heterocycle is preferably a 5-, 6- or 7-membered ring, more preferably a 5- or 6-membered ring, or even more preferably 6-membered ring. The hetero atom embedded in the heterocycle is preferably a nitrogen atom. Examples of the aromatic heterocycle include pyridine rings (as the heterocyclic group, 2-pyridyl or 4-pyridyl is preferable). The heterocyclic group may have at least one substituent. Examples of the substituent are same as those exemplified above. These substituents may have at least one substituent selected from them.

The alkyl represented by $R^4$, $R^5$ or $R^6$ may be a cycloalkyl or chain-like alkyl; the chain-like alkyl is preferable; and the linear chain-like alkyl is preferred to the branched chain-like alkyl. The number of carbon atoms in the alkyl is preferably from 1 to 30, more preferably from 1 to 20, even more preferably from 1 to 8, or even much more preferably from 1 to 6. The alkyl may have at least one substituent. Examples of the substituent include halogen atoms, alkoxyls such as methoxy and ethoxy, and acyloxys such as acryloyloxy and methacryloyloxy.

The alkenyl represented by $R^4$, $R^5$ or $R^6$ may be a cycloalkenyl or chain-like alkenyl; the chain-like alkenyl is preferable; and the linear chain-like alkenyl is preferred to the branched chain-like alkenyl. The number of carbon atoms in the alkenyl is preferably from 2 to 30, more preferably from 2 to 20, even more preferably from 2 to 8, or even much more preferably from 2 to 6. The alkenyl may have at least one substituent. Examples of the substituent are same as those exemplified above as the substituent of the alkyl.

The aryl or heterocyclic group represented by $R^4$, $R^5$ or $R^6$ is defined same as that represented by $R^1$, $R^2$ or $R^3$; and the preferable examples are same as those of that represented by $R^1$, $R^2$ or $R^3$. The aryl or heterocyclic group may have at least one substituent, and examples of the substituent include those exemplified above as the substituent of the aryl or heterocyclic group represented by $R^1$, $R^2$ or $R^3$.

Preferable examples of the triazine compound represented by formula (X) include, but are not limited to, those described below.

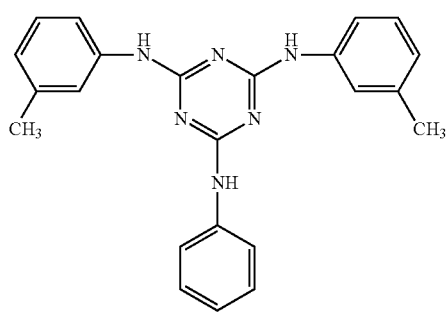

I-(1)

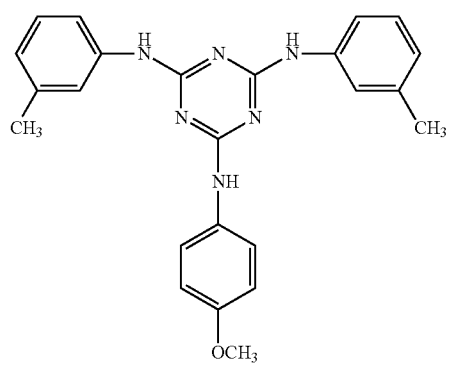
I-(2)
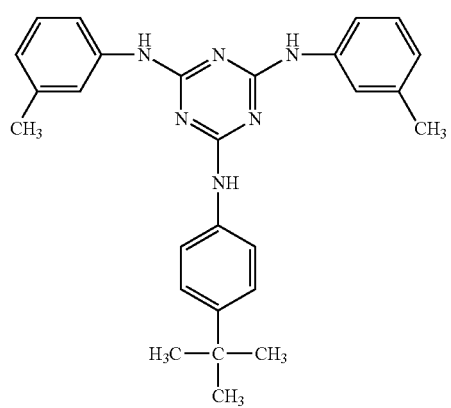
I-(3)
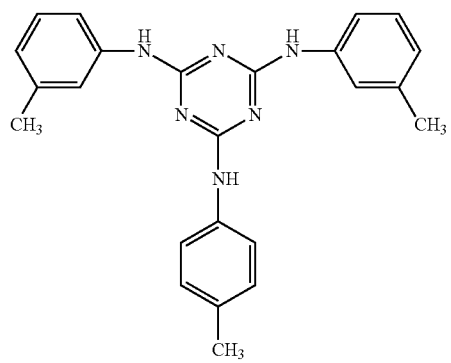
I-(4)
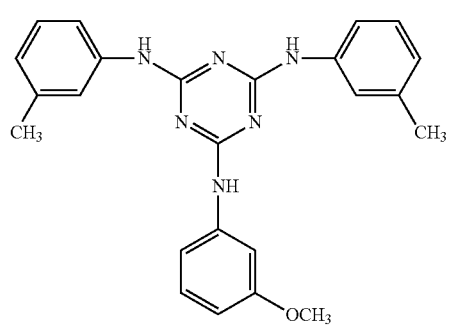
I-(5)
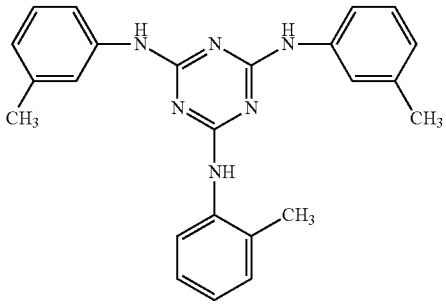
I-(6)
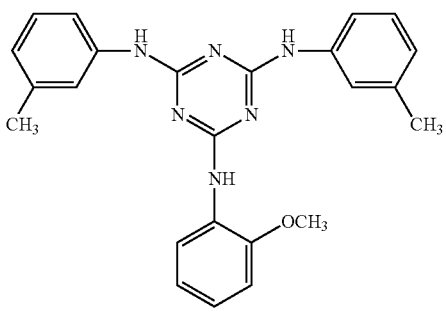
I-(7)
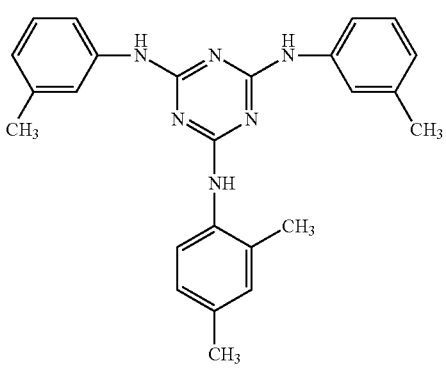
I-(8)
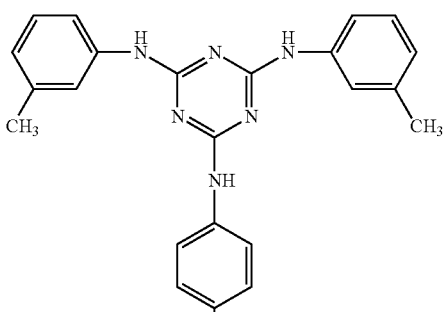
I-(9)
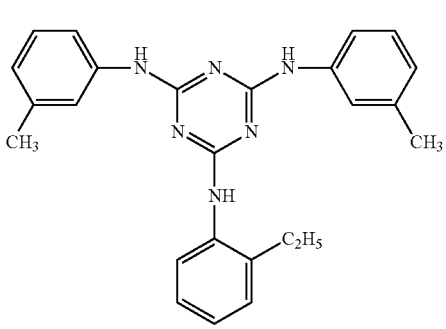
I-(10)

I-(11) 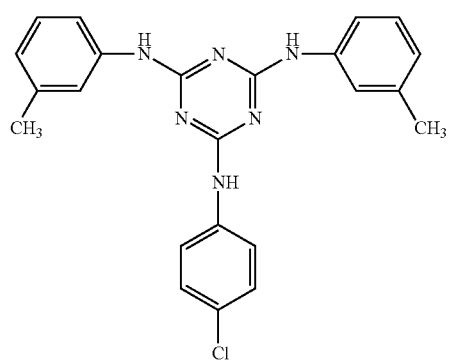
I-(12) 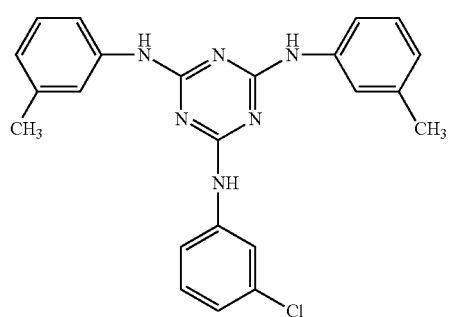
I-(13) 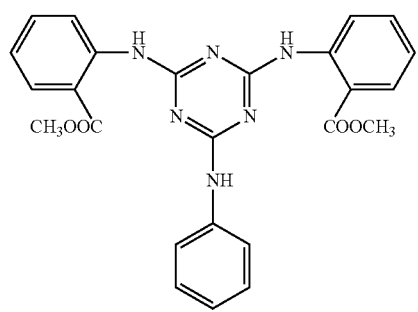
I-(14) 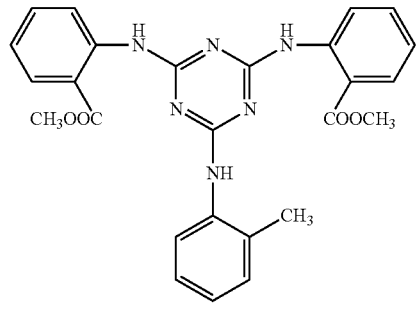
I-(15) 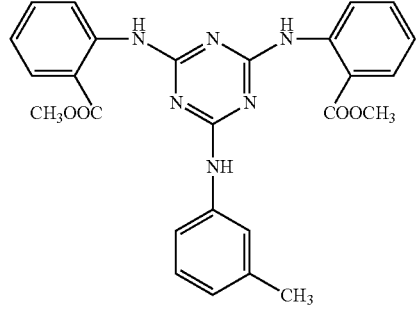
I-(16) 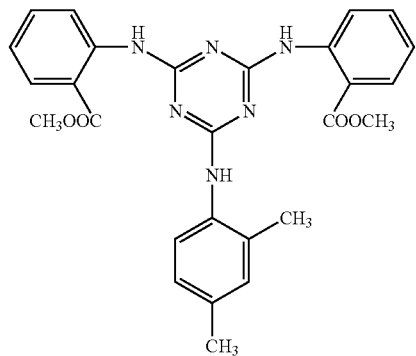
I-(17) 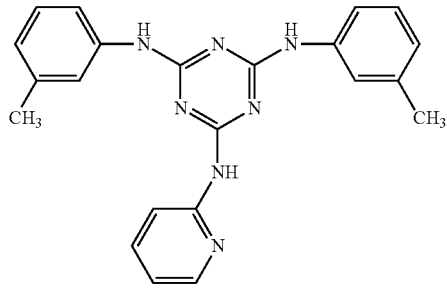
I-(18) 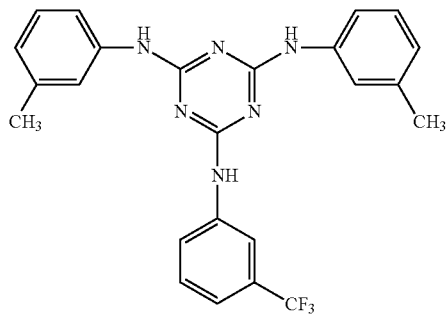
I-(19) 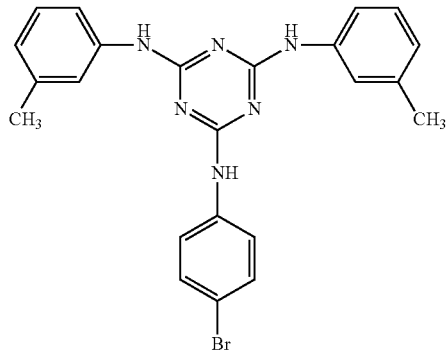
I-(20) 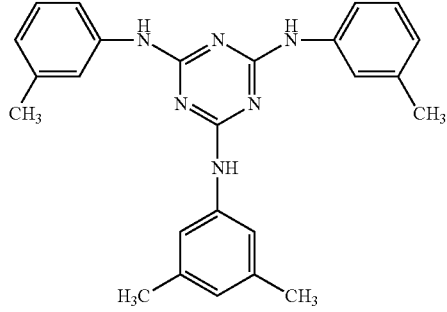

I-(21)
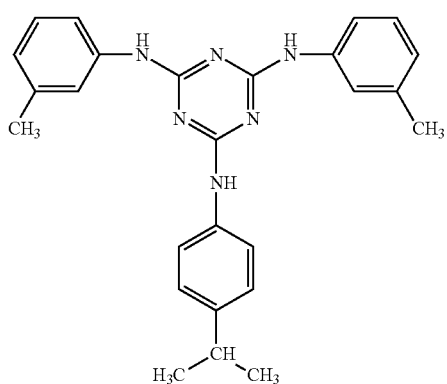
I-(22)
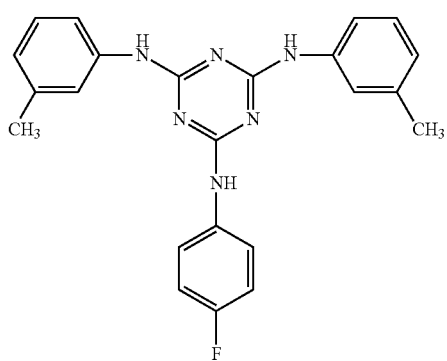
I-(23)
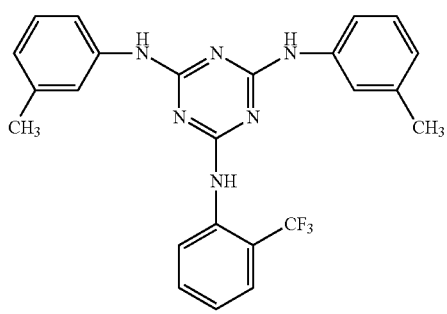
I-(24)
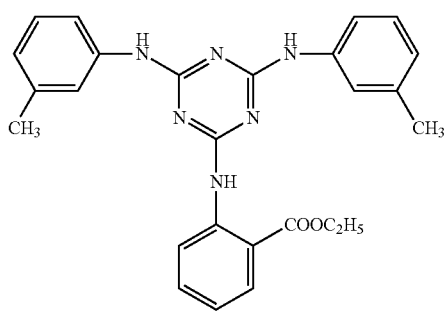
I-(25)
I-(26)
I-(27)
I-(28)

I-(29)
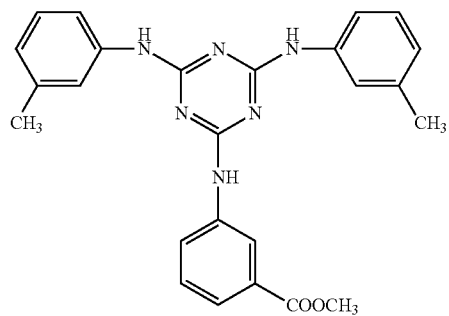
I-(30)
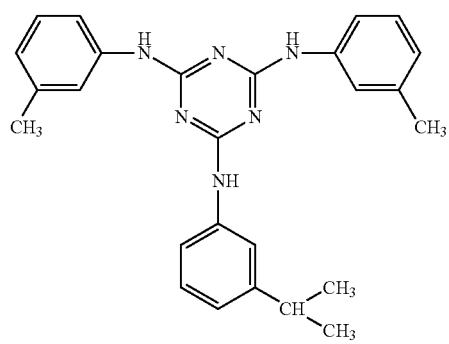
I-(31)
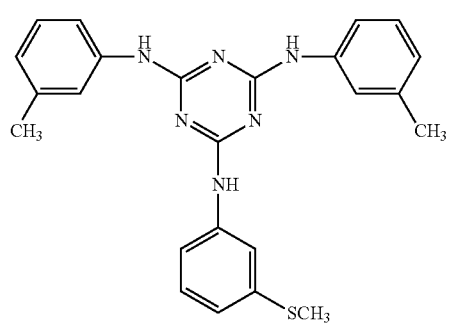
I-(32)
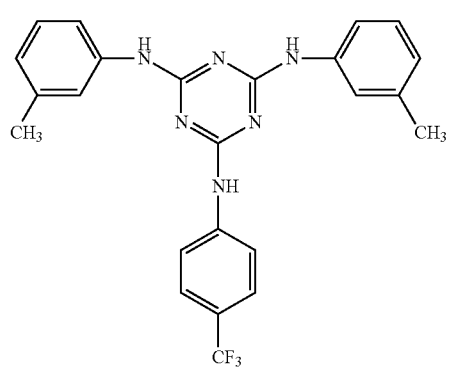
I-(33)
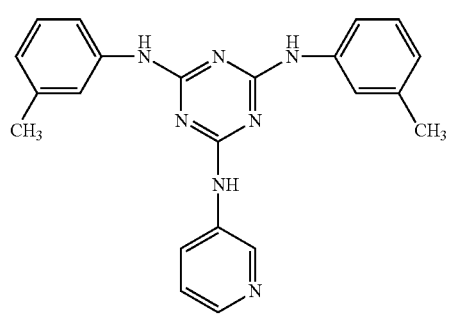
I-(34)
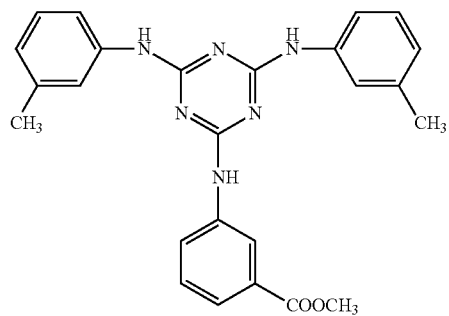
I-(35)
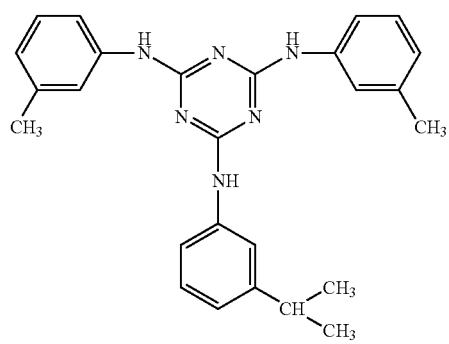
I-(36)
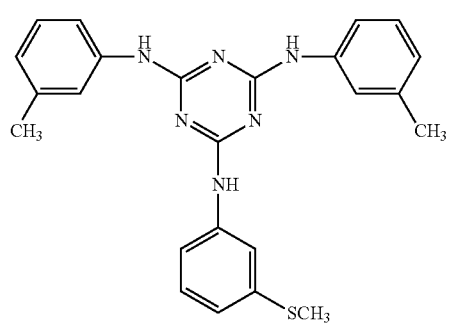
I-(37)
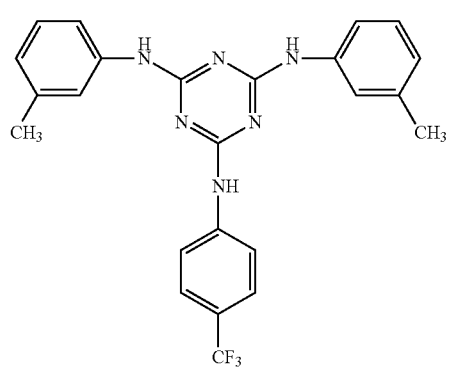
I-(38)
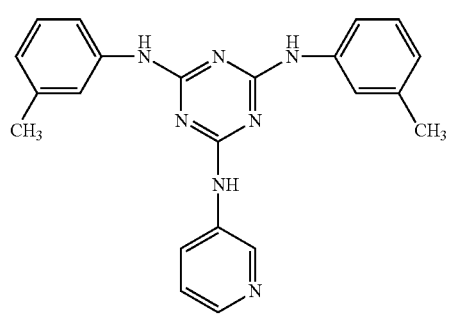

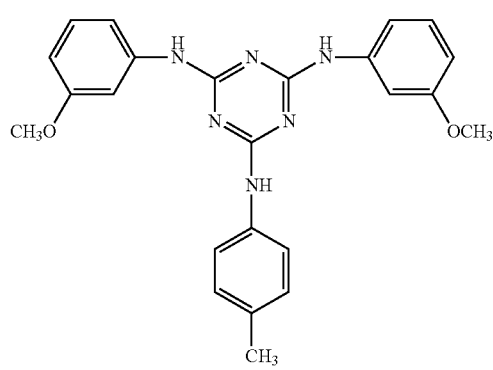
I-(39)
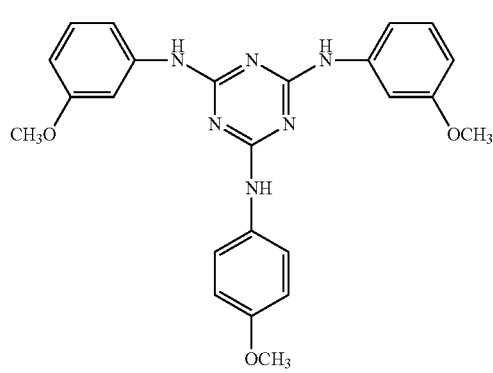
I-(40)
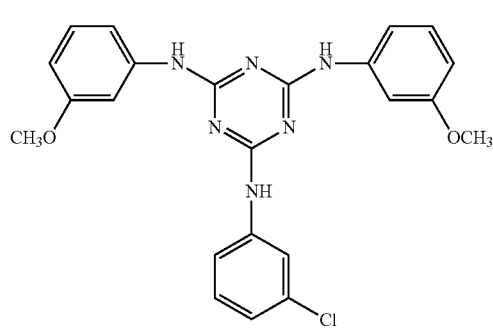
I-(41)
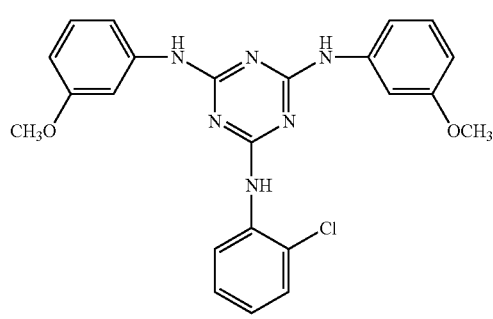
I-(42)
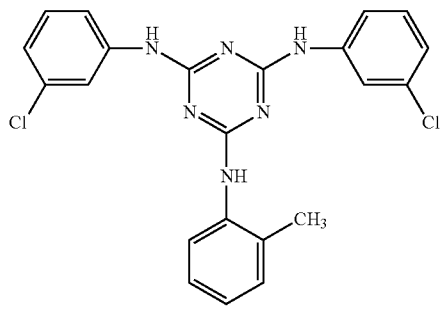
I-(43)
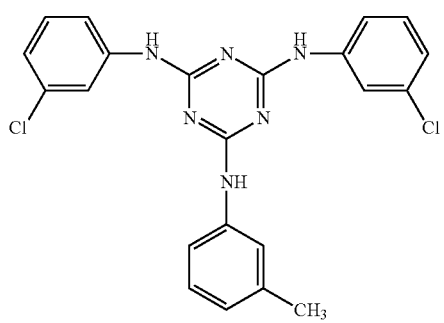
I-(44)
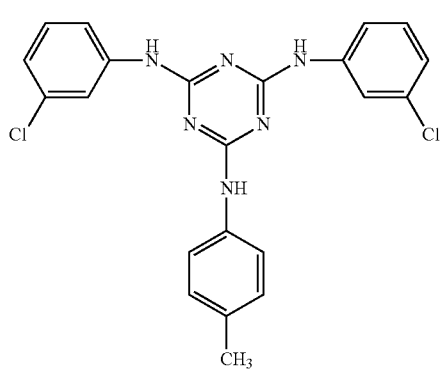
I-(45)
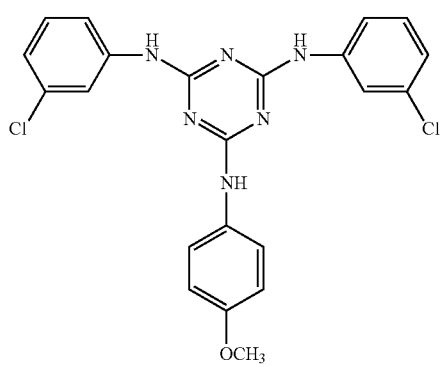
I-(46)

I-(47) 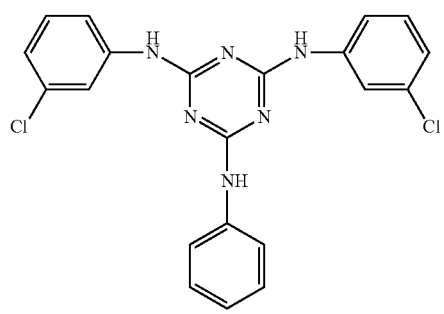
I-(52) 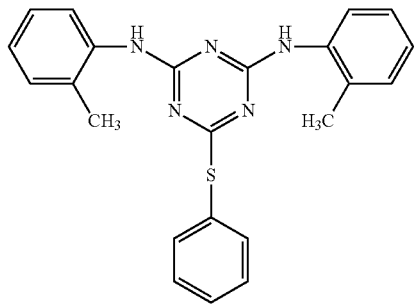
I-(48) 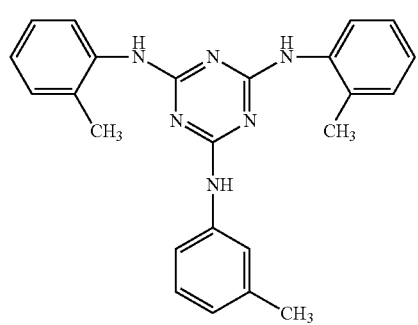
II-(1) 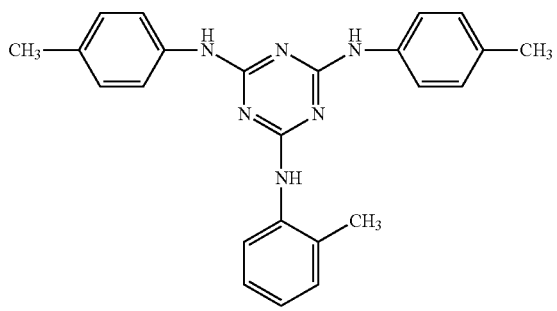
I-(49) 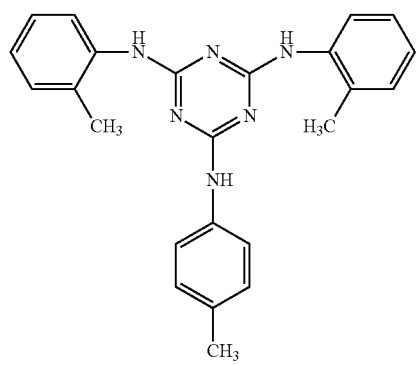
II-(2) 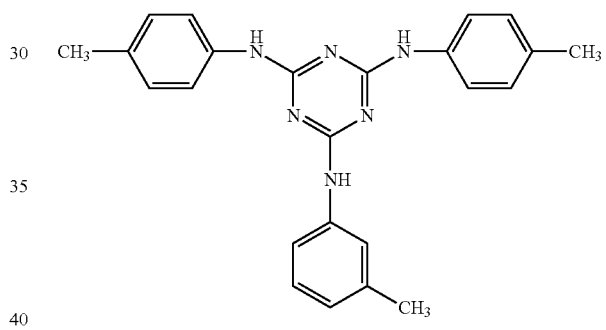
I-(50) 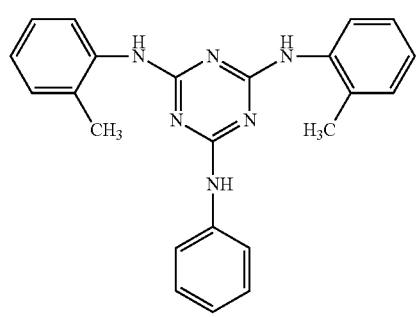
II-(3) 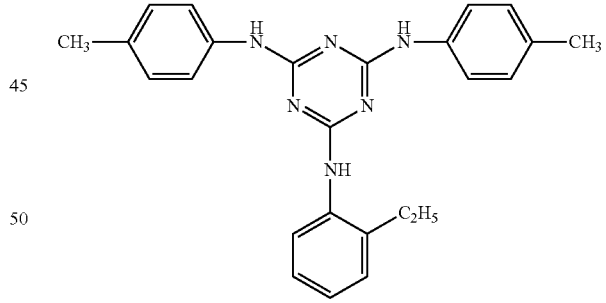
I-(51) 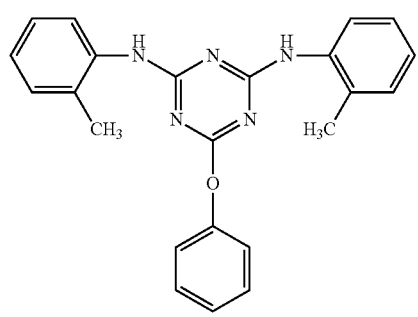
II-(4) 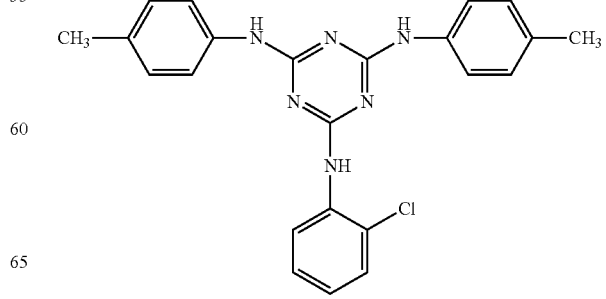

II-(5)
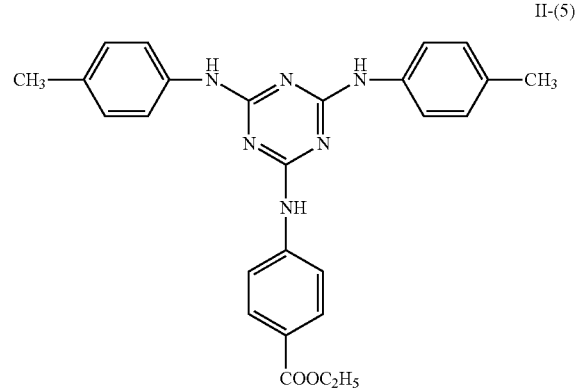
II-(6)
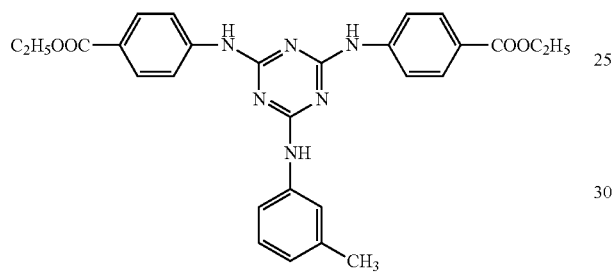
II-(7)
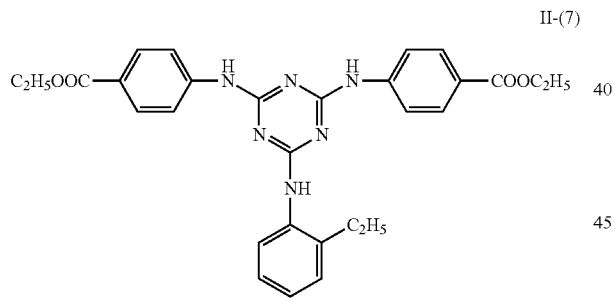
II-(8)
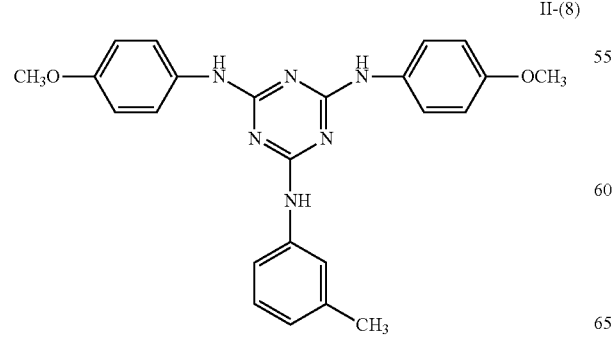
II-(9)
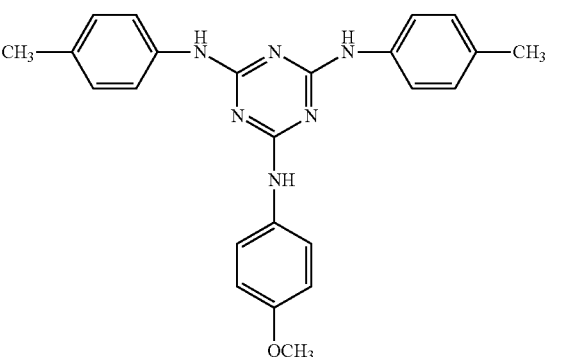
III-(1)
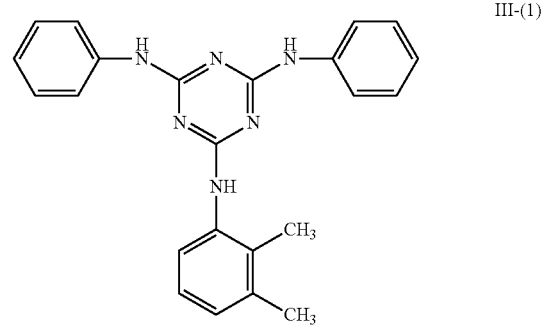
III-(2)
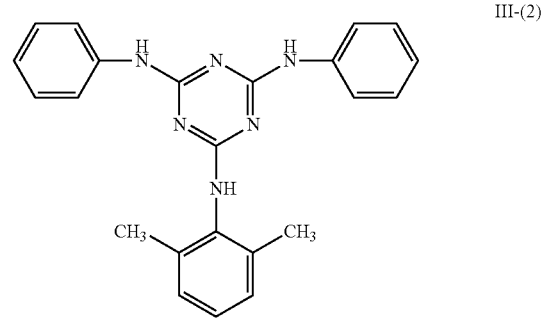
III-(3)
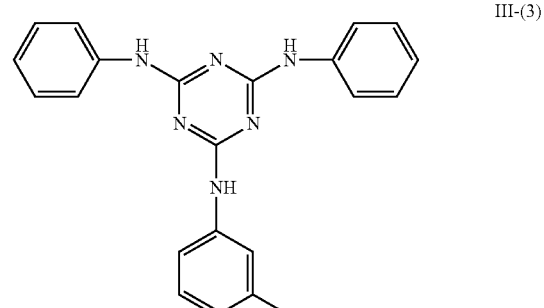
III-(4)
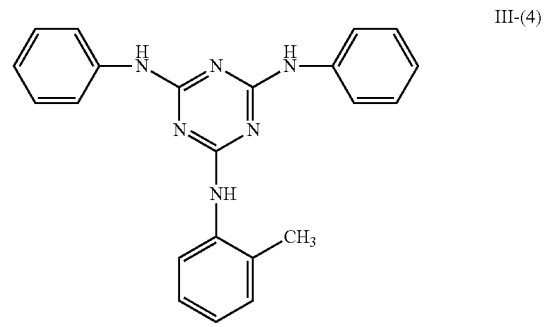

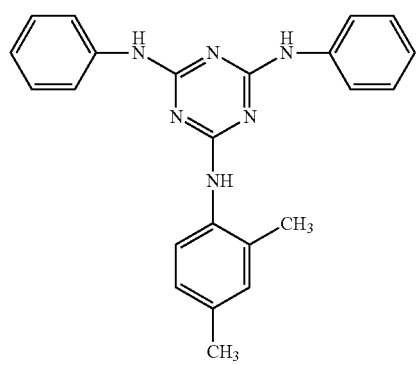
III-(5)
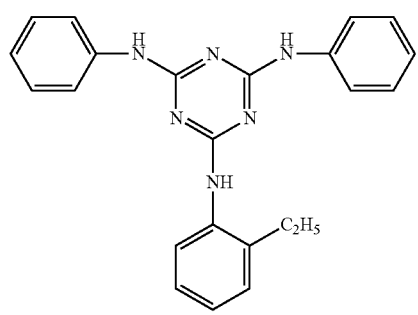
III-(6)
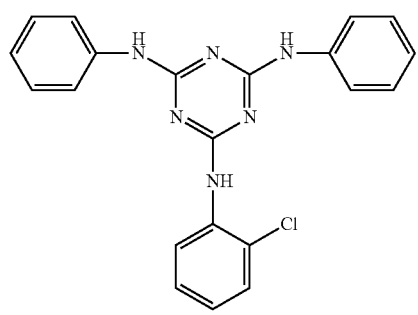
III-(7)
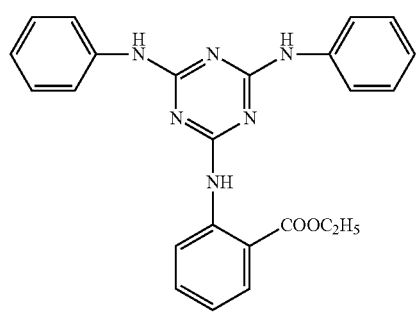
III-(8)
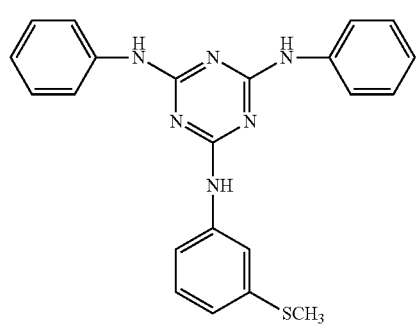
III-(9)
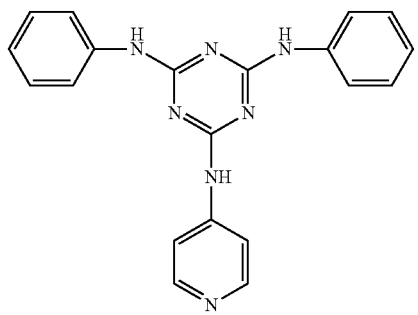
III-(10)
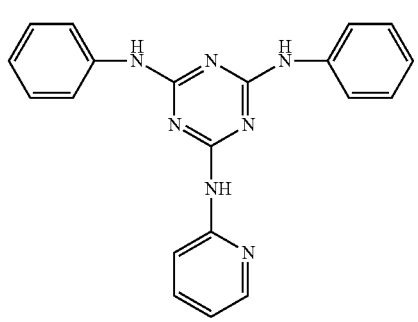
III-(11)
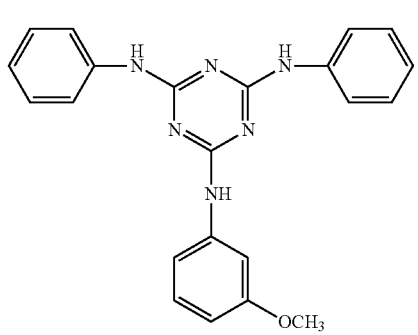
III-(12)
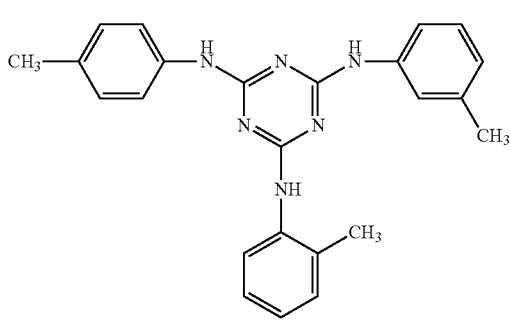
IV-(1)
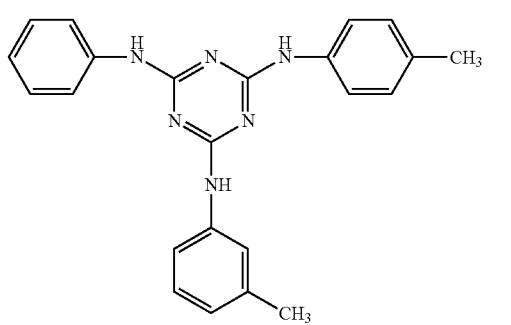
IV-(2)

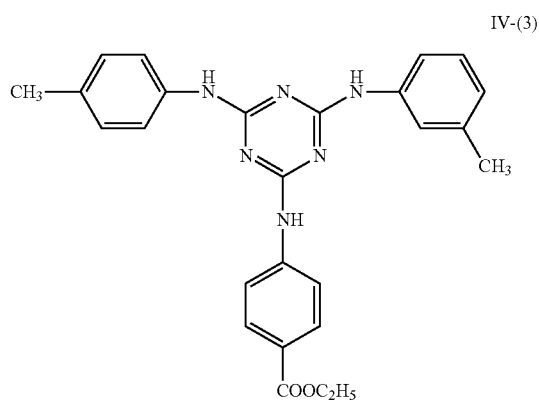

IV-(3)

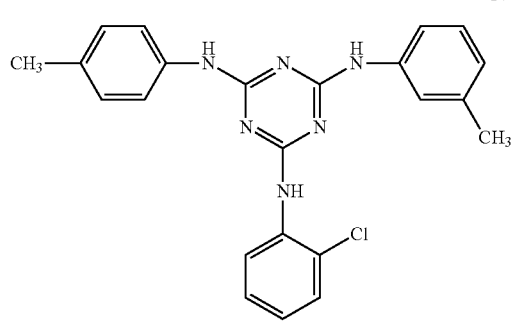

IV-(4)

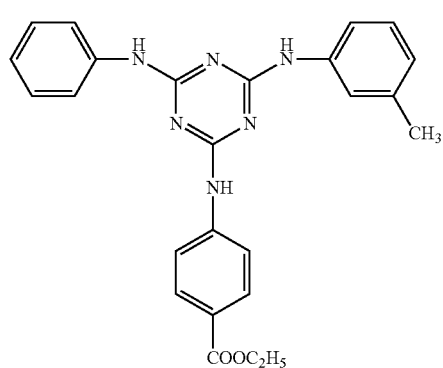

IV-(5)

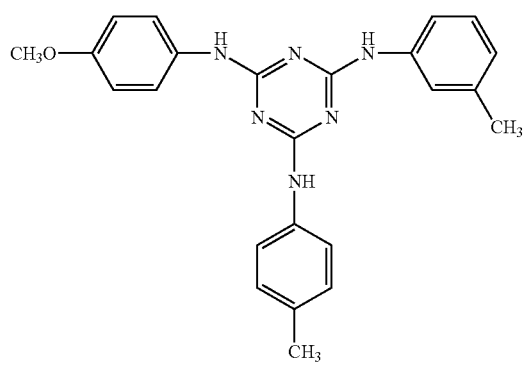

IV-(6)

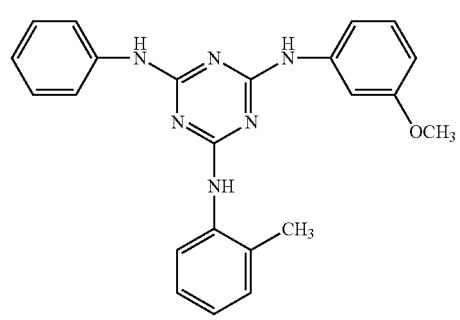

IV-(7)

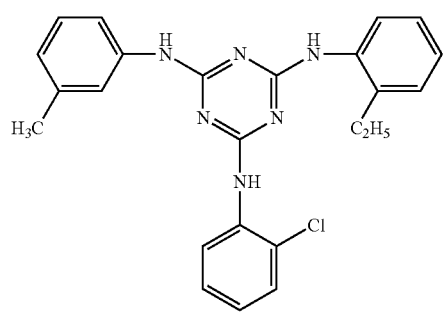

IV-(8)

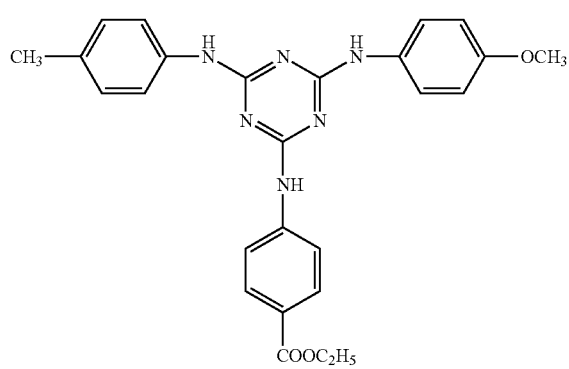

IV-(9)

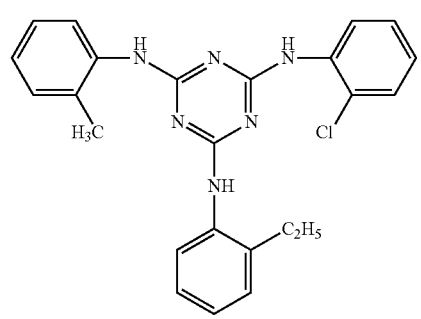

IV-(10)

Though the foregoing wavelength dispersion adjusting agent and triazine-based compound may be previously added at the time of preparing a mixed solution of the polymer material, they may be added at any stage until casting after previously preparing a polymer solution (dope solution). In the latter case, for the purpose of subjecting a dope solution having a polymer dissolved in a solvent and a solution having a wavelength dispersion adjusting agent and a small amount of a polymer material dissolved therein to in-line addition and mixing, in-line mixers, for example, a static mixer (manufactured by Toray Engineering Co., Ltd.), SWJ (Toray's static tubular mixer, Hi-Mixer, etc., are preferably used. The wavelength dispersion adjusting agent to be added later may be simultaneously mixed with a matting agent, or may be mixed with an additive such as a retardation controlling agent, a plasticizer (for example, triphenyl phosphate, biphenyl phosphate, etc.), a deterioration inhibitor, and a release accelerator. In the case of using an in-line mixer, it is preferable to perform concentration and dissolution under a high pressure. A pressure vessel is not particularly limited with respect to the type so far as it withstands a prescribed pressure, and heating and stirring can be performed under a pressure. Besides, the pressure vessel is properly equipped with an instrument such as a pressure gauge and a thermometer. The pressurization may be performed by a method of injecting an inert gas such as a nitrogen gas, or by means of elevation of a vapor pressure of a solvent by heating. The heating is preferably performed from the outside, and for example, a jacket type is easy for temperature control and preferable. A heating temperature by the addition of a solvent is preferably a boiling point of the solvent used or higher and in a range in which the solvent does not boil, and for example, it is suitable to set the temperature within the range of from 30 to 150° C. Also, the pressure is regulated such that the solvent does not boil at the set temperature. After dissolution, the solution is taken out from the vessel while cooling or discharged from the vessel by using a pump, etc. and then cooled by a heat exchanger, etc., and the resultant is used for film formation. At that time, though the cooling temperature may be decreased to ordinary temperature, a manner in which the solution is cooled to a temperature lower by from 5 to 10° C. than the boiling point and then subjected to casting at that temperature is more preferable because the dope viscosity can be reduced.

Also, the wavelength dispersion adjusting agent and the triazine-based compound represented by the general formula (X) can be used singly or in admixture of two or more kinds thereof.

An addition amount of the wavelength dispersion adjusting agent is preferably from 1.0 to 20% by mass, more preferably from 1.0 to 10% by mass, still more preferably from 1.5 to 8.0% by mass, and most preferably from 2.0 to 6.0% by mass relative to the polymer material.

Also, the triazine-based compound represented by the general formula (X) is contained in an amount of preferably 10% by mass (0.1 times) or more and not more than 1,000% by mass (10 times), and more preferably 20% by mass (0.2 times) or more and not more than 750% by mass (7.5 times) relative to the wavelength dispersion adjusting agent.

As to an addition method of the wavelength dispersion adjusting agent and the triazine-based compound represented by the general formula (X), after dissolving the wavelength dispersion adjusting agent and the triazine-based compound represented by the general formula (X) in an organic solvent such as an alcohol, methylene chloride, and dioxolane, the solution may be added to a polymer solution (dope) or may be added directly to a dope composition.

The triazine-based compound represented by the general formula (X) has an action to suppress the decomposition of a merocyanine-based compound represented by the general formula (IX) and enhance the light resistance, and therefore, it is preferable to use a mixture of the triazine-based compound represented by the general formula (X) and the merocyanine-based compound represented by the general formula (IX).

Stabilizer:

For the purpose of suppressing the decomposition or modification of the polymer per se, a stabilizer may be added to the inner layer and the outer layer.

The stabilizer is one which is added for the purpose of reducing the coloration or thermal deterioration of the polymer at the time of film formation or the like and is a compound capable of suppressing the decomposition or modification of the polymer per se, and is selected from an antioxidant, a radical inhibitor, a peroxide decomposing agent, a metal inactivating agent, an acid scavenger, and a light stabilizer. In the invention, though any stabilizer may be used, among the stabilizers, an antioxidant or a radical inhibitor is preferably used, and an antioxidant is more preferably used. From the viewpoint of developing the effects, the addition amount of the stabilizer is preferably equal to that of the wavelength dispersion adjusting agent, and more preferably from 0.2 to 20% by mass relative to the at least one polymer.

The antioxidant is preferably a phosphoric acid-based compound having a phosphorous acid skeleton, a sulfur-based compound having a thioether structure, a phosphate-based compound having a pentaerythritol skeleton structure, or a lactone-based compound having a lactone structure; the radical inhibitor is preferably a phenol-based compound having a hydroxyl group-substituted aromatic ring or an amine-based compound having a substituted or unsubstituted amino group; the peroxide decomposing agent is preferably a phenol-based compound or an amine-based compound; the metal inactivating agent is preferably an amide-based compound having an amide bond; the acid scavenger is preferably an epoxy-based compound having an epoxy group; and the light stabilizer is preferably an amine-based compound.

Such a stabilizer may be used singly or in admixture of two or more kinds thereof, and it may be a compound provided with two or more kinds of functions in the same molecule.

As for the stabilizer, it is preferable that the volatility is sufficiently low at a high temperature, and it is preferable that at least one stabilizer having a molecular weight of 500 or more is contained. Furthermore, the molecular weight is preferably from 500 to 4,000, more preferably from 530 to 3,500, and especially preferably from 550 to 3,000. So far as the molecular weight is 500 or more, the thermal volatility is easily controlled at a low level, and so far as the molecular weight is not more than 4,000, in particular, the compatibility with the polymer material becomes more favorable.

As the stabilizer, commercially available stabilizers can be used. For example, it is preferable to use a phosphate-based antioxidant having a pentaerythritol skeleton structure, such as cyclic neopentanetetrayl bis(2,6-di-t-butyl-4-methylphenyl)phosphite ("ADK STAB PEP-36", manufactured by Adeka Corporation).

Release Accelerator:

From the viewpoint of more enhancing the releasability, it is preferable that the inner layer and the outer layer (in particular, the outer layer) contain a release accelerator. The release accelerator can be, for example, contained in a proportion of from 0.001 to 1% by weight. The addition amount of not more than 0.5% by weight is preferable because, for example, separation of the release agent from the film is hardly caused, and the addition amount of 0.005% by weight or more is preferable because a desired release reducing effect can be obtained. Thus, the release accelerator is contained in a proportion of preferably from 0.005 to 0.5% by weight, and more preferably from 0.01 to 0.3% by weight. As the release accelerator, known materials can be used, and organic or inorganic acidic compounds, surfactants, chelating agents, and so on can be used. Above all, polyvalent carboxylic acids and esters thereof are effective, and in particular, an ethyl ester of citric acid can be effectively used.

It is preferable that the outer layer B contains the release accelerator.

Matting Agent:

In order to prevent scratching or deterioration of conveyance from occurring at the time of handling, it is preferable to add a fine particle in the inner layer and the outer layer (in particular, the outer layer). Such a fine particle is called a matting agent, an anti-blocking agent, or an anti-squeak agent, and has hitherto been utilized. Such a material is not particularly limited so far as it presents the foregoing function, and it may be any of a matting agent made of an inorganic compound or a matting agent made of an organic compound.

Preferred specific examples of the matting agent of an inorganic compound include a silicon-containing inorganic compound (for example, silicon dioxide, calcined calcium silicate, hydrated calcium silicate, aluminum silicate, magnesium silicate, etc.), titanium oxide, zinc oxide, aluminum oxide, barium oxide, zirconium oxide, strontium oxide, antimony oxide, tin oxide, antimony tin oxide, calcium carbonate, talc, clay, calcined kaolin, and potassium phosphate. Of these, a silicon-containing inorganic compound and zirconium oxide are more preferable, and in view of the fact that the turbidity of the laminate film can be reduced, silicon dioxide is especially preferably used. As the fine particle of silicon dioxide, there can be used commercially available products such as AEROSIL R972, R974, R812, 200, 300, R202, OX50, and TT600 (all of which are manufactured by Nippon Aerosil Co., Ltd.). The fine particle of zirconium oxide is commercially available under trade names of AEROSIL R976 and R811 (both of which are manufactured by Nippon Aerosil Co., Ltd.), and these commercially available products are usable.

Preferred specific examples of the matting agent of an organic compound include polymers such as silicone resins, fluorocarbon resins, and acrylic resins, with silicone resins being preferably used. Among the silicone resins, those having a three-dimensional network structure are preferable, and for example, commercially available products having a trade name including TOSPEARL 103, TOSPEARL 105, TOSPEARL 108, TOSPEARL 120, TOSPEARL 145, TOSPEARL 3120, and TOSPEARL 240 (all of which are manufactured by GE Toshiba Silicone Co., Ltd.) can be used.

In the case of adding such a matting agent to the polymer solution, a method thereof is not particularly limited, and any method is applicable without a problem so far as a desired polymer solution can be obtained. For example, the additive may be added in a stage where a polymer material is mixed with a solvent; or the additive may be added after preparing a mixed solution from a polymer material and a solvent. Further, the additive may be added to and mixed with a dope just before the dope is cast, and this is a so-called preceding addition method, in which the ingredients may be on-line mixed by screw kneading. Specifically, preferred is a static mixer such as an in-line mixer. Also, as the in-line mixer, for example, preferred is a static mixer, SWJ (Toray's static tubular mixer, Hi-Mixer, manufactured by Toray Engineering Co., Ltd.). Incidentally, regarding the mode of in-line addition, JP-A-2003-053752 describes an invention of a method for producing a cellulose acylate laminate film wherein, for the purpose of preventing concentration unevenness and particle aggregation, a distance L between a nozzle tip through which an additive liquid having a composition differing from that of the main material dope and a start end of an in-line mixer is controlled to be not more than 5 times an inner diameter d of the main material feeding line, thereby preventing concentration unevenness and aggregation of matting particles, etc. Furthermore, JP-A-2003-053752 discloses a more preferred embodiment, in which a distance (L) between a nozzle tip opening through which an additive liquid having a composition differing from that of the main material dope and a start end of the in-line mixer is controlled to be not more than 10 times an inner diameter (d) of the feeding nozzle tip opening, and the in-line mixer is a static non-stirring tubular mixer or a dynamic stirring tubular mixer. More specifically, JP-A-2003-053752 discloses that a flow rate ratio of the cellulose acylate laminate film main material dope/in-line additive liquid is from 10/1 to 500/1, and more preferably from 50/1 to 200/1. Furthermore, JP-A-2003-014933 discloses an invention of providing a retardation film which is free from a trouble of additive bleedout and a trouble of interlayer release and which has good slipperiness and excellent transparency; and regarding the method of adding additives to the film, JP-A-2003-014933 says that the additive may be added to a dissolving tank, or the additive or a solution or dispersion of the additive may be added to the dope being fed in the process from the dissolving tank to a co-casting die, further describing that in the latter case, mixing means such as a static mixer is preferably provided for the purpose of enhancing the mixing efficiency therein.

In the film of the invention, it is preferable that at least one of the outer layer A and the outer layer B contains the matting agent from the viewpoints of scratch resistance due to a reduction of the coefficient of friction on the film surface, prevention of squeak generated at the time of winding a wide film, and prevention of film folding; and it is especially preferable that both the outer layer A and the outer layer B contain the matting agent from the viewpoints of scratch resistance and effective reduction of squeak.

So far as a large amount of the matting agent is not added, the haze of the film does not become large, and in the case of actually using the matting agent for LCD, inconveniences such as a lowering of the contrast and generation of a luminescent spot are hardly generated. Also, so far as the addition amount of the matting agent is not excessively small, the prevention of squeak and the scratch resistance can be realized. From these viewpoints, the matting agent is contained in a proportion of preferably from 0.01 to 5.0% by weight, more preferably from 0.03 to 3.0% by weight, and especially preferably from 0.05 to 1.0% by weight.

Other Additives:

To the inner layer and the outer layer, one or more kinds of additives may be added together with the polymer material as a main component and the prescribed aromatic group-containing oligomer within the range where the effects of the invention are not impaired. Examples of the additive include a retardation regulator (a preferred range of the additive amount thereof is from 0.01 to 10% by mass relative to the mass of the polymer material; the numerical value ranges in the following parentheses are synonymous), an ultraviolet ray absorber (from 0.001 to 20% by mass), a fine particle powder having an average particle size of from 5 to 3,000 nm (from 0.001 to 1% by mass), a fluorine-based surfactant (from 0.001 to 1% by mass), a release agent (from 0.0001 to 1% by mass), a deterioration inhibitor (from 0.0001 to 1% by mass), and an infrared ray absorber (from 0.001 to 1% by mass).

(2) Manufacture:

Though a manufacturing method of the laminate film of the invention (hereinafter also referred to as "manufacturing method of the invention") is not particularly limited, it is preferable to utilize a solution casting method. Above all, it is preferable to utilize a co-casting method. An example thereof is a manufacturing method which includes a step of subjecting a dope containing a polymer material for an outer layer and a dope containing a polymer material for an inner layer to multilayer casting in this order on a support simultaneously or sequentially; a step of drying the dopes having been subjected to multilayer casting to release the film from the support; and a step of stretching the released film.

Also, in an example of using, as at least the dope for the inner layer, a solution containing the aromatic group-containing oligomer together with the polymer material, it is preferable to manufacture the laminate film by the following method.

That is, this method is a manufacturing method including at least:

a casting step of co-casting a dope for an outer layer, and a dope for an inner layer containing an aromatic group-containing oligomer and a solvent on a support to form a web, a stretching step of stretching the web to align at least an aromatic group-containing oligomer molecule in the alignment direction, and a thermal treatment step of thermally treating the stretched web to increase an alignment degree of at least the aromatic group-containing oligomer molecule.

(Preparation of Dope)

In the manufacturing method, at first, a solution (dope) is prepared by dissolving a polymer material in an organic solvent.

It is preferable that the organic solvent contains a solvent selected from an ether having a carbon atom number of from 3 to 12, a ketone having a carbon atom number of from 3 to 12, an ester having a carbon atom number of from 3 to 12, and a halogenated hydrocarbon having a carbon atom number of from 1 to 6. Each of the ether, the ketone, and the ester may have a cyclic structure. A compound having two or more of any functional groups of an ether, a ketone, and an ester (namely, —O—, —CO—, and —COO—) can also be used as the organic solvent. The organic solvent may also have other functional group such as an alcoholic hydroxyl group. In the case of an organic solvent having two or more kinds of functional groups, its carbon atom number may fall within a specified range of the compound having any functional group.

Examples of the ether having a carbon atom number of from 3 to 12 include diisopropyl ether, dimethoxymethane, dimethoxyethane, 1,4-dioxane, 1,3-dioxolane, tetrahydrofuran, anisole, and phenetole.

Examples of the ketone having a carbon atom number of from 3 to 12 include acetone, methyl ethyl ketone, diethyl ketone, diisobutyl ketone, cyclohexanone, and methyl cyclohexanone.

Examples of the ester having a carbon atom number of from 3 to 12 include ethyl formate, propyl formate, pentyl formate, methyl acetate, ethyl acetate, and pentyl acetate.

Examples of the organic solvent having two or more kinds of functional groups include 2-ethoxyethyl acetate, 2-methoxyethanol, and 2-butoxyethanol.

The carbon atom number of the halogenated hydrocarbon is preferably 1 or 2, and most preferably 1. The halogen of the halogenated hydrocarbon is preferably chlorine. A proportion at which the hydrogen atoms of the halogenated hydrocarbon are substituted with a halogen is preferably from 25 to 75% by mole, more preferably from 30 to 70% by mole, still more preferably from 35 to 65% by moles, and most preferably from 40 to 60% by mole. Methylene chloride is a representative halogenated hydrocarbon.

A mixture of two or more kinds of organic solvents may be used.

A preferable embodiment employing a cellulose acylate as a polymer material is described in detail below. A solution of a cellulose acylate may be prepared according to a usual method. The general method as referred to herein means a treatment at a temperature of 0° C. or higher (ordinary temperature or high temperature). The preparation of a solution can be carried out using preparation method and apparatus of a dope in a usual solvent casting method. Incidentally, in the case of the general method, it is preferable to use a halogenated hydrocarbon (in particular, methylene chloride) as the organic solvent.

It is preferable to adjust the amount of the cellulose acylate such that from 10 to 40% by mass of the cellulose acylate is contained in the obtained dope. The amount of the cellulose acylate is more preferably from 10 to 30% by mass. An arbitrary additive as described later may be added in the organic solvent (prime solvent).

The solution can be prepared by stirring the cellulose acylate and the organic solvent at ordinary temperature (from 0 to 40° C.). A high-concentration solution may be stirred under pressurization and heating conditions. Specifically, the cellulose acylate and the organic solvent are put in a pressure vessel and hermetically sealed, and the mixture is stirred under a pressure while heating at a temperature of a boiling point of the solvent at ordinary temperature or higher and falling within the range where the solvent does not boil. The heating temperature is usually 40° C. or higher, preferably from 60 to 200° C., and more preferably from 80 to 110° C.

The respective components may be coarsely mixed and then put in the vessel. Also, the components may be successively charged in the vessel. It is necessary that the vessel is configured such that stirring can be achieved. The vessel can be pressurized by pouring an inert gas such as a nitrogen gas. Also, an increase of the vapor pressure of the solvent due to heating may be utilized. Alternatively, after hermetically sealing the vessel, the respective components may be added under a pressure.

In the case of performing heating, it is preferable that heating is performed from the outside of the vessel. For example, a jacket type heating apparatus can be used. Also, the whole of the vessel can be heated by providing a plate heater on the outside of the vessel, laying a pipe and circulating a liquid thereinto.

It is preferable to provide a stirring blade in the inside of the vessel and performing stirring using this. The stirring blade is preferably one having a length so as to reach the vicinity of a wall of the vessel. It is preferable that a scraping blade is provided at the end of the stirring blade for the purpose of renewing a liquid film of the wall of the vessel.

Measuring instruments such as a pressure gauge and a thermometer may be provided in the vessel. In the vessel, the respective components are dissolved in a solvent. The prepared dope is cooled and then taken out from the vessel, or taken out from the vessel and then cooled by using a heat exchanger or the like.

The solution can also be prepared by a cooling dissolution method. According to the cooling dissolution method, the cellulose acylate can be dissolved even in an organic solvent in which it is difficult to dissolve the cellulose acylate in a usual dissolution method. Incidentally, according to the cooling dissolution method, there is brought an effect that a uniform solution can be rapidly obtained even by using a solvent capable of dissolving the cellulose acylate therein in a usual dissolution method.

In the cooling dissolution method, first of all, a cellulose acylate is gradually added in an organic solvent at room temperature while stirring. It is preferable that the amount of the cellulose acylate is adjusted such that from 10 to 40% by mass of the cellulose acylate is contained in this mixture. The amount of the cellulose acylate is more preferably from 10 to 30% by mass. Furthermore, an arbitrary additive as described later may be added in the mixture.

Next, the mixture is cooled to a temperature of from −100 to −10° C. (preferably from −80 to −10° C., more preferably from −50 to −20° C., and most preferably from −50 to −30° C.). The cooling can be carried out in, for example, a dry ice/methanol bath (−75° C.) or a cooled diethylene glycol solution (from −30 to −20° C.). By performing cooling in such a manner, the mixture of a cellulose acylate and an organic solvent is solidified.

A cooling rate is preferably 4° C./min or more, more preferably 8° C./min or more, and most preferably 12° C./min or more. It is preferable that the cooling rate is as fast as possible. However, 10,000° C./sec is a theoretical upper limit; 1,000° C./sec is a technical upper limit; and 100° C./sec is a practical upper limit. Incidentally, the cooling rate is a value obtained by dividing a difference between a temperature at which cooling is started and a final cooling temperature by a time of from the start of cooling to the arrival at the final cooling temperature.

When the resulting mixture is further heated to a temperature of from 0 to 200° C. (preferably from 0 to 150° C., more preferably from 0 to 120° C., and most preferably from 0 to 50° C.), the cellulose acylate is dissolved in the organic solvent. The temperature rise may be achieved by merely allowing the mixture to stand at room temperature or by heating in a warm bath. A heating rate is preferably 4° C./min or more, more preferably 8° C./min or more, and most preferably 12° C./min or more. It is preferable that the heating rate is as fast as possible. However, 10,000° C./sec is a theoretical upper limit; 1,000° C./sec is a technical upper limit; and 100° C./sec is a practical upper limit. The heating rate is a value obtained by dividing a difference between a temperature at which heating is started and a final heating temperature by a time of from the start of heating to the arrival at the final heating temperature.

A uniform solution is thus obtained in the foregoing manner. Incidentally, in the case where the dissolution is insufficient, the cooling and heating operation may be repeated. Whether or not the dissolution is sufficient can be judged merely by visual observation of the appearance of the solution.

In the cooling dissolution method, in order to avoid the incorporation of moisture due to dew condensation at the time of cooling, it is desired to use a sealed vessel. Also, in the cooling and heating operation, when pressurization is carried out at the time of cooling, or evacuation is carried out at the time of heating, the dissolution time can be shortened. In order to carry out the pressurization and evacuation, it is desired to use a pressure-tight vessel.

Incidentally, in a 20% by mass solution obtained by dissolving a cellulose acylate (degree of acetylation: 60.9%, viscosity average polymerization degree: 299) in methyl acetate by a cooling dissolution method, according to differential scanning calorimetry (DSC), a pseudo-phase transition point between a sol state and a gel state exists in the vicinity of 33° C., and the solution becomes in a uniform gel state at a temperature of not higher than this temperature. Accordingly, this solution is required to be stored at a temperature of the pseudo-phase transition temperature or higher, and preferably a temperature of about 10° C. higher than the gel phase transition temperature. However, this pseudo-phase transition temperature differs with the degree of acetylation and viscosity average polymerization degree of the cellulose acylate, the solution concentration, and the organic solvent to be used.

(Co-casting)

A cellulose acylate laminate film can be manufactured from the prepared two or more kinds of the cellulose acylate solutions (dopes) for an inner layer and an outer layer by a solvent casting method.

The dopes are cast on a drum or a band, and the solvent is vaporized to form a film. It is preferable that each of the dope before casting is adjusted so as to have a concentration in the range of from 18 to 35% by mass in terms of solids content. It is preferable that the surface of the drum or band is mirror-finished. The casting and drying method in the solvent casting method is described in U.S. Pat. Nos. 2,336,310, 2,367,603, 2,492,078, 2,492,977, 2,492,978, 2,607,704, 2,739,069, and 2,739,070, U.K. Patent Nos. 640,731 and 736,892, JP-B-45-4554, JP-B-49-5614, JP-A-60-176834, JP-A-60-203430, and JP-A-62-115035.

It is preferable that the dope is cast on a drum or a band having a surface temperature of not higher than 10° C. It is preferable that after casting, air is blown for 2 seconds or more to achieve drying. The resulting film is stripped off from the drum or band and further dried by high-temperature air while successively changing the temperature from 100° C. to 160° C., whereby the residual solvent can be evaporated. The foregoing method is described in JP-B-5-17844. According to this method, it is possible to shorten a time of from casting to stripping-off. In order to achieve this method, it is necessary that the dope is gelled at the surface temperature of the drum or band at the casting.

A plurality of two or more kinds of the cellulose acylate solutions (dopes) are cast on a smooth band or drum as a support, thereby achieving film formation. The manufacturing method of the film of the invention is not particularly limited other than the foregoing, and a known co-casting method can be adopted. For example, a film may be fabricated while casting each cellulose acylate-containing solution from plural casting nozzles provided at intervals in the movement direction of the metal support and stacking the solution. For example, methods described in JP-A-61-158414, JP-A-1-122419, and JP-A-11-198285 can be adopted. Also, the formation of a film can also be carried out by casting the cellulose acylate solution from two casting nozzles. For example, the formation of a film can be carried out by each of methods described in JP-B-60-27562, JP-A-61-94724, JP-A-61-947245, JP-A-61-104813, JP-A-61-158413, and JP-A-6-134933. Also, a casting method described in JP-A-56-162617, in which a flow of a high-viscosity cellulose acylate solution is encompassed by a low-viscosity cellulose acylate solution, and the high-viscosity and low-viscosity cellulose acylate solutions are simultaneously extruded, can also be adopted. Furthermore, a method described in each of JP-A-61-94724 and JP-A-61-94725, in which the solution of the outside is allowed to contain an alcohol component that is a poor solvent in a larger amount than the solution of the inside, is also a preferred embodiment.

Also, a film can be fabricated by using two casting nozzles, stripping off a film formed on a metal support by a first casting nozzle and then subjecting the side of the film coming into contact with the metal support surface to second casting. For example, a method described in JP-B-44-20235 can be exemplified. With respect to the cellulose acylate solution to be cast, the same solution may be used, or different cellulose solutions may be used, and there are no particular limitations. For the purpose of allowing plural cellulose acylate layers to have a function, a cellulose acylate solution corresponding to each function may be extruded from each casting nozzle. Furthermore, the cellulose acylate solution of the invention can be cast simultaneously with other functional layers (for example, an adhesive layer, a dye layer, an antistatic layer, an anti-halation layer, a UV absorbing layer, a polarizing layer, etc.). The method for manufacturing the film of the invention is preferably a multi-layer casting film formation method in which the film formation is carried out simultaneously or sequentially.

In conventional single-layer solutions, in order to obtain a film with a necessary thickness, it is required to extrude a high-viscosity cellulose acylate solution in a high concentration. In that case, there was often encountered a problem that the stability of the cellulose acylate solution is so poor that solids are generated, thereby causing a spitting fault or inferiority in flatness. As a method for solving this problem, by casting plural cellulose acylate solutions from casting nozzles, high-viscosity solutions can be extruded onto the metal support at the same time, and a film having improved flatness and excellent surface properties can be fabricated. Also, by using concentrated cellulose acylate solutions, a reduction of a drying load can be achieved, and the production speed of the film can be enhanced.

In the case of co-casting, in the example shown in FIG. 1, the thickness of the inner layer is thicker than the thickness of the outer layer. The thickness of the inner layer is preferably more than 50% and not more than 99%, and more preferably from 70 to 95% of the total film thickness. In the example shown in FIG. 1, the thickness of the outer layer is preferably 1% or more and less than 50%, and more preferably from 5 to 30% of the whole in terms of a total thickness of two layers of the outer layers A and B.

In the case of co-casting, a cellulose acylate laminate film having a laminate structure can also be fabricated by co-casting the cellulose acylate solutions which are different from each other with respect to the concentrations of additives such as a plasticizer, an ultraviolet ray absorber, and a matting agent. For example, a cellulose acylate laminate film having a configuration of outer layer A/inner layer/outer layer B can be fabricated. For example, the matting agent may be added in a larger amount in the outer layer or in only the outer layer. The plasticizer or ultraviolet ray absorber can be added in a larger amount in the inner layer as compared with the outer layer, or may be added in only the inner layer. Also, the kind of the plasticizer or ultraviolet ray absorber can be changed between the inner layer and the outer layer. For example, a low-volatile plasticizer and/or ultraviolet ray absorber can be contained in the outer layer, and a plasticizer of excellent plasticization or an ultraviolet ray absorber of excellent ultraviolet ray absorption can be added to the inner layer. An embodiment of adding a release agent to only the outer layer on the side of the metal support is also preferable. In order to gel the solution by cooling the metal support in a cooling drum method, an alcohol that is a poor solvent can be more added in the outer layer than in the inner layer, and this is also a preferred embodiment. Tg may differ between the outer layer and the inner layer. Preferably, Tg of the inner layer is lower than that of the outer layer. Also, the viscosity of the solution containing cellulose acylate to be cast may differ between the outer layer and the inner layer. Preferably, the viscosity of the solution for the outer layer is smaller than that for the inner layer; however, the viscosity of the solution for the inner layer may be smaller than that for the outer layer.

In the foregoing manufacturing method, as described above, by adding a retardation regulator to at least one of the dope for an inner layer and the dope for an outer layer, a cellulose acylate laminate film in which a variation of retardation is suppressed can be obtained. As for a preferred embodiment of adding the retardation regulator to each of the layers, the addition amount of the retardation regulator to the dope may be adjusted in the foregoing preferred content in each layer.

The dope having been subjected to multilayer-casting is dried and then released from the support.

One of the characteristic features of the laminate film of the invention resides in the fact that the thickness of the outer layer changes in the width direction. At the time of co-casting, the control of the total film thickness of the laminate film in the width direction can be carried out by adjusting a clearance of an outlet of a casting die. The adjustment of the film thickness of the outer layers A and B at each position in the width direction can be carried out by adjusting the flow rate of the dope for the outer layer, the width of a passage at the time of joining the inner layer within the casting die, and the clearance at a position in the width direction. An apparatus having such a structure is disclosed in Japanese Patent Application Nos. 2010-25244 and 2009-253791, and the contents described in the patent documents are incorporated into this specification by reference.

(Stretching)

Next, the web is stretched. In a stretching step, it is preferable to align the molecule of the aromatic group-containing oligomer contained in the inner layer at least in the stretching direction. A residual solvent amount C1 of the web is preferably from 20 to 300% by mass. Here, the "residual solvent amount" of the web can be calculated on the basis of the following expression. Also, a residual solvent amount in a thermal treatment step as described later can be similarly calculated.

$$\text{Residual solvent amount } C1 \text{ (\% by mass)} = \{(M-N)/N\} \times 100$$

Here, M represents a mass of the web just before being inserted into a stretching zone; and N represents a mass when the web just before being inserted into a stretching zone is dried at 120° C. for 2 hours.

By allowing the residual solvent amount C1 to fall within the foregoing range and stretching the web containing a lot of the solvent, a prescribed oligomer existing as the additive in the web can be aligned to some extent while allowing its molecular major axis to coincide with the stretching direction. When the residual solvent amount C1 exceeds 300% by mass, the molecule tends to be hardly aligned, whereas when it is less than 20% by mass, there may be the case that the web is so hard that it is hardly stretched. The residual solvent amount C1 is more preferably from 20 to 250% by mass, and still more preferably from 20 to 150% by mass.

In order to increase an alignment degree of the prescribed oligomer molecule in the thermal treatment step as described later, a stretch ratio in this step may be in a degree at which the prescribed oligomer molecule is aligned. For example, in an embodiment of stretching in an orthogonal direction to the casting direction, the stretch ratio is preferably from 1 to 50%, and more preferably from 1 to 20%. Also, in an embodiment of stretching in the same direction as the casting direction, the stretch ratio is preferably from 1 to 300%, and more preferably from 1 to 200%.

Incidentally, the "stretch ratio (%)" as referred to in this specification means one determined according to the following expression, but it should not be construed that the invention is limited to the method for directly measuring the length, and other methods in which the same result as the stretch ratio determined according to the following expression is obtained can also be adopted.

$$\text{Stretch ratio}(\%) = 100 \times \{(\text{Length after stretching}) - (\text{Length before stretching})\} / (\text{Length before stretching})$$

A temperature at the time of stretching is not particularly limited, too. Preferably, the stretching is performed at a temperature at which the alignment of the prescribed oligomer molecule in the stretch direction is accelerated. In general, the stretching is performed such that a film surface temperature of the web is preferably from −30 to 80° C., and more preferably from 25 to 80° C.

In the foregoing method, the alignment direction of the cellulose acylate and the alignment direction of the oligomer molecule in the finally manufactured film, namely the in-plane slow axis direction of the film is determined by the stretching direction in the stretching step. For example, in the case where the longitudinal cellulose acylate is continuously manufactured by the method of the invention, the casting direction is the longitudinal direction. When the stretching is performed along the orthogonal direction (hereinafter also referred to as "TD direction") to the casting direction, the cellulose acylate and the oligomer molecule are aligned in the orthogonal direction to the longitudinal direction, and as a result, a film having an in-plane slow axis along the orthogonal direction to the longitudinal direction can be manufactured. When the stretching is performed in the casting direction, the cellulose acylate and the oligomer molecule are aligned in the longitudinal direction, and as a result, a film having an in-plane slow axis along the longitudinal direction can be manufactured.

The stretching in the TD direction can be carried out by grasping the both ends of the web by a pin-shaped tenter and widening the web in the TD direction. The stretching in the MD direction can be carried out by means of PIT drawing. The stretching treatment may be performed in a single stage or multiple stages of two or more stages.

In the case of fabricating a polarizing plate by sticking a longitudinal film to a longitudinal polarizing film (in general, having an absorption axis in the longitudinal direction), it is preferable to use a film having an in-plane slow axis in the orthogonal direction to the longitudinal direction. Accordingly, in an embodiment of manufacturing a longitudinal cellulose acylate laminate film to be stuck to a polarizing film in a roll-to-roll manner, it is preferable that the stretching treatment is applied in the orthogonal direction to the casting direction in the stretching step. However, in an embodiment of sticking to a polarizing film not by the roll-to-roll manner, but by a batchwise sticking method or the like even when stretching is performed in any direction, sticking can be achieved in a preferred relation by means of axis conformity at the time of sticking.

Thermal Treatment Step:

Next, after the stretching step, the web is thermally treated under a prescribed condition. According to this thermal treatment, the alignment degree of the prescribed oligomer which has been aligned in the stretching step is increased. So far as the alignment degree of the prescribed oligomer can be increased, the thermal treatment condition is not particularly limited. Main factors of affecting the alignment of the oligomer at the time of thermal treatment are the film surface temperature of the web at the time of thermal treatment and the residual solvent amount of the web at the time of thermal treatment. An example of the thermal treatment condition for stably increasing the alignment degree of the prescribed oligomer is a thermal treatment in which the web after stretching, having a residual solvent amount C2 of from 10 to 120% by mass, is treated at a film surface temperature of from 40 to 200° C. On condition that the residual solvent amount C2 of the web at the time of thermal treatment is smaller than the residual solvent amount C1 of the web in the stretching step, namely, a relation of C2≤C1 is established, the residual solvent amount C2 is preferably from 10 to 120% by mass. When the residual solvent amount C2 is more than 120% by mass or less than 10% by mass, the alignment degree of the oligomer tends to hardly increase, so that there may be the case where the desired retardation cannot be obtained. The residual solvent amount C2 is preferably from 20 to 80% by mass, and more preferably from 20 to 60% by mass.

Preferably, the thermal treatment step is allowed to proceed while suppressing the crystallization of the cellulose acylate. Accordingly, it is preferable to perform the thermal treatment at a temperature lower than the temperature of the thermal treatment for accelerating crystallization of the cellulose acylate. Specifically, the thermal treatment is performed preferably at from 40 to 100° C., and more preferably at from 60 to 100° C. in terms of the film surface temperature of the web.

Incidentally, in order to suppress the crystallization of the cellulose acylate, it is preferable that the film surface temperature at the time of thermal treatment is lower than the crystallization temperature of the web before the thermal treatment.

The thermal treatment can be, for example, carried out by a method of allowing the web to pass through a zone set up at a prescribed temperature while being conveyed; a method of exposing the web with hot air at a prescribed temperature; a method of irradiating the web with heat rays; a method of bringing the web into contact with a roll set up at a prescribed temperature; or the like.

In the invention, since a cellulose acylate laminate film having the foregoing optical properties can be manufactured without requiring a stretching step after the thermal treatment, a cellulose acylate laminate film in a longitudinal form can be continuously manufactured using a drum as a casting support with a small number of steps within a short period of time. It is also possible to manufacture a cellulose acylate laminate film in an in-line manner, and the productivity can be markedly improved.

For example, it is also possible to manufacture a cellulose acylate laminate film with high Re and high Rth in an in-line manner by setting up a PIT draw of from 101 to 200% and a support speed of from 50 to 200 m/min without adding any additive affecting the optical properties other than the prescribed oligomer.

If desired, after the thermal treatment step, one or more steps selected from stretching, thermal treatment, surface treatment, and so on can be applied to the obtained cellulose acylate laminate film within the range where the effects of the invention are not impaired.

3. Properties of Laminate Film:

Even when the laminate film of the invention has distribution of the total film thickness in the width direction, it has such a characteristic feature that the optical properties are uniform. Preferably, a variation of at least one of retardation in-plane Re and retardation along the thickness direction Rth in the width direction is not more than 10 nm, and more preferably, variations of the both are not more than 10 nm. Still more preferably, a variation of at least one of Re and Rth in the width direction is not more than 5 nm, and yet still more preferably, variations of the both are not more than 5 nm.

Incidentally, in this specification, Re ($\lambda$) and Rth ($\lambda$) represent an in-plane retardation and a retardation in the thickness direction at a wavelength of $\lambda$, respectively. The Re ($\lambda$) is measured by making light having a wavelength of λ nm incident in a normal direction of the film in KOBRA 21ADH or WR (manufactured by Oji Scientific Instruments). In selecting the measuring wavelength λ nm, the measurement can be achieved by manually exchanging a wavelength selective filter or converting a measured value with a program, etc. In the case where the film to be measured is expressed by a uniaxial or biaxial refractive index ellipsoid, the Rth (λ) is calculated in the following manner.

The Rth (λ) is calculated by KOBRA 21ADH or WR on the basis of six measured Re (λ) values, an assumed value of the average refractive index, and an inputted film thickness. The retardation Re (λ) values are measured such that light having a wavelength of λ nm is made incident to the film from six directions tilted to 50° on one side at intervals of 10° to the film normal line, using an in-plane slow axis (detected by KOBRA 21ADH or WR) as a tilt axis (rotation axis) (when the film has no slow axis, an arbitrary in-plane direction is used as the rotation axis). In the foregoing, when a retardation value measured using the in-plane slow axis as the rotation axis is zero at a certain tilt angle to a normal line direction, the sign of a retardation value at a tilt angle larger than the foregoing certain tilt angle is converted to a negative sign, and the negative retardation value is then used in the calculation by KOBRA 21ADH or WR. Incidentally, the Rth can also be calculated by the following expressions (A) and (B) on the basis of an assumed value of the average refractive index, an inputted thickness value, and two retardation values measured in arbitrary two tilt directions, using the slow axis as the tilt axis (the rotation axis) (when the film has no slow axis, an arbitrary in-plane direction is used as the rotation axis).

(1.49), and polystyrene (1.59). The above values of nx, ny, and nz are calculated by KOBRA 21ADH or WR from the inputted assumed average refractive index and film thickness value. Nz is further calculated from thus obtained nx, ny, and nz according to an expression: Nz=(nx−nz)/(nx−ny).

In this specification, the terms "parallel" and "orthogonal" mean that the designated angle falls within the range of less than ±10° from a strict angle. This range is preferably less than ±5°, and more preferably less than ±2° in terms of an error from the strict angle. Also, the "slow axis" means a direction at which the refractive index is maximum.

Incidentally, a measuring wavelength of the refractive index is a value at λ=550 nm of a visible light region unless otherwise indicated; and measuring wavelengths of Re and Rth are defined to be 550 nm unless otherwise indicated.

4. Applications of Laminate Film:

The laminate film of the invention can be used for various applications. In particular, the laminate film of the invention is useful as an optical member of liquid crystal display device and can be, for example, utilized as an optically compensatory film or a part thereof, or a protective film of polarizing plate. Embodiments of the laminate film which is useful for liquid crystal display devices of various modes are hereunder described, but it should not be construed that the invention is limited to the following embodiments.

Laminate Film for Liquid Crystal Display Device of Twisted Alignment Mode:

The laminate film of the invention can be used for liquid crystal display devices of a twisted alignment mode such as TN mode as an optically compensatory film or a part thereof, or a protective film of polarizing plate (preferably an inside $$\mathrm{Re}(\theta) = \left[ nx - \frac{ny \times nz}{\sqrt{\left(ny\sin\left(\sin^{-1}\left(\frac{\sin(-\theta)}{nx}\right)\right)\right)^2 + \left(nz\cos\left(\sin^{-1}\left(\frac{\sin(-\theta)}{nx}\right)\right)\right)^2}} \right] \times \frac{d}{\cos\left(\sin^{-1}\left(\frac{\sin(-\theta)}{nx}\right)\right)} \quad (A)$$

In the foregoing expression (A), Re (θ) represents a retardation value in a direction tilted at an angle θ to a film normal line direction. Also, in the expression (A), nx represents a refractive index in a slow axis direction in the plane; ny represents a refractive index in a direction orthogonal to nx in the plane; and nz represents a refractive index in a direction orthogonal to nx and ny.

$$Rth = \{(nx+ny)/2 - nz\} \times d \quad (B)$$

In the case where the film to be measured cannot be expressed in terms of a uniaxial or biaxial refractive index ellipsoid, and thus has no so-called optic axis, the Rth (λ) is calculated in the following manner. The Rth (λ) is calculated by KOBRA 21ADH or WR on the basis of eleven measured Re (λ) values, an assumed value of the average refractive index, and an inputted film thickness value. The retardation Re (λ) values are measured such that light having a wavelength of λ nm is made incident to the film from eleven directions tilted at −50° to +50° at intervals of 10° to the film normal line direction, using an in-plane slow axis (detected by KOBRA 21ADH or WR) as a tilt axis (rotation axis). Also, in the foregoing measurements, as the assumed values of the average refractive indices, those described in *Polymer Handbook* (JOHN WILEY & SONS, INC.) and catalogs of various optical films can be used. Unknown average refractive indices may be obtained by measurement using an Abbe refractometer. The average refractive indices of major optical film materials are as follows: cellulose acylate (1.48), cycloolefin polymer (1.52), polycarbonate (1.59), polymethyl methacrylate protective film aligned on the liquid crystal cell side). The laminate film which is used for liquid crystal display devices of a twisted alignment mode preferably has Re of from 5 to 20 nm and Rth of from 90 to 150 nm.

In an example of the laminate film which is used for liquid crystal display devices of a twisted alignment mode, the laminate film is used as a support of an optically compensatory film having a support and an optically anisotropic layer formed of a liquid crystal composition provided thereon. The laminate film may be used as the support after properly applying a surface treatment as described later, or the like.

The liquid crystal composition which is used for the formation of the optically anisotropic layer formed of a liquid crystal composition is preferably a liquid crystal composition capable of forming a nematic phase and a smectic phase. In general, the liquid crystal compound is classified into a rod-shaped liquid crystal compound and a disc-shaped liquid crystal compounds on the basis of a molecular shape thereof. In the invention, liquid crystal compounds of any shapes may be used.

Though a thickness of the optically anisotropic layer formed of the liquid crystal composition is not particularly limited, it is preferably from 0.1 to 10 μm, and more preferably from 0.5 to 5 μm.

(Materials of Optically Anisotropic Layer)

(1) Discotic Liquid Crystal Compound

Examples of the discotic liquid crystalline compound which can be used in the invention include benzene derivatives described in the Research Report of C. Destrade, et al., Mol. Cryst. vol. 71, p. 111 (1981), —truxene derivatives described in Research Report by C. Destrade, et al., Mol. Cryst. vol. 122, p. 141 (1985), Physics, lett, A, vol. 78, p. 82 (1990), cyclohexane derivatives described in Research Report of B. Kohne, et al., Angew. Chem. vol. 96, p. 70 (1984) and aza crown type or phenyl acetylene type macrocycles described in Research Report of M. Lehn, J. Chem. Commun., p. 1794 (1985), and Research Report of J. Zhang, J. Am. Chem. Soc., vol. 116, p. 2655 (1994).

The discotic liquid crystalline compounds also include compounds showing liquid crystallinity of a structure in which linear alkyl groups, alkoxy groups or substituted benzoyloxy groups are substituted radially as side chains of a scaffold at the center of a molecule. Compounds in which a molecule or an aggregate of molecules have a rotational symmetry and can be provided with a certain alignment are preferred.

In a case of forming an optical anisotropic layer from a discotic liquid crystalline compound, it is no more necessary that the compound contained finally in the optically anisotropic layer shows crystallinity.

Preferable examples of the discotic liquid-crystal compound include the compounds described in JP-A-8-50206, in JP-A 2006-76992, paragraph [0052], and in JP-A 2007-2220, paragraphs [0040] to [0063]. The details of polymerization of discotic liquid crystal compounds are described in JP-A-8-27284. For example, the compounds of the formula (DI) are especially preferable since they show high birefringence.

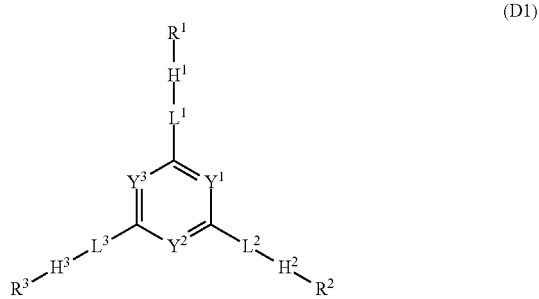

(D1)

In formula (DI), $Y^1$, $Y^2$ and $Y^3$ each independently represent a methine group or a nitrogen atom.

When each of $Y^1$, $Y^2$ and $Y^3$ each is a methine group, the hydrogen atom of the methine group may be substituted with a substituent. Examples of the substituent of the methine group include an alkyl group, an alkoxy group, an aryloxy group, an acyl group, an alkoxycarbonyl group, an acyloxy group, an acylamino group, an alkoxycarbonylamino group, an alkylthio group, an arylthio group, a halogen atom, and a cyano group. Of those, preferred are an alkyl group, an alkoxy group, an alkoxycarbonyl group, an acyloxy group, a halogen atom and a cyano group; more preferred are an alkyl group having from 1 to 12 carbon atoms (the term "carbon atoms" means hydrocarbons in a substituent, and the terms appearing in the description of the substituent of the discotic liquid crystal compound have the same meaning), an alkoxy group having from 1 to 12 carbon atoms, an alkoxycarbonyl group having from 2 to 12 carbon atoms, an acyloxy group having from 2 to 12 carbon atoms, a halogen atom and a cyano group.

Preferably, $Y^1$, $Y^2$ and $Y^3$ are all methine groups, more preferably non-substituted methine groups, in terms of ease to cost of preparation.

In formula (DI), $L^1$, $L^2$ and $L^3$ each independently represent a single bond or a bivalent linking group.

The bivalent linking group is preferably selected from —O—, —S—, —C(=O)—, —NR$^7$—, —CH=CH—, —C≡C—, a bivalent cyclic group, and their combinations. $R^7$ represents an alkyl group having from 1 to 7 carbon atoms, or a hydrogen atom, preferably an alkyl group having from 1 to 4 carbon atoms, or a hydrogen atom, more preferably a methyl, an ethyl or a hydrogen atom, even more preferably a hydrogen atom.

The bivalent cyclic group, occasionally referred to as cyclic group, represented by $L^1$, $L^2$ or $L^3$ means any bivalent linking group having a cyclic structure. The cyclic group is preferably a 5-membered, 6-membered or 7-membered group, more preferably a 5-membered or 6-membered group, even more preferably a 6-membered group. The ring in the cyclic group may be a condensed ring. However, a monocyclic ring is preferred to a condensed ring for it. The ring in the cyclic ring may be any of an aromatic ring, an aliphatic ring, or a hetero ring. Examples of the aromatic ring are a benzene ring and a naphthalene ring. An example of the aliphatic ring is a cyclohexane ring. Examples of the hetero ring are a pyridine ring and a pyrimidine ring. Preferably, the cyclic group contains an aromatic ring or a hetero ring. In the invention, the bivalent cyclic group is preferably a bivalent cyclic group formed of only a cyclic structure which may have at least one substituent. The same is applied to the following description.

Of the bivalent cyclic group, the benzene ring-having cyclic group is preferably a 1,4-phenylene group. The naphthalene ring-having cyclic group is preferably a naphthalene-1,5-diyl group or a naphthalene-2,6-diyl group. The pyridine ring-having cyclic group is preferably a pyridine-2,5-diyl group. The pyrimidine ring-having cyclic group is preferably a pyrimidin-2,5-diyl group.

The bivalent cyclic group for $L^1$, $L^2$ and $L^3$ may have a substituent. Examples of the substituent are a halogen atom (preferably a fluorine or chlorine atom), cyano, nitro, an alkyl group having from 1 to 16 carbon atoms, an alkenyl group having from 2 to 16 carbon atoms, an alkynyl group having from 2 to 16 carbon atoms, a halogen atom-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms.

In the formula, $L^1$, $L^2$ and $L^3$ are preferably a single bond, *—O—CO—, *—CO—O—, *—CH=CH—, *—C≡C—, *-"bivalent cyclic group"-, *—O—CO-"bivalent cyclic group"-, *—CO—O-"bivalent cyclic group"-, *—CH=CH-"bivalent cyclic group"-, *—C≡C-"bivalent cyclic group"-, *-"bivalent cyclic group"-O—CO—, *-"bivalent cyclic group"-CO—O—, *-"bivalent cyclic group"-CH=CH—, or *-"bivalent cyclic group"-C≡C—. More preferably, they are a single bond, *—CH=CH—, *—CH=CH-"bivalent cyclic group"- or *—C≡C-"bivalent cyclic group"-, even more preferably a single bond. In the examples, "*" indicates the position at which the group bonds to the 6-membered ring of formula (DI) that contains $Y^{11}$, $Y^{12}$ and $Y^{13}$.

In formula (DI), $H^1$, $H^2$ and $H^3$ each independently represent the following formula (I-A) or (I-B):

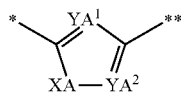
(I-A)

In formula (I-A), $YA^1$ and $YA^2$ each independently represent a methine group or a nitrogen atom; XA represents an oxygen atom, a sulfur atom, a methylene group or an imino group; * indicates the position at which the formula bonds to any of $L^1$ to $L^3$ in formula (DI); and ** indicates the position at which the formula bonds to any of $R^1$ to $R^3$ in formula (DI).

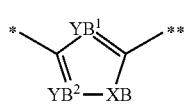
(I-B)

In formula (I-B), $YB^1$ and $YB^2$ each independently represent a methine group or a nitrogen atom; XB represents an oxygen atom, a sulfur atom, a methylene group or an imino group; * indicates the position at which the formula bonds to any of $L^1$ to $L^3$ in formula (DI); and ** indicates the position at which the formula bonds to any of $R^1$ to $R^3$ in formula (DI).

In the formula, $R^1$, $R^2$ and $R^3$ each independently represent the following formula (I-R).

(I-R)

In formula (I-R), * indicates the position at which the formula bonds to $H^1$, $H^2$ or $H^3$ in formula (DI).

$L^{101}$ represents a single bond or a bivalent linking group. When $L^{101}$ is a bivalent linking group, it is preferably selected from a group consisting of —O—, —S—, —C(=O)—, —NR$^7$—, —CH=CH—, —CH≡CH—, and their combination. $R^7$ represents an alkyl group having from 1 to 7 carbon atoms, or a hydrogen atom, preferably an alkyl group having from 1 to 4 carbon atoms, or a hydrogen atom, more preferably a methyl group, an ethyl group or a hydrogen atom, even more preferably a hydrogen atom.

In the formula, $L^{101}$ is preferably a single bond, —O—CO—, —CO—O—, —CH=CH— or —C≡C— (in which ** indicates the side indicated by "*" in formula (I-R)). More preferably it is a single bond.

In formula (I-R), $Q^2$ represents a bivalent cyclic linking group having at least one cyclic structure. The cyclic structure is preferably a 5-membered ring, a 6-membered ring, or a 7-membered ring, more preferably a 5-membered ring or a 6-membered ring, even more preferably a 6-membered ring. The cyclic structure may be a condensed ring. However, a monocyclic ring is preferred to a condensed ring for it. The ring in the cyclic ring may be any of an aromatic ring, an aliphatic ring, or a hetero ring. Examples of the aromatic ring are a benzene ring, a naphthalene ring, an anthracene ring, a phenanthrene ring. An example of the aliphatic ring is a cyclohexane ring. Examples of the hetero ring are a pyridine ring and a pyrimidine ring.

The benzene ring-having group for $Q^2$ is preferably a 1,4-phenylene group. The naphthalene ring-having group is preferably a naphthalene-1,4-diyl group, a naphthalene-1,5-diyl group, a naphthalene-1,6-diyl group, a naphthalene-2,5-diyl group, a naphthalene-2,6-diyl group, or a naphthalene-2,7-diyl group. The cyclohexane ring-having group is preferably a 1,4-cyclohexylene group. The pyridine ring-having group is preferably a pyridine-2,5-diyl group. The pyrimidine ring-having group is preferably a pyrimidin-2,5-diyl group. More preferably, $Q^2$ is a 1,4-phenylene group, a naphthalene-2,6-diyl group, or a 1,4-cyclohexylene group.

In the formula, $Q^2$ may have a substituent. Examples of the substituent are a halogen atom (e.g., fluorine atom, chlorine atom, bromine atom, iodine atom), cyano, nitro, an alkyl group having from 1 to 16 carbon atoms, an alkenyl group having from 1 to 16 carbon atoms, an alkynyl group having from 2 to 16 carbon atoms, a halogen atom-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms. The substituent is preferably a halogen atom, a cyano group, an alkyl group having from 1 to 6 carbon atoms, a halogen atom-substituted alkyl group having from 1 to 6 carbon atoms, more preferably a halogen atom, an alkyl group having from 1 to 4 carbon atoms, a halogen atom-substituted alkyl group having from 1 to 4 carbon atoms, even more preferably a halogen atom, an alkyl group having from 1 to 3 carbon atoms, or a trifluoromethyl group.

In the formula, n1 indicates an integer of from 0 to 4. n1 is preferably an integer of from 1 to 3, more preferably 1 or 2.

In the formula, $L^{102}$ represents —O—, —O—CO—, —CO—O—, —O—CO—O—, —S—, —NH—, —SO$_2$—, —CH$_2$—, —CH=CH— or —C≡C—, where "**" indicates the site linking to the $Q^2$ side.

$L^{102}$ preferably represents —O—, —O—CO—, —CO—O—, —O—CO—O—, —CH$_2$—, —CH=CH— or —C≡C—, or more preferably —O—, —O—CO—, —O—CO—O— or **—CH$_2$—.

When the above group has a hydrogen atom, then the hydrogen atom may be substituted with a substituent. Examples of the substituent are a halogen atom, a cyano group, a nitro group, an alkyl group having from 1 to 6 carbon atoms, a halogen atom-substituted alkyl group having from 1 to 6 carbon atoms, an alkoxy group having from 1 to 6 carbon atoms, an acyl group having from 2 to 6 carbon atoms, an alkylthio group having from 1 to 6 carbon atoms, an acyloxy group having from 2 to 6 carbon atoms, an alkoxycarbonyl group having from 2 to 6 carbon atoms, a carbamoyl group, an alkyl group-substituted carbamoyl group having from 2 to 6 carbon atoms, and an acylamino group having from 2 to 6 carbon atoms. Especially preferred are a halogen atom, and an alkyl group having from 1 to 6 carbon atoms.

In the formula, $L^{103}$ represents a bivalent linking group selected from —O—, —S—, —C(=O)—, —SO$_2$—, —NH—, —CH$_2$—, —CH=CH— and —C≡C—, and a group formed by linking two or more of these. The hydrogen atom in —NH—, —CH$_2$— and —CH=CH— may be substituted with any other substituent. Examples of the substituent are a halogen atom, a cyano group, a nitro group, an alkyl group having from 1 to 6 carbon atoms, a halogen atom-substituted alkyl group having from 1 to 6 carbon atoms, an alkoxy group having from 1 to 6 carbon atoms, an acyl group having from 2 to 6 carbon atoms, an alkylthio group having from 1 to 6 carbon atoms, an acyloxy group having from 2 to 6 carbon atoms, an alkoxycarbonyl group having from 2 to 6 carbon atoms, a carbamoyl group, an alkyl group-substituted carbamoyl group having from 2 to 6 carbon atoms, and an acylamino group having from 2 to 6 carbon atoms. Especially preferred are a halogen atom, and an alkyl group having from 1 to 6 carbon atoms. The group substituted with the substituent improves the solubility of the compound of formula (DI) in solvent, and therefore the composition of the invention containing the compound can be readily prepared as a coating liquid.

In the formula, $L^{103}$ is preferably a linking group selected from a group consisting of —O—, —C(=O)—, —CH$_2$—, —CH=CH— and —C≡C—, and a group formed by linking two or more of these. $L^{103}$ preferably has from 1 to 20 carbon atoms, more preferably from 2 to 14 carbon atoms. Preferably, $L^{23}$ has from 1 to 16 (—CH$_2$—)'s, more preferably from 2 to 12 (—CH$_2$—)'s.

In the formula, $Q^1$ represents a polymerizable group or a hydrogen atom. When the compound of formula (DI) is used in producing optical films of which retardation is required not to change by heat, such as optical compensatory films, $Q^1$ is preferably a polymerizable group. The polymerization for the group is preferably addition polymerization (including ring-cleavage polymerization) or polycondensation. In other words, the polymerizing group preferably has a functional group that enables addition polymerization or polycondensation. Examples of the polymerizing group are shown below.

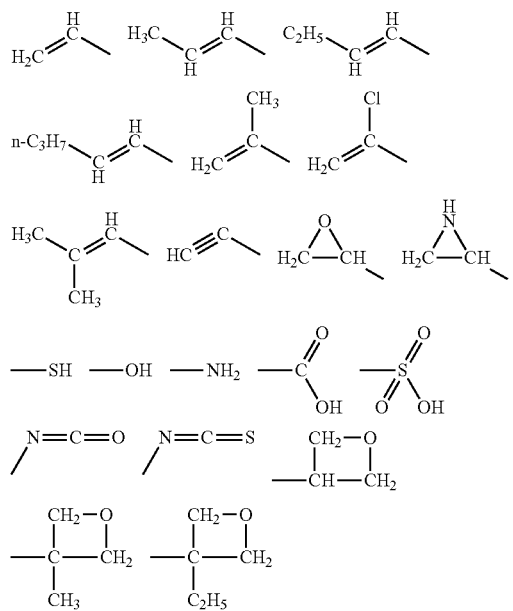

More preferably, the polymerizable group is addition-polymerizable functional group. The polymerizable group of the type is preferably a polymerizable ethylenic unsaturated group or a ring-cleavage polymerizable group.

Examples of the polymerizable ethylenic unsaturated group are the following (M-1) to (M-6):

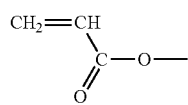
(M-1)

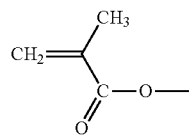
(M-2)

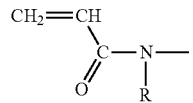
(M-3)

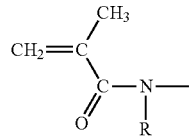
(M-4)

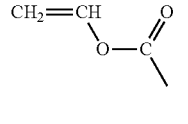
(M-5)

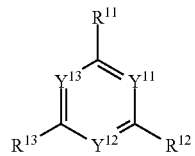
(M-6)

In formulae (M-3) and (M-4), R represents a hydrogen atom or an alkyl group. R is preferably a hydrogen atom or a methyl group. Of formulae (M-1) to (M-6), preferred are formulae (M-1) and (M-2), and more preferred is formula (M-1).

The ring-cleavage polymerizable group is preferably a cyclic ether group, or more preferably an epoxy group or an oxetanyl group.

Among the compounds represented by formula (DI), the compounds represented by formula (DI') are preferable.

(DI')

In formula (DI'), $Y^{11}$, $Y^{12}$ and $Y^{13}$ each independently represent a methine group or a nitrogen atom, preferably represent a methine, or even more preferably represent a non-substituted methine.

In the formula, $R^{11}$, $R^{12}$ and $R^{13}$ each independently represent the following formula represent the following formula (I'-A), (I'-B) or (I'-C). When the small wavelength dispersion of birefringence is needed, preferably, $R^{11}$, $R^{12}$ and $R^{13}$ each represent the following formula (I'-A) or (I'-C), more preferably the following formula (I'-A). Preferably, $R^{11}$, $R^{12}$ and $R^{13}$ are same ($R^{11}=R^{12}=R^{13}$).

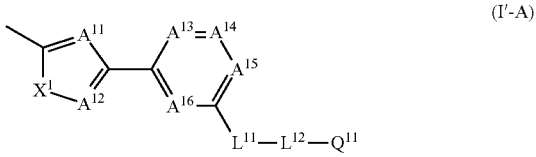
(I'-A)

In formula (I'-A), $A^{11}$, $A^{12}$, $A^{13}$, $A^{14}$, $A^{15}$ and $A^{16}$ each independently represent a methine group or a nitrogen atom.

Preferably, at least one of $A^{11}$ and $A^{12}$ is a nitrogen atom; more preferably the two are both nitrogen atoms.

Preferably, at least three of $A^{13}$, $A^{14}$, $A^{15}$ and $A^{16}$ are methine groups; more preferably, all of them are methine groups. Non-substituted methine is more preferable.

Examples of the substituent that the methine group represented by $A^{11}$, $A^{12}$, $A^{13}$, $A^{14}$, $A^{15}$ or $A^{16}$ may have are a halogen atom (fluorine atom, chlorine atom, bromine atom, iodine atom), cyano, nitro, an alkyl group having from 1 to 16 carbon atoms, an alkenyl group having from 2 to 16 carbon atoms, an alkynyl group having from 2 to 16 carbon atoms, a halogen-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms. Of those, preferred are a halogen atom, a cyano group, an alkyl group having from 1 to 6 carbon atoms, a halogen-substituted alkyl group having from 1 to 6 carbon atoms; more preferred are a halogen atom, an alkyl group having from 1 to 4 carbon atoms, a halogen-substituted alkyl group having from 1 to 4 carbon atoms; even more preferred are a halogen atom, an alkyl group having from 1 to 3 carbon atoms, a trifluoromethyl group.

In the formula, $X^1$ represents an oxygen atom, a sulfur atom, a methylene group or an imino group, and is preferably an oxygen atom.

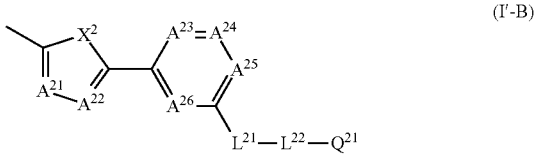
(I'-B)

In formula (I'-B), $A^{21}$, $A^{22}$, $A^{23}$, $A^{24}$, $A^{25}$ and $A^{26}$ each independently represent a methine group or a nitrogen atom.

Preferably, at least either of $A^{21}$ or $A^{22}$ is a nitrogen atom; more preferably the two are both nitrogen atoms.

Preferably, at least three of $A^{23}$, $A^{24}$, $A^{25}$ and $A^{26}$ are methine groups; more preferably, all of them are methine groups.

Examples of the substituent that the methine group represented by $A^{21}$, $A^{22}$, $A^{23}$, $A^{24}$, $A^{25}$ or $A^{26}$ may have are a halogen atom (fluorine atom, chlorine atom, bromine atom, iodine atom), cyano, nitro, an alkyl group having from 1 to 16 carbon atoms, an alkenyl group having from 2 to 16 carbon atoms, an alkynyl group having from 2 to 16 carbon atoms, a halogen-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms. Of those, preferred are a halogen atom, a cyano group, an alkyl group having from 1 to 6 carbon atoms, a halogen-substituted alkyl group having from 1 to 6 carbon atoms; more preferred are a halogen atom, an alkyl group having from 1 to 4 carbon atoms, a halogen-substituted alkyl group having from 1 to 4 carbon atoms; even more preferred are a halogen atom, an alkyl group having from 1 to 3 carbon atoms, a trifluoromethyl group.

In the formula, $X^2$ represents an oxygen atom, a sulfur atom, a methylene group or an imino group, but is preferably an oxygen atom.

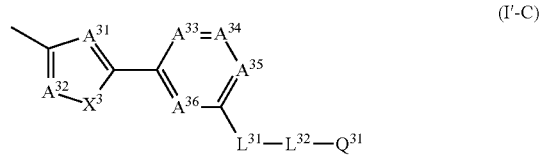
(I'-C)

In formula (I'-C), $A^{31}$, $A^{32}$, $A^{33}$, $A^{34}$, $A^{35}$ and $A^{36}$ each independently represent a methine group or a nitrogen atom.

Preferably, at least either of $A^{31}$ or $A^{32}$ is a nitrogen atom; more preferably the two are both nitrogen atoms.

Preferably, at least three of $A^{33}$, $A^{34}$, $A^{35}$ and $A^{36}$ are methine groups; more preferably, all of them are methine groups.

When $A^{31}$, $A^{32}$, $A^{33}$, $A^{34}$, $A^{35}$ and $A^{36}$ are methine groups, the hydrogen atom of the methine group may be substituted with a substituent. Examples of the substituent that the methine group may have are a halogen atom (fluorine atom, chlorine atom, bromine atom, iodine atom), cyano, nitro, an alkyl group having from 1 to 16 carbon atoms, an alkenyl group having from 2 to 16 carbon atoms, an alkynyl group having from 2 to 16 carbon atoms, a halogen-substituted alkyl group having from 1 to 16 carbon atoms, an alkoxy group having from 1 to 16 carbon atoms, an acyl group having from 2 to 16 carbon atoms, an alkylthio group having from 1 to 16 carbon atoms, an acyloxy group having from 2 to 16 carbon atoms, an alkoxycarbonyl group having from 2 to 16 carbon atoms, a carbamoyl group, an alkyl group-substituted carbamoyl group having from 2 to 16 carbon atoms, and an acylamino group having from 2 to 16 carbon atoms. Of those, preferred are a halogen atom, a cyano group, an alkyl group having from 1 to 6 carbon atoms, a halogen-substituted alkyl group having from 1 to 6 carbon atoms; more preferred are a halogen atom, an alkyl group having from 1 to 4 carbon atoms, a halogen-substituted alkyl group having from 1 to 4 carbon atoms; even more preferred are a halogen atom, an alkyl group having from 1 to 3 carbon atoms, a trifluoromethyl group.

In the formula, $X^3$ represents an oxygen atom, a sulfur atom, a methylene group or an imino group, but is preferably an oxygen atom.

$L^{11}$ in formula (I'-A), $L^{21}$ in formula (I'-B) and $L^{31}$ in formula (I'-C) each independently represent —O—, —O—CO—, —CO—O—, —O—CO—O—, —S—, —NH—, —SO$_2$—, —CH$_2$—, —CH═CH— or —C≡C—; preferably —O—, —O—CO—, —CO—O—, —O—CO—O—, —CH$_2$—, —CH═CH— or —C≡C—; more preferably —O—, —O—CO—, —CO—O—, —O—CO—O— or —C≡C—. $L^{11}$ in formula (I'-A) is especially preferable —O—, —CO—O— or —C≡C— in terms of the small wavelength dispersion of birefringence; among these, —CO—O— is more preferable because the discotic nematic phase may be formed at a higher temperature. When above group has a hydrogen atom, then the hydrogen atom may be substituted with a substituent. Preferred examples of the substituent are a halogen atom, cyano, nitro, an alkyl group having from 1 to 6 carbon atoms, a halogen atom-substituted alkyl group having from 1 to 6 carbon atoms, an alkoxy group having from 1 to 6 carbon atoms, an acyl group having from 2 to 6 carbon atoms, an alkylthio group having from 1 to 6 carbon atoms, an acyloxy group having from 2 to 6 carbon atoms, an alkoxycarbonyl group having from 2 to 6 carbon atoms, a carbamoyl group, an alkyl group-substituted carbamoyl group having from 2 to 6 carbon atoms, and an acylamino group having from 2 to 6 carbon atoms. Especially preferred are a halogen atom, and an alkyl group having from 1 to 6 carbon atoms.

$L^{12}$ in formula (I'-A), $L^{22}$ in formula (I'-B) and $L^{32}$ in formula (I'-C) each independently represent a bivalent linking group selected from —O—, —S—, —C(=O)—, —SO$_2$—, —NH—, —CH$_2$—, —CH=CH— and —C≡C—, and a group formed by linking two or more of these. The hydrogen atom in —NH—, —CH$_2$— and —CH=CH— may be substituted with a substituent. Preferred examples of the substituent are a halogen atom, cyano, nitro, hydroxy, carboxyl, an alkyl group having from 1 to 6 carbon atoms, a halogen atom-substituted alkyl group having from 1 to 6 carbon atoms, an alkoxy group having from 1 to 6 carbon atoms, an acyl group having from 2 to 6 carbon atoms, an alkylthio group having from 1 to 6 carbon atoms, an acyloxy group having from 2 to 6 carbon atoms, an alkoxycarbonyl group having from 2 to 6 carbon atoms, a carbamoyl group, an alkyl group-substituted carbamoyl group having from 2 to 6 carbon atoms, and an acylamino group having from 2 to 6 carbon atoms. More preferred are a halogen atom, hydroxy and an alkyl group having from 1 to 6 carbon atoms; and especially preferred are a halogen atom, methyl and ethyl.

Preferably, $L^{12}$, $L^{22}$ and $L^{32}$ each independently represent a bivalent linking group selected from —O—, —C(=O)—, —CH$_2$—, —CH=CH— and —C≡C—, and a group formed by linking two or more of these.

Preferably, $L^{12}$, $L^{22}$ and $L^{32}$ each independently have from 1 to 20 carbon atoms, more preferably from 2 to 14 carbon atoms. Preferably, $L^{12}$, $L^{22}$ and $L^{32}$ each independently have from 1 to 16 (—CH$_2$—)'s, more preferably from 2 to 12 (—CH$_2$—)'s.

The number of carbon atoms constituting the $L^{12}$, $L^{22}$ or $L^{32}$ may influence both of the liquid crystal phase transition temperature and the solubility of the compound. Generally, the compound having the larger number of the carbon atoms has a lower phase transition temperature at which the phase transition from the discotic nematic phase (Nd phase) transits to the isotropic liquid occurs. Furthermore, generally, the solubility for solvent of the compound, having the larger number of the carbon atoms, is more improved.

$Q^{11}$ in formula (I'-A), $Q^{21}$ in formula (I'-B) and $Q^{31}$ in formula (I'-C) each independently represent a polymerizable group or a hydrogen atom. Preferably, $Q^{11}$, $Q^{21}$ and $Q^{31}$ each represent a polymerizable group. The polymerization for the group is preferably addition polymerization (including ring-cleavage polymerization) or polycondensation. In other words, the polymerizing group preferably has a functional group that enables addition polymerization or polycondensation. Examples of the polymerizable group are same as those exemplified above. Their preferred ranges are the same as that of $Q^1$ in formula (I-R). $Q^{11}$, $Q^{21}$ and $Q^{31}$ may be same or different, and preferably, they are same.

Examples of the compound represented by formula (DI) include, but are not limited to, the compounds exemplified as [Compound 13]-[Compound 43], described in JP-A-2006-76992, [0052]; and the compounds exemplified as [Compound 13]-[Compound 36], described in JP-A-2007-2220, [0040]-[0063].

The compounds may be prepared according to any process. For example, the compounds may be prepared according to the method described in JP-A-2007-2220, [0064]-[0070].

The compound represented by formula (DII) may be used along with or in place of the compound represented by formula (DI) as a discotic liquid crystal compound.

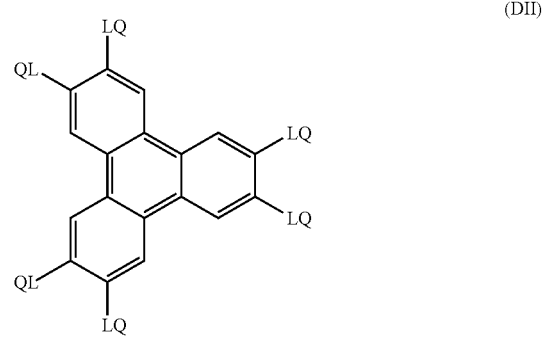

(DII)

In formula (DII), LQ (or QL) represents a combination of a bivalent linking group (L) and a polymerizable group (Q).

In formula (DII), the bivalent linking group (L) preferably represents a linking group selected from the group consisting of an alkylene, alkenylene, arylene, —CO—, —NH—, —O—, —S— and any combinations thereof. More preferably, the bivalent linking group (L) represents a linking group formed by combining at least two selected from the group consisting of an alkylene, arylene, —CO—, —NH—, —O—, and —S—. Even more preferably, the bivalent linking group (L) represents a linking group formed by combining at least two selected from the group consisting of an alkylene, arylene, —CO— and —O—. The number of the carbon atoms in the alkylene is preferably from 1 to 12. The number of the carbon atoms in the alkenylene is preferably from 2 to 12. The number of the carbon atoms in the arylene group is preferably from 6 to 10.

Examples of the bivalent linking group (L) include those described below. The left site links to the discotic core (D), and the right site links to the polymerizable group (Q). AL represents an alkylene or alkenylene; and AR represents an arylene. The alkylene, alkenylene or arylene may have at least one substituent such as an alkyl.

L1:-AL-CO—O-AL-,
L2:-AL-CO—O-AL-O—,
L3:-AL-CO—O-AL-O-AL-,
L4:-AL-CO—O-AL-O—CO—,
L5:—CO-AR-O-AL-,
L6:—CO-AR-O-AL-O—,
L7:—CO-AR-O-AL-O—CO—,
L8:—CO—NH-AL-,
L9:—NH-AL-O—,
L10:—NH-AL-O—CO—,
L11:—O-AL-,
L12:—O-AL-O—,
L13:—O-AL-O—CO—,

L14: —O-AL-O—CO—NH-AL-,
L15: —O-AL-S-AL-,
L16: —O—CO-AL-AR-O-AL-O—CO—,
L17: —O—CO-AR-O-AL-CO—,
L18: —O—CO-AR-O-AL-O—CO—,
L19: —O—CO-AR-O-AL-O-AL-O—CO—,
L20: —O—CO-AR-O-AL-O-AL-O-AL-O—CO—,
L21: —S-AL-,
L22: —S-AL-O—,
L23: —S-AL-O—CO—,
L24: —S-AL-S-AL-,
L25: —S-AR-AL-.

In formula (DII), the polymerizable group (Q) may be selected depending on the manner of the polymerization. Examples of the polymerizable group (Q) include those described below.

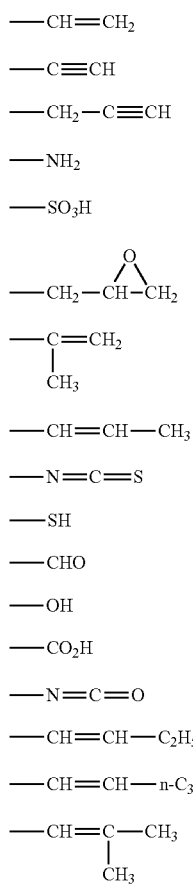

The polymerizable group (Q) is preferably selected from an unsaturated polymerizable group (Q1, Q2, Q3, Q7, Q8, Q15, Q16, and Q17) or from an epoxy group (Q6 and Q18), is more preferably selected from an unsaturated polymerizable group, or is even more preferably from ethylene-unsaturated polymerizable group (Q1, Q7, Q8, Q15, Q16 and Q17). Plural L and Q may be same or different from each other respectively.

The liquid crystalline compound to be used in the invention preferable exhibits a good monodomain property. If the monodomain property is bad, a polydomain structure results to cause alignment defects at the boundary between domains and in turn cause scattering of light. By exhibiting a good monodomain property, the retardation film tends to have a high light transmittance property.

The liquid-crystal phase that the liquid-crystal compound to be used in the invention expresses includes a columnar phase and a discotic nematic phase (ND phase). Of those liquid-crystal phases, preferred is a discotic nematic phase (ND phase) having a good monodomain property.

According to the invention, the liquid crystal compounds having smaller wavelength dispersion characteristics are more preferable. More specifically, the liquid crystal compounds having Re(450)/Re(650) of smaller than 1.25, equal to or smaller than 1.20, or equal to or smaller than 1.15 are preferable, where Re(λ) is retardation of the liquid crystal compound (retardation (nm) in-plane at a wavelength λ of a liquid crystal layer).

(2) Rod-Like Liquid Crystal Compound

Examples of the rod-like liquid-crystalline compound which can be used as the liquid crystal compound include azomethine compounds, azoxy compounds, cyanobiphenyl compounds, cyanophenyl esters, benzoate esters, cyclohexanecarboxylic acid phenyl esters, cyanophenylcyclohexane compounds, cyano-substituted phenylpyrimidine compounds, alkoxy-substituted phenylpyrimidine compounds, phenyldioxane compounds, tolan compounds and alkenylcyclohexylbenzonitrile compounds. Not only the low-molecular-weight, liquid-crystalline compound as listed in the above, high-molecular-weight, liquid-crystalline compound may also be used.

The rod-like liquid crystal molecules in the optically anisotropic layer are preferably fixed in an alignment state, or is more preferably fixed through polymerization reaction. Examples of the rod-like liquid-crystalline compound which can be used in the present invention include compounds described in Makromol. Chem., 190, p. 2255 (1989), Advanced Materials, 5, p. 107 (1993), U.S. Pat. No. 4,683,327, ditto U.S. Pat. No. 5,622,648, ditto U.S. Pat. No. 5,770,107, International Patent (WO) No. 95/22586, ditto No. 95/24455, ditto No. 97/00600, ditto No. 98/23580, ditto No. 98/52905, JP-A No. 1-272551, ditto No. 6-16616, ditto No. 7-110469, ditto No. 11-80081, and No. 2001-328973.

Two or more species of the rod-like liquid crystal compounds are preferably used for achieving the optical properties which the optically anisotropic layer is required to have. Preferable examples of the combination include the combination of at least one rod-like liquid crystal compound represented by formula (1) and at least one rod-like liquid crystal compound represented by formula (2).

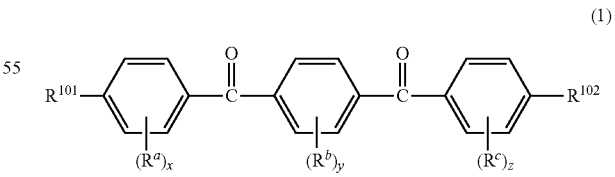

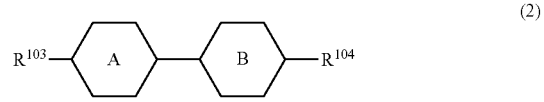

In the formulas (1) and (2), A and B each represent a group of an aromatic or aliphatic hydrocarbon ring or a hetero ring; $R^{101}$ to $R^{104}$ each represent a substituted or un-substituted, $C_{1-12}$ (preferably $C_{3-7}$) alkylene chain-containing alkoxy, acyloxy, alkoxycarbonyl or alkoxycarbonyloxy group; $R^a$, $R^b$ and $R^c$ each represent a substituent; x, y and z each indicate an integer of from 1 to 4.

In the formulae, the alkylene chain contained in $R^{101}$ to $R^{104}$ may be linear or branched. Preferably, the chain is linear. For curing the composition, preferably, $R^{101}$ to $R^{104}$ have a polymerizing group at the terminal thereof. Examples of the polymerizing group include an acryloyl group, a methacryloyl group, an epoxy group, etc.

In formula (1), preferably, x and z are 0 and y is 1. Preferably, one $R^b$ is a meta- or ortho-positioned substituent relative to the oxycarbonyl group or the acyloxy group. Preferably, $R^b$ is a $C_{1-12}$ alkyl group (e.g., methyl group), a halogen atom (e.g., fluorine atom), etc.

In the formula (2), preferably, A and B each are a phenylene group or a cyclohexylene group. Preferably, both of A and B are phenylene groups, or one of them is a cyclohexylene group and the other is a phenylene group.

(Surface Treatment of Laminate Film)

Preferably, the laminate film is subjected to a surface treatment.

When the laminate film of the invention is appropriately subjected to a surface treatment, it is possible to improve the adhesiveness to each of the functional layers (for example, an undercoat layer, a back layer, an optically anisotropic layer, etc.). Examples of the surface treatment include a glow discharge treatment, an irradiation treatment with ultraviolet rays, a corona treatment, a flame treatment, and a saponification treatment (an acid saponification treatment or an alkali saponification treatment), with a glow discharge treatment and an alkali saponification treatment being especially preferable. The "glow discharge treatment" as referred to herein is a treatment of applying a plasma treatment onto the film surface in the presence of a plasma-exciting gas. Details of these surface treatments are described in *Journal of Technical Disclosure*, No. 2001-1745, issued Mar. 15, 2001 by Japan Institute of Invention and Innovation and can be properly adopted.

In the embodiment wherein the laminate film is a cellulose acylate laminate film, in order to improve the adhesiveness of the film surface to the functional layer, as described in JP-A-7-333433, an undercoat layer (adhesive layer) can also be provided on the cellulose acylate laminate film in addition to the surface treatment or in place of the surface treatment. The undercoat layer is described on page 32 of *Journal of Technical Disclosure*, No. 2001-1745, issued Mar. 15, 2001 by Japan Institute of Invention and Innovation and can be properly adopted. Also, the functional layer which is provided on the cellulose acylate laminate film is described on pages 32 to 45 of *Journal of Technical Disclosure*, No. 2001-1745, issued Mar. 15, 2001 by Japan Institute of Invention and Innovation, and those described therein can be properly used on the cellulose acylate laminate film.

From the viewpoint of keeping the flatness of the film, in these treatments, it is preferable to regulate the temperature of the cellulose acylate laminate film to not higher than Tg (glass transition temperature), specifically not higher than 150° C.

In the case of using the cellulose acylate laminate film as a transparent protective film of polarizing plate, from the viewpoint of adhesiveness to the polarizing film, it is especially preferable to carry out an acid treatment or an alkali treatment, namely a saponification treatment on the cellulose acylate. The surface treatment of the cellulose acylate laminate film is specifically described below by reference to the alkali saponification treatment.

Preferably, the alkali saponification treatment is performed by a cycle including dipping the surface of the cellulose acylate laminate film in an alkali solution, neutralizing with an acidic solution, and then washing with water, followed by drying.

Examples of the alkali solution include a potassium hydroxide solution and a sodium hydroxide solution. A normality of hydroxide ion of the alkali solution is preferably in the range of from 0.1 to 3.0 N, and more preferably in the range of from 0.5 to 2.0 N. A temperature of the alkali solution is preferably in the range of from room temperature to 90° C., and more preferably in the range of from 40 to 70° C.

Surface energy of the cellulose acylate laminate film after the surface treatment is preferably 55 mN/m or more, and more preferably from 60 mN/m to 75 mN/m.

The surface energy of solid can be determined by a contact angle method, a wetting heat method, and an adsorption method as described in *Nure no Kiso to Oyo* (The Elements and Applications of Wetting), Realize Corporation (Dec. 10, 1989). In the case of the cellulose acylate laminate film, a contact angle method is preferably adopted.

Specifically, two kinds of solutions whose surface energies are already known are dripped onto the cellulose acylate laminate film, at the point of intersection of the surface of the droplet and the film surface, the angle containing the droplet is defined as a contact angle of the angle formed by the tangent line drawn on the droplet and the film surface, and the surface energy of the film can be found from the calculation.

(Formation of Aligned Film)

The aligned film has a function to specify the alignment direction of a liquid crystalline compound. The aligned film can be provided by a measure, for example, a rubbing treatment of an organic compound (preferably a polymer), the oblique vapor deposition of an inorganic compound, the formation of a layer having microgrooves, or the accumulation of an organic compound (for example, ω-tricosanic acid, dioctadecylmethylammonium chloride, and methyl stearate) by the Langmuir-Blodgett method (LB film). Furthermore, an aligned film in which an alignment function is generated by the application of an electric field, the application of a magnetic field or upon irradiation with light is also known. Preferably, the aligned film is formed by a rubbing treatment of a polymer. For the purpose of allowing an average tilt angle on the aligned film side of the optically anisotropic layer to have a desired value, as a material of the aligned film, in addition to polyvinyl alcohol, modified polyvinyl alcohol, polyimide, and modified polyimide, an acrylate monomer, a methacrylate monomer, polystyrene, and the like can be utilized. So far as the desired average tilt angle can be achieved, the material is not limited to the foregoing. For example, it is preferable to use copolymer compounds described in paragraphs [0014] to [0016] of JP-A-2002-98836; and from the viewpoint of improving a fine alignment axis distribution of the optically anisotropic layer, it is more preferable to use copolymer compounds described in paragraphs [0024] to [0029] and [0173] to [0180] of JP-A-2002-98836. Also, it is preferable to use copolymer compounds described in paragraphs [0007] to [0012] of JP-A-2005-99228; and in particular, from the viewpoint of improving a fine alignment axis distribution of the optically anisotropic layer, it is more preferable to use copolymer compounds described in paragraphs [0016] to [0020] of JP-A-2005-99228. From the viewpoint of improving the adhesion between the aligned film and the optically anisotropic layer, it is still more preferable that a constituent unit of each of the copolymers is substituted with a polymerizable group such as a vinyl group.

Re of the optically anisotropic layer is preferably less than 80 nm, and in particular, more preferably from 70 to 20 nm.

Also, the optically anisotropic layer is formed of a hybrid aligned liquid crystal composition. The hybrid alignment in which the average tilt angle of the liquid crystal molecule on the aligned film side is larger than the average tilt angle of the liquid crystal molecule on the opposite side is especially preferable. It is preferable that the liquid crystal molecule on the aligned film side is inclined by 45° or more (the average tilt angle is 45° or more); and from the standpoints of an increase of stability against an azimuth angle control force of azimuth angle of rubbing and an improvement of the fine alignment axis distribution, it is more preferable that the liquid crystal molecule on the aligned film side is inclined by 50° or more. On the other hand, the DLC molecule on the opposite side to the aligned film side is preferably inclined by not more than 45° (the average tilt angle is not more than 45°); and the DLC molecule on the opposite side to the aligned film side is more preferably inclined by not more than 40° because the hybrid alignment is stably formed, compensation for oblique incidence can be more precisely achieved, and CR with a higher viewing angle can be provided.

Incidentally, the state in which a discotic liquid crystal molecule is inclined by 45° or more means that an angle formed by the disc surface of the molecule to the plane direction is inclined by 45° or more.

The measure for making the average tilt angle of the liquid crystal molecule on the aligned film side to 45° or more can be carried out by any one or a combination of two or more methods selected from a method in which an additive capable of adjusting the tilt angle is added in the optically anisotropic layer to adjust the average tilt angle to a desired range; a method in which the aligned film is selected to adjust the average tilt angle to a desired range; and other methods such as oblique vapor deposition and photo-alignment.

Preferably, not only a direction in which Re(550) is 0 nm is not present in the optically anisotropic layer formed of the liquid crystal composition, but a direction in which an absolute value of Re(550) becomes minimum is not present in the normal direction of the layer and within the plane. Furthermore, an optically anisotropic layer which is formed by immobilizing a disc-shaped liquid crystal composition in a hybrid aligned state on the aligned film of the laminate film after the alignment treatment is preferable.

That is, from the viewpoint of compensation of a liquid crystal cell, it is preferable that the optically anisotropic layer formed of a liquid crystal composition contains a disc-shaped liquid crystal compound.

When Re(550) of the optically anisotropic layer formed of a liquid crystal composition is 20 nm or more, the optical compensation ability which has been achieved by a laminate film having the same configuration as that in the related art is sufficiently obtainable. Also, in the case where Re(550) is less than 70 nm, when a direction in which Re(550) is 0 nm is not present, and a direction in which an absolute value of Re(550) becomes minimum is not present in the normal direction of the layer or within the plane, the liquid crystal of a hybrid aligned cell can be sufficiently compensated, and therefore, a contrast viewing angle and a tint are improved. Thus, such is preferable.

Re(550) of the optically anisotropic layer formed of a liquid crystal composition is more preferably from 20 to 70 nm, and especially preferably from 30 to 60 nm.

The manufacturing method of the optically compensatory film includes a step of forming an optically anisotropic layer formed of a liquid crystal composition on the surface of the laminate film on the side on which the aligned film is formed.

The optically anisotropic layer formed of a liquid crystal composition is formed on the surface of the laminate film on the side on which the aligned film is formed. In detail, preferably, the optically anisotropic layer formed of a liquid crystal composition is formed by disposing a composition for optically anisotropic layer formed of a liquid crystal composition containing at least one liquid crystal compound on the surface of the laminate film on the side on which the aligned film is formed, making a molecule of the liquid crystal compound in a desired aligned state, and curing it by polymerization, thereby immobilizing the aligned state. Furthermore, in order to satisfy properties required for the optically anisotropic layer formed of a liquid crystal compound such that not only a direction in which Re(550) is 0 nm is not present, but a direction in which an absolute value of Re(550) becomes minimum is not present in the normal direction of the layer and within the plane, it is more preferable to immobilize the molecule of the liquid crystal compound (including both rod-shaped and disc-shaped molecules) in a hybrid aligned state. The hybrid alignment as referred to herein means an aligned state in which the director direction of the liquid crystal molecule continuously changes in the thickness direction of the layer. In the case of a rod-shaped molecule, the director is the major axis direction, and in the case of a disc-shaped molecule, the director is the normal direction of the disc surface.

For the purposes of making the molecule of the liquid crystal compound in a desired aligned state and improving coating properties or curing properties of the liquid crystal composition, the composition may contain one or more additives.

In order to hybrid align the molecule of the liquid crystal compound (in particular, the rod-shaped liquid crystal compound), an additive capable of controlling the alignment of the layer on the air interface side (hereinafter referred to as "air interface alignment controlling agent") may be added. Examples of such an additive include low-molecular or high-molecular weight compounds having a hydrophilic group such as a fluorinated alkyl group and a sulfonyl group. Specific examples of the air interface alignment controlling agent which can be used include compounds described in JP-A-2006-267171.

Also, in the case of preparing the liquid crystal composition as a coating solution and coating it to form an optically anisotropic layer formed of the liquid crystal composition, a surfactant may be added for the purpose of improving the coating properties. The surfactant is preferably a fluorine-based compound, and specific examples thereof include compounds described in paragraphs [0028] to [0056] of JP-A-2001-330725. Also, a commercially available "MEGAFAC F780" (manufactured by DIC Corporation) etc. may be used.

The tilt angle on the aligned film side can be adjusted by adding illustrative compounds described in paragraphs [0010] to [0016] and [0042] to [0063] of JP-A-2006-11350 and illustrative compounds described in paragraphs [0209] to [0238] of JP-A-2006-195140.

Also, the liquid crystal composition preferably contains a polymerization initiator. Though the polymerization initiator may be a heat polymerization initiator or a photopolymerization initiator, a photopolymerization initiator is preferable from the viewpoint of easiness in controlling or the like. Preferred examples of the polymerization initiator capable of generating a radical by the action of light include α-carbonyl compounds (as described in U.S. Pat. Nos. 2,367,661 and 2,367,670), acyloin ethers (as described in U.S. Pat. No. 2,448,828), α-hydrocarbon-substituted aromatic acyloin compounds (as described in U.S. Pat. No. 2,722,512), polynuclear quinone compounds (as described in U.S. Pat. Nos. 3,046,127 and 2,951,758), combinations of a triarylimidazole dimer and p-aminophenyl ketone (as described in U.S. Pat. No. 3,549,367), acridine and phenazine compounds (as described in JP-A-60-105667 and U.S. Pat. No. 4,239,850), oxadiazole compounds (as described in U.S. Pat. No. 4,212,970), acetophenone-based compounds, benzoin ether-based compounds, benzyl-based compounds, benzophenone-based compounds, and thioxanthone-based compounds. Examples of the acetophenone-based compound include 2,2-diethoxyacetophenone, 2-hydroxymethyl-1-phenylpropan-1-one, 4'-isopropyl-2-hydroxy-2-methyl-propiophenone, 2-hydroxy-2-methyl-propiophenone, p-dimethylaminoacetone, p-tert-butyldichloroacetophenone, p-tert-butyltrichloroacetopheone, and p-azidobenzalacetophenone. Examples of the benzyl-based compound include benzyl, benzyl dimethyl ketal, benzyl-β-methoxyethyl acetal, and 1-hydroxycyclohexyl phenyl ketone. The benzoin ether-based compounds include benzoin, benzoin methyl ether, benzoin ethyl ether, benzoin n-propyl ether, benzoin isopropyl ether, benzoin-n-butyl ether, and benzoin isobutyl ether. Examples of the benzophenone-based compound include benzophenone, methyl o-benzoylbenzoate, Michler's ketone, 4,4'-bisdiethylaminobenzophenone, and 4,4'-dichlorobenzophenone. Examples of the thioxanthone-based compound include thioxanthone, 2-methylthioxanthone, 2-ethylthioxanthone, 2-isopropylthioxanthone, 4-isopropylthioxanthone, 2-chlorothioxanthone, and 2,4-diethylthioxanthone. Of photosensitive radical polymerization initiators formed of such an aromatic ketone, acetophenone-based compounds and benzyl-based compounds are preferable from the standpoints of curing properties, storage stability, odors, and the like. Such a photosensitive radical polymerization initiator formed of an aromatic ketone can be used singly or in combination of two or more kinds thereof depending upon the desired performance.

For the purpose of increasing the sensitivity, in addition to the polymerization initiator, a sensitizer may be used. Examples of the sensitizer include n-butylamine, triethylamine, tri-n-butyl phosphine, and thioxanthone.

Plural kinds of the photopolymerization initiator may be combined, and the use amount thereof is preferably from 0.01 to 20% by mass, and more preferably from 0.5 to 5% by mass of the solids of the coating solution. For light irradiation for polymerization of the liquid crystal compound, it is preferable to use ultraviolet rays.

The liquid crystal composition may contain a non-liquid crystalline polymerizable monomer in addition to the polymerizable liquid crystal compound. Preferred examples of the polymerizable monomer include compounds having a vinyl group, a vinyloxy group, an acryloyl group, or a methacryloyl group. Use of a polyfunctional monomer having two or more polymerizable reactive functional groups, such as ethylene oxide-modified trimethylolpropane acrylate, is preferable because the durability is improved.

Since the non-liquid crystalline polymerizable monomer is a non-liquid crystalline component, its addition amount does not exceed 15% by mass relative to the liquid crystal compound and is preferably from about 0 to 10% by mass.

The optically anisotropic layer formed of a liquid crystal composition can be formed by preparing the liquid crystal composition as a coating solution, coating the coating solution on, for example, the surface of the laminate film serving as a support on the aligned film side, drying to remove the solvent, and aligning the molecule of the liquid crystal compound, followed by curing by means of polymerization. As the aligned film which can be utilized, the polymers exemplified above for forming the aligned film can be used, and examples thereof include a polyvinyl alcohol film and a polyimide film.

The coating method may be any known method such as a curtain coating method, a dipping method, a spin coating method, a print coating method, a spray coating method, a slot coating method, a roll coating method, a slide coating method, a blade coating method, a gravure coating method, and a wire bar coating method.

At the time of drying the coating film, heating may be performed. The desired aligned state is obtained by drying the coating film and removing the solvent and simultaneously aligning the molecule of the liquid crystal compound in the coating film.

Next, the polymerization is allowed to proceed by means of irradiation with ultraviolet rays or the like to immobilize the aligned state, thereby forming the optically anisotropic layer formed of a liquid crystal composition. For the irradiation with light for the polymerization, it is preferable to use ultraviolet rays. The irradiation energy is preferably from 20 mJ/cm$^2$ to 50 J/cm$^2$, and more preferably from 100 mJ/cm$^2$ to 800 mJ/cm$^2$. For accelerating the photopolymerization, the irradiation with light may be carried out under a heating condition.

The embodiment of utilizing the laminate film for a liquid crystal display device of a twisted alignment mode is an embodiment of utilizing the laminate film as a protective film of a polarizing plate, in particular, an inside protective film. The laminate film may be utilized as an inside protective film and also as a support of the optically compensatory film. Specifically, the laminate film can also be applied to a polarizing plate having at least the laminate film and a polarizing film. In incorporating the polarizing plate into a liquid crystal display device, it is preferable to dispose the laminate film so as to face at the liquid crystal cell side. Also, it is preferable to stick the surface of the laminate film and the surface of the polarizing film to each other; and it is preferable to achieve sticking such that an intersection angle between an in-plane slow axis of the laminate film and a transmission axis of the polarizing film is approximately zero degree. The intersection angle is not necessarily strictly zero degree, and an error of about ±5 degrees, which is tolerable on the manufacture, does not affect the effects of the invention and is tolerable. Also, it is preferable that a protective film such as the laminate film is stuck onto the other surface of the polarizing film.

(Polarizing Film)

Examples of the polarizing film include an iodine-based polarizing film, a dye-based polarizing film using a dichroic dye, and a polyene-based polarizing film, and all of these may be used in the invention. In general, the iodine-based polarizing film and the dye-based polarizing film are manufactured using a polyvinyl alcohol-based film.

(Protective Film)

As the protective film to be stuck onto the other surface of the polarizing film, it is preferable to use a transparent polymer film. The term "transparent" means that the film has a light transmittance of 80% or more. As the protective film, a cellulose acylate film and a polyolefin film containing a polyolefin are preferable. Of cellulose acylate films, a cellulose triacetate film is preferable. Also, of polyolefin films, a cyclic polyolefin-containing polynorbornene film is preferable.

A thickness of the protective film is preferably from 20 to 500 μm, and more preferably from 50 to 200 μm.

(Light Diffusion Film)

The polarizing plate may have a light diffusion film on the surface of one side of the polarizing film. The light diffusion film may be a single-layer film or may be a laminate film.

Examples of an embodiment of a laminate film include a light diffusion film having a light scattering layer. The light diffusion film contributes to an improvement of the viewing angle when the viewing angle is inclined in the up/down right/left direction. In an embodiment in which an antireflection layer is disposed outside the polarizing film on the display surface side, especially high effects are brought. The light diffusion film (or its light scattering layer) can be formed from a composition having a fine particle dispersed in a binder. The fine particle may be an inorganic fine particle or may be an organic fine particle. As to the binder and the fine particle, it is preferable that a difference in refractive index is from about 0.02 to 0.20. Also, the light diffusion film (or its light scattering layer) may also be provided with a hard coat function. Examples of the light diffusion film which can be utilized in the invention include those in which a light scattering coefficient is specified, as described in JP-A-11-38208; those in which a relative refractive index between a transparent resin and a fine particle is allowed to fall within a specified range, as described in JP-A-2000-199809; and those in which a haze value is specified to be 40% or more, as described in JP-A-2002-107512.

(Hard Coat Film, Antiglare Film, and Antireflection Film)

The cellulose acylate film may be applied to a hard coat film, an antiglare film, or an antireflection film, as the case may be. For the purpose of enhancing the visibility of a flat panel display such as LCD, PDP, CRT, and EL, any one or all of a hard coat layer, an antiglare layer, and an antireflection layer can be given on one or both surfaces of the cellulose acylate film. Desirable embodiments as such an antiglare film or antireflection film are described in detail in *Journal of Technical Disclosure*, No. 2001-1745, pages 54 to 57, issued on Mar. 15, 2001 by Japan Institute of Invention and Innovation, and those can be preferably adopted in the cellulose acylate film.

(Fabrication Method of Polarizing Plate)

The polarizing plate can be manufactured as a longitudinal polarizing plate. For example, by using the laminate film, an aligned film-forming coating solution is optionally coated onto its surface to form an aligned film; subsequently, a coating solution for forming optically anisotropic layer formed of the liquid crystal composition is continuously coated on the surface of the laminate film on the aligned film side and dried to make it in a desired aligned state; thereafter, the resultant is irradiated with light, thereby immobilizing the aligned state to form an optically anisotropic layer formed of the liquid crystal composition. The thus fabricated longitudinal retardation film can be wound up in a roll form. Separately, by sticking a longitudinal polarizing film and a longitudinal polymer film for a protective film, each of which is wound in a roll form, to each other in a roll-to-roll manner, the stack can be fabricated as a longitudinal polarizing plate. For example, the longitudinal polarizing plate is conveyed and stored in a wound-up state in a roll form, and at the time of incorporation into a liquid crystal display device, it is cut into a desired size. Incidentally, the polarizing plate may have other form than the longitudinal form, and the fabrication methods as described herein are merely an example.

At the time of fabricating the laminate film, when it is stretched in a direction orthogonal to the conveyance direction of the film, it becomes possible to achieve roll-to-roll processing at the time of fabrication of a polarizing plate, and simplification of the process, an enhancement of the sticking precision to the axis of the polarizing film, and the like can be achieved; and therefore, such is preferable.

In a polarizing plate which is used for a liquid crystal display device of a vertical alignment mode, the optically anisotropic layer and the aligned film which are formed in the polarizing plate to be used for a liquid crystal display device of a twisted alignment mode may be omitted.

EXAMPLES

The present invention is hereunder more specifically described by reference to Examples and Comparative Examples. Materials, use amounts, proportions, treatment contents, treatment procedures, and so on shown in the following Examples can be properly changed so far as the gist of the invention is not deviated. In consequence, it should not be construed that the scope of the invention is limited to the following specific examples.

<<Measurement Methods>>

First of all, measurement methods and evaluation methods of properties used in the following Examples and Comparative Examples are hereunder described.

(1) Measurement of Outer Layer Film Thickness of Laminate Film:

A Si intensity was measured using a fluorescent X-ray analyzer (XRF-1700, manufactured by Shimadzu Corporation) from each side of the outer layer A and the outer layer B. A single-layer film was formed of an outer layer dope in advance, and a thickness of each of the outer layers of a laminate film was determined according to a calibration curve prepared through film thickness measurement and measurement of Si intensity.

As measuring positions, a central position in the width direction was employed as the center, and a position of 40 mm located inside from an end of a film in a roll form was employed as the end part.

(2) Measurement of Optical Properties of Laminate Film:

Re and Rth were measure using KOBRA 21ADH (manufactured by Oji Scientific Instruments).

Measuring positions are the same as the foregoing positions at which the outer layer film thickness was measured.

(3) Evaluation of Luminescent Spot of Optically Compensatory Film:

A portion of 1 m or more was sampled from an optically compensatory film in a roll form; two polarizing plates were disposed on a light table in such a manner that their absorption axes were orthogonal to each other; the optically compensatory film was disposed between the polarizing plates; and a number of luminescent spots of 1 mm or more was counted through observation with a magnifier. The number of luminescent spots per $m^2$ was evaluated according to the following criteria.

A: Not more than 2 per $m^2$
B: From 3 to 9 per $m^2$
C: 10 or more per $m^2$ (4) Evaluation of Position Dependency of Display Properties in Liquid Crystal Display Device:

As to a liquid crystal display device of a TN mode, a viewing angle in the up/down right/left direction was calculated, and as to a liquid crystal display device of a VA mode, a viewing angle in the oblique direction by 45° was calculated.

Specifically, as to the liquid crystal display devices fabricated in the following Examples, by using an analyzer (EZ-Contrast 160D, manufactured by ELDIM), a contrast ratio was calculated from results of brightness measurement of black display and white display. An average value of contrast ratio (white brightness/black brightness) was determined in the up/down right/left direction (TN) at a polar angle of 45° or in the oblique direction (VA) at azimuth angles of 45°, 135°, 225°, and 315°.

Also, as to measuring points, the measurement was performed at five points including a center and four corners of the display device, and with respect to a contrast ratio at the measuring point at which the contrast ratio is the most different from that in the center among the four corners, a difference thereof from the contrast ratio in the center was calculated in terms of a proportion and evaluated according to the following criteria.

A: A difference between the center and the four corners of the display device is less than 10%.

B: A difference between the center and the four corners of the display device is 10% or more and less than 30%.

C: A difference between the center and the four corners of the display device is 30% or more.

1. Fabrication of Laminate Film:

(1) Preparation of Dope:

A cellulose acylate solution as described below was prepared and used as a dope for each of the inner layer and the outer layers A and B.

| Composition of cellulose acylate solution for inner layer | |
|---|---|
| Cellulose acylate resin (shown in the table below): | 100.0 parts by mass |
| Methylene chloride (first solvent): | 284.2 parts by mass |
| Methanol (second solvent): | 71.9 parts by mass |
| Butanol (third solvent) | 3.6 parts by mass |
| Plasticizer (shown in the table below): | Shown in the table blow |
| Ultraviolet ray absorber (shown in the table below): | Shown in the table blow |

Plasticizer oligomer A: Copolymer having the acetylated both terminals of terephthalic acid/adipic acid/ethylene glycol/propylene glycol (copolymerization ratio: 1/1/1/1, number average molecular weight: 1,200)

Plasticizer oligomer B: Copolymer having the acetylated both terminals of adipic acid/ethylene glycol/propylene glycol (copolymerization ratio: 10/7/3, number average molecular weight: 1,000)

Plasticizer oligomer C: Copolymer having the acetylated both terminals of phthalic acid/adipic acid/ethylene glycol (copolymerization ratio: 1/1/2, number average molecular weight: 800)

Plasticizer oligomer D: Copolymer having the acetylated both terminals of phthalic acid/adipic acid/succinic acid/ethylene glycol (copolymerization ratio: 5.0/2.5/2.5/10.0, number average molecular weight: 800)

Ultraviolet ray absorber mixture B: Mixture of following Compound 1/following Compound 2/following Compound 3 (mixing ratio: 2/2/1)

Ultraviolet ray absorber mixture C: Mixture of following Compound 2/following Compound 3/following Compound 4 (mixing ratio: 1/1/3)

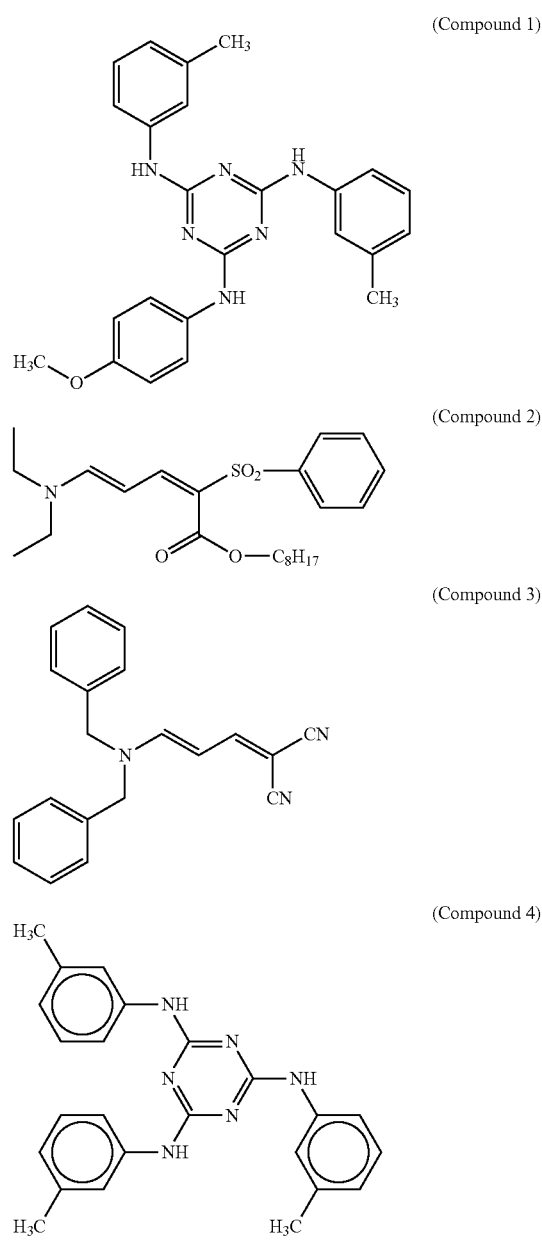

A substituent and a substitution degree of each of the cellulose acylate species used in the following Examples are shown in Table 1 below.

TABLE 1

| Cellulose acylate species | Total substitution degree | Acetyl substitution degree | Propionyl substitution degree |
|---|---|---|---|
| TAC | 2.86 | 2.86 | 0 |
| CAP | 2.38 | 1.54 | 0.84 |
| DAC | 2.45 | 2.54 | 0 |

| Composition of cellulose acylate solution for outer layers A and B | |
| --- | --- |
| Cellulose acylate resin (shown in the table below): | 100.0 parts by mass |
| Methylene chloride (first solvent): | 335.0 parts by mass |
| Methanol (second solvent): | 84.8 parts by mass |
| Butanol (third solvent) | 4.2 parts by mass |
| Silica particle having an average particle size of 16 nm (AEROSIL R972, manufactured by Nippon Aerosil Co., Ltd.): | 0.1 part by mass |
| Plasticizer (shown in the table below): | Shown in the table below |
| Ultraviolet ray absorber (shown in the table below): | Shown in the table below |

The foregoing cellulose acylate solution was thrown into a mixing tank and stirred to dissolve the respective components, and the solution was then filtered with a filter paper having an average pore size of 34 μm and a sintered metal filter having an average pore size of 10 μm, thereby preparing a cellulose acylate dope.

(Synthetic Example of Norbornene-base Polymer)

In a reactor replaced with nitrogen, 400 parts of 8-methyl-8-methoxy carbonyl tetracyclo[4.4.0.1$^{2,5}$.1$^7$,10]-3-dodecene, 100 parts of 5-(4-biphenylcarbonyloxymethyl)bicyclo[2.2.1]hept-2-en, 36 parts of 1-hexene and 1500 parts of toluene were placed, and the solution was heated to 60 degrees Celsius. Next, the solution in the reactor was added with 1.24 parts of a toluene solution of triethyl aluminum (1.5 mol/l) as a polymerization catalyst, and 7.4 parts of a toluene solution of tungsten hexachloride (0.05 mol/l) denatured by t-butanol and methanol (t-butanol:methanol:tungsten=0.35 mol:0.3 mol:1 mol), the system was stirred under heating at 80 degrees Celsius for 3 hours to proceed a ring-opening polymerization reaction, to thereby obtain a solution of ring-opened polymer.

Four thousand parts of thus-obtained ring-opened polymer solution was placed in an autoclave, 0.48 parts of RuHCl(CO)[P(C$_6$H$_5$)$_3$]$_3$ was added thereto, and the mixture was stirred for 3 hours under conditions of a hydrogen gas pressure of 100 kg/cm$^2$ and a reaction temperature of 165° C., to thereby proceed a hydrogenation reaction.

The obtained reaction solution (hydrogenated polymer solution) was cooled, and the hydrogen gas was discharged. The reaction solution was poured into a large amount of methanol, the precipitate was separated and collected, and then dried to obtain a hydrogenated polymer, norbornene-base polymer.

A norbornene-base polymer solution as described below was prepared and used as a dope for each of the inner layer and the outer layers A and B.

| Formulation of norbornene-base polymer solution for inner layer | |
| --- | --- |
| Norbornene Norbornene-base polymer | 100.0 parts by mass |
| Toluene | 360.0 parts by mass |
| Plasticizer (shown in the table below) | Shown in the table blow |
| Ultraviolet ray absorber (shown in the table below) | Shown in the table blow |

| Formulation of norbornene-base polymer solution for outer layers A and B | |
| --- | --- |
| Norbornene Norbornene-base polymer | 100.0 parts by mass |
| Toluene | 425.0 parts by mass |
| Silica particle having an average particle size of 16 nm (AEROSIL R972, manufactured by Nippon Aerosil Co., Ltd.): | 0.1 part by mass |
| Plasticizer (shown in the table below) | Shown in the table blow |
| Ultraviolet ray absorber (shown in the table below) | Shown in the table blow |

(2) Co-casting of Solutions

Cellulose Acylate Laminate Film:

The thus prepared cellulose acylate solutions (dopes) were co-cast on a mirror-finished stainless steel support as a drum having a diameter of 3 m through a casting die. The adjustment of a total film thickness expressed by a total sum of the inner layer and the outer layers A and B at each position in the width direction was carried out by adjusting a clearance at an outlet of the casting die; and the adjustment of the film thickness of the outer layers A and B at each position in the width direction was carried out by adjusting the flow rate of the outer layer dope the width of a passage at the time of joining the inner layer within the casting die and a clearance at a position in the width direction.

Subsequently, the dope co-cast on the drum was stripped off at a PIT draw of 103%, and the web was grasped by a pin-shaped tenter and conveyed within a dry zone. When a solid concentration reached 77%, and a film surface temperature reached 48° C., the resulting web was subjected to a stretching treatment at a stretch ratio of 110% in the orthogonal direction (TD direction) to the conveyance direction, and was dried in two stages with hot air of 100 degrees Celsius and 150 degrees Celsius.

Furthermore, the web was conveyed within the dry zone in a state in which the web was grasped by the pin-shaped tenter, and drying was allowed to proceed until the solid concentration reached 97% or more. Thereafter, the web was taken out from the pin-shaped tenter and further dried under a dry air at 140° C. until the solid concentration reached 99% or more, followed by winding up to obtain a cellulose acylate laminate film.

It is to be noted that, according to Examples 18-35 (except Examples 23, 29 32 and 34), when a solid concentration reached 77%, and a film surface temperature reached 48° C., the resulting web was subjected to a stretching treatment at a stretch ratio of 115% in the orthogonal direction (TD direction) to the conveyance direction, and was dried in two stages with hot air of 120 degrees Celsius and 150 degrees Celsius. Other conditions for preparing the films were same as those described above.

Norbornene-base Polymer Laminate Film:

The norbornene-base polymer solutions (dopes) prepared above were co-cast on a mirror-finished stainless steel support through a casting die. The thicknesses of the outer and inner layers at each position in the width direction were adjusted in the same manner as the cellulose acylate laminate film.

Next, the dopes cast on the band were dried by a hot air at 100 degrees Celsius till an amount of the residual solvent was reduced to 22% to form a web, and then the web was taken out from the band and further dried under a hot air at 140 degrees Celsius, followed by winding up.

Subsequently, the obtained film was subjected to a transversal stretching treatment at a stretching ratio of 7% under an atmosphere of 180 degrees Celsius, followed by winding up to obtain a norbornene-base polymer laminate film.

The results obtained by measuring the optical properties (Re and Rth) and the outer layer film thickness at each position in the width direction by the foregoing methods are shown in the table below. Incidentally, Re in the table is expressed while designating the orthogonal direction to the casting direction as "plus".

2. Fabrication of Optically Compensatory Film:

(1) Surface Treatment of Laminate Film:

Each of the above-obtained cellulose acylate laminate films was allowed to pass through a dielectric heating roll at a temperature of 60° C., and the film surface temperature was increased to 40° C. Thereafter, an alkali solution having a composition shown below was coated at a coverage of 14 mL/m² using a bar coater and stayed for 10 seconds under a steam type far-infrared ray heater (manufactured by Noritake Co., Limited) heated at 110° C., and pure water was then similarly coated at a coverage of 3 mL/m² using a bar coater. At that time, the film temperature was 40° C. Subsequently, water washing by a fountain coater and water draining by an air knife were repeated three times, and the film was stayed for drying in a dry zone at 70° C. for 10 seconds.

| Composition of alkali solution for saponification treatment | |
|---|---|
| Potassium hydroxide: | 4.7 parts by mass |
| Water: | 15.8 parts by mass |

| Composition of alkali solution for saponification treatment | |
|---|---|
| Isopropanol: | 63.7 parts by mass |
| Propylene glycol: | 14.8 parts by mass |
| Surfactant ($C_{16}H_{33}O(CH_2CH_2O)_{10}H$): | 1.0 part by mass |

Each of the above-obtained norbornene-base polymer laminate films was subjected to a glow discharge treatment between upper and lower electrodes (applied with a 4200V electric pressure of 300 Hz high frequency) formed of brass under an atmosphere of argon gas for 20 seconds while being conveyed.

(2) Formation of Aligned Film:

On the treated surface of the laminate film subjected to the surface treatment, an aligned film-forming coating solution having a composition shown below was coated at a coverage of 24 mL/m² using a #14 wire bar coater and then dried with a hot air at 100° C. for 120 seconds. A thickness of the aligned film was 0.6 μm. Subsequently, the formed aligned film was subjected to a rubbing treatment in the 0°-direction using a rubbing roller having a width of 2,000 mm at a rotation rate of 400 rpm of the rubbing roller while defining the longitudinal direction (conveyance direction) of the film as 0°. On that occasion, a conveyance speed was 40 m/min. Subsequently, the rubbing treated surface was subjected to ultrasonic dust removal.

| Composition of aligned film-forming coating solution | |
|---|---|
| Modified polyvinyl alcohol shown below: | 23.4 parts by mass |
| Water: | 732.0 parts by mass |
| Methanol: | 166.3 parts by mass |
| Isopropyl alcohol: | 77.7 parts by mass |
| IRGACURE 2959 (manufactured by BASF AG): | 0.6 part by mass |

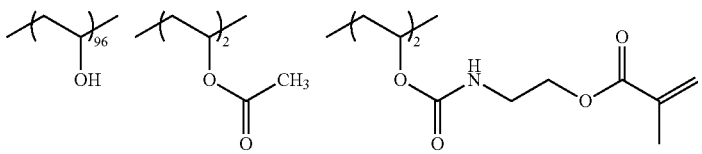

(3) Formation of Optically Anisotropic Layer:

On the rubbing treated surface of the aligned film after the dust removal, a coating solution for optically anisotropic layer having a composition shown below was coated using a #2.6 wire bar coater. Thereafter, the film was heated for 90 seconds within a dry zone at 70° C., thereby aligning the discotic liquid crystal compound. Thereafter, the film was irradiated with ultraviolet rays with a luminous intensity of 500 mW/cm² for 4 seconds by an ultraviolet ray irradiation apparatus (ultraviolet ray lamp, output: 160 W/cm, emission length: 1.6 m) in a state in which the film surface temperature was 100° C., to allow a crosslinking reaction to proceed, thereby immobilizing the liquid crystal compound in that alignment. Thereafter, the film was allowed to stand for cooling to room temperature and wound up in a cylindrical form, thereby obtaining an optically compensatory film in a roll form.

With respect to the obtained optically compensatory film, the results of luminescent spots evaluated by the foregoing evaluation method are shown in the table below.

| Composition of optically anisotropic layer-forming coating solution | |
|---|---|
| Methyl ethyl ketone: | 345.0 parts by mass |
| Liquid crystalline compound shown below: | 100.0 parts by mass |
| Alignment controlling agent 1 having a structure shown below: | 0.8 part by mass |
| Alignment controlling agent 2 having a structure shown below: | 1.0 part by mass |
| IRGACURE 2907 (manufactured by BASF AG): | 1.5 parts by mass |
| KAYAKURE DETX (manufactured by Nippon Kayaku Co., Ltd.): | 0.5 part by mass |

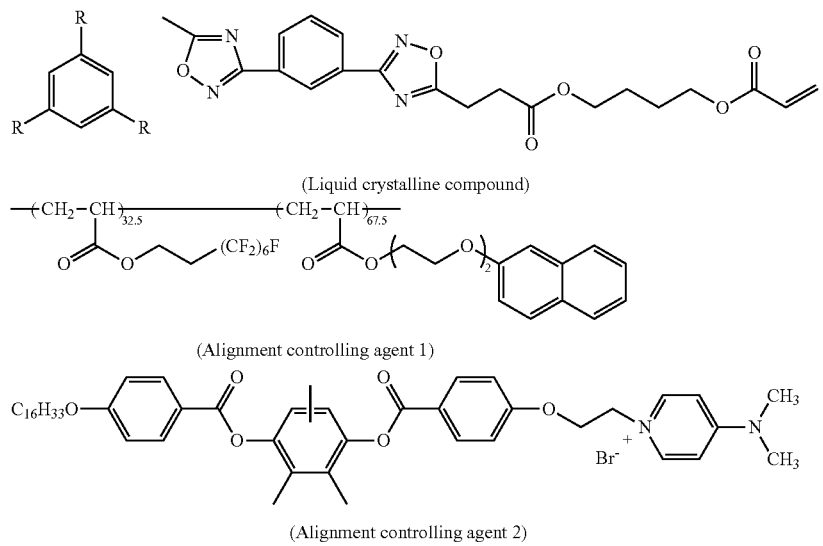

3. Fabrication of Liquid Crystal Display Device:

(1) Fabrication of Polarizing Plate:

A polyvinyl alcohol (PVA) film having a thickness of 80 μm was dyed by dipping in an iodine aqueous solution having an iodine concentration of 0.05% by mass at 30° C. for 60 seconds, subsequently longitudinally stretched 5 times the original length while dipping in a boric acid aqueous solution having a boric acid concentration of 4% by mass for 60 seconds, and then dried at 50° C. for 4 minutes to obtain a polarizing film having a thickness of 20 μm.

Each of the fabricated optically compensatory films was dipped in 1.5 moles/L of a sodium hydroxide aqueous solution at 55° C., and the sodium hydroxide was then thoroughly washed away with water. Thereafter, the resulting film was dipped in 0.005 moles/liter of a dilute sulfuric acid aqueous solution at 35° C. for one minute and then dipped in water, thereby thoroughly washing away the dilute sulfuric acid aqueous solution. Finally, the sample was thoroughly dried at 120° C.

Each of the thus saponified optically compensatory films and a commercially available cellulose acetate film which had been similarly subjected to a saponification treatment were combined and stuck so as to interpose the foregoing polarizing film therebetween by using a polyvinyl alcohol-based adhesive, thereby obtaining a polarizing plate. Here, disposition was performed such that the optically anisotropic layer of the optically compensatory film was located outside. Also, FUJITAC TF80UL (manufactured by Fujifilm Corporation) was used as the commercially available cellulose acetate film. At that time, since the polarizing film and the protective films on the both sides of the polarizing film were fabricated in a rolled state, the respective rolled films were parallel in the longitudinal direction and were continuously stuck. Accordingly, the roll longitudinal direction (casting direction of the cellulose acylate laminate film) and the absorption axis of the polarizing film became parallel to each other.

In order to stick the polarizing plate in a rolled state as obtained above to a liquid crystal display device, the polarizing plate was punched out in the same size as that of the liquid crystal display device. On that occasion, the polarizing plate was punched out such that a position of 40 mm from the end part of the optically compensatory film fell within the display range.

Also, a polarizing plate for a VA mode was fabricated in the same manner, except that in the fabrication of the polarizing plate, a cellulose acylate laminate film in which the optically anisotropic layer was not formed was used in place of the optically compensatory film.

(2) Fabrication of Liquid Crystal Display Device of TN Mode:

A pair of polarizing plates provided in a liquid crystal display device using a TN mode liquid crystal cell (AL2216W, manufactured by Acer Japan) were stripped off, and instead, every one sheet of the above-fabricated polarizing plates was stuck on each of the observer side and the backlight side via a pressure-sensitive adhesive such that the optically compensatory film was located on the liquid crystal cell side, namely the optically anisotropic layer was located most closely to the liquid crystal cell side. At that time, the transmission axis of the polarizing plate on the observer side and the transmission axis of the polarizing plate on the backlight side were disposed orthogonal to each other.

(3) Fabrication of Liquid Crystal Display Device of VA Mode:

A pair of polarizing plates provided in a liquid crystal display device using a VA mode liquid crystal cell (LC-46LX1, manufactured by Sharp Corporation) were stripped off, and instead, every one sheet of the above-fabricated polarizing plates for a VA mode was stuck on each of the observer side and the backlight side via a pressure-sensitive adhesive such that the cellulose acylate laminate film was located on the liquid crystal cell side. At that time, the transmission axis of the polarizing plate on the observer side and the transmission axis of the polarizing plate on the backlight side were disposed orthogonal to each other.

With respect to the obtained liquid crystal display devices, the results of the position dependency of display properties evaluated by the foregoing evaluation method are shown in the table below. An additional amount of each of the plasticizers and the ultraviolet ray absorbers is a ratio (parts by mass) with respect to 100 parts by mass of the polymer material.

TABLE 2

| | | | | Ex. 1 | Ex. 2 | Ex. 3 | Ex. 4 | Ex. 5 | Ex. 6 | Ex. 7 | Ex. 8 |
|---|---|---|---|---|---|---|---|---|---|---|---|
| Layer configuration | Total film Thickness (μm) | | Center | 80 | 80 | 80 | 83 | 80 | 80 | 80 | 80 |
| | | | End part | 83 | 83 | 88 | 80 | 83 | 83 | 83 | 83 |
| | Inner layer | Film thickness (μm) | Center | 74.2 | 75 | 78.5 | 75 | 75 | 75 | 75 | 76 |
| | | | End part | 76.6 | 73 | 76 | 73 | 73 | 73 | 73 | 72 |
| | | Cellulose acylate species | | TAC | TAC | TAC | TAC | CAP | DAC | TAC | TAC |
| | | Plasticizer | Kind | — | Oligomer A | Oligomer A | Oligomer A | Oligomer A | Oligomer A | Oligomer A | Oligomer A |
| | | | Addition amount | — | 10 | 10 | 10 | 10 | 10 | 15 | 10 |
| | | UV agent | Kind | — | Mixture B | Mixture B | Mixture B | Mixture B | Mixture B | — | Mixture B |
| | | | Addition amount | — | 4 | 4 | 4 | 4 | 4 | — | 3.5 |
| | | Solid concentration | | 23.5 | 23.5 | 23.5 | 23.5 | 23.5 | 23.5 | 23.5 | 23.5 |
| | Outer layer A | Film thickness (μm) | Center | 2.9 | 5 | 1.5 | 4 | 2.5 | 2.5 | 2.5 | 2 |
| | | | End part | 3.2 | 10 | 12 | 3.5 | 5 | 5 | 5 | 5.5 |
| | | Cellulose acylate species | | TAC | TAC | TAC | TAC | CAP | TAC | TAC | TAC |
| | | Plasticizer | Kind | — | Oligomer A | Oligomer A | Oligomer A | Oligomer A | Oligomer A | Oligomer A | Oligomer A |
| | | | Addition amount | — | 4 | 4 | 4 | 4 | 4 | 6 | 4 |
| | | UV agent | Kind | — | — | — | — | — | — | — | Mixture B |
| | | | Addition amount | — | — | — | — | — | — | — | 2 |
| | | Solid concentration | | 20 | 20 | 20 | 20 | 20 | 20 | 20 | 20 |
| | Outer layer B | Film thickness (μm) | Center | 2.9 | — | 1.5 | 4 | 2.5 | 2.5 | 2.5 | 2 |
| | | | End part | 3.2 | — | 12 | 3.5 | 5 | 5 | 5 | 5.5 |
| | | Cellulose acylate species | | TAC | — | TAC | TAC | CAP | TAC | TAC | TAC |
| | | Plasticizer | Kind | — | — | Oligomer A | Oligomer A | Oligomer A | Oligomer A | Oligomer A | Oligomer A |
| | | | Addition amount | — | — | 4 | 4 | 4 | 4 | 6 | 4 |
| | | UV agent | Kind | — | — | — | — | — | — | — | Mixture B |
| | | | Addition amount | — | — | — | — | — | — | — | 2 |
| | | Solid concentration | | 20 | — | 20 | 20 | 20 | 20 | 20 | 20 |
| Alignment direction *1 | | | | TD | TD | TD | TD | TD | TD | TD | TD |
| Optically anisotropic layer (DLC layer) | | | | Yes | Yes | Yes | Yes | Yes | Yes | Yes | Yes |
| Mode of LCD | | | | TN | TN | TN | TN | TN | TN | TN | TN |
| Performance | Re | | Center (nm) | 5 | 10 | 16 | 10 | 10 | 30 | 10 | 10 |
| | | | End part (nm) | 6 | 10 | 16 | 10 | 10 | 30 | 10 | 10 |
| | | | ΔRe (nm) | 1 | 0 | 0 | 0 | 0 | 0 | 0 | 0 |
| | Rth | | Center (nm) | 60 | 135 | 150 | 135 | 135 | 180 | 85 | 135 |
| | | | End part (nm) | 62 | 135 | 150 | 135 | 135 | 180 | 85 | 135 |
| | | | ΔRth (nm) | 2 | 0 | 0 | 0 | 0 | 0 | 0 | 0 |
| | Luminescent spot | | | A | A | A | C | A | A | A | A |
| | Position dependency of display properties | | | A | A | A | A | A | A | A | A |

*1: Alignment direction of the cellulose acylate molecule in the film

TABLE 3

| | | | | Ex. 9 | Ex. 10 | Ex. 11 | Ex. 12 | Ex. 13 | Ex. 14 | Ex. 15 |
|---|---|---|---|---|---|---|---|---|---|---|
| Layer configuration | Total film thickness (μm) | | Center | 80 | 80 | 80 | 80 | 60 | 40 | 80 |
| | | | End part | 83 | 83 | 83 | 83 | 63 | 43 | 83 |
| | Inner layer | Film thickness (μm) | Center | 74.4 | 74 | 74 | 75 | 55 | 36 | 75 |
| | | | End part | 75.6 | 76.4 | 75 | 74 | 53 | 33 | 73 |
| | | Cellulose acylate species | | TAC | TAC | TAC | TAC | TAC | TAC | TAC |
| | | Plasticizer | Kind | Oligomer A | Oligomer A | Oligomer A | Oligomer A | Oligomer A | Oligomer A | Oligomer A |
| | | | Addition | 10 | 10 | 10 | 7 | 7 | 7 | 15 |

TABLE 3-continued

|  |  |  |  | Ex. 9 | Ex. 10 | Ex. 11 | Ex. 12 | Ex. 13 | Ex. 14 | Ex. 15 |
|---|---|---|---|---|---|---|---|---|---|---|
|  |  | UV agent | Kind | Mixture B | Mixture B | Mixture B | Mixture B | Mixture B | Mixture B | Mixture B |
|  |  |  | Addition amount | 4 | 4 | 4 | 3.5 | 3.5 | 3.5 | 3 |
|  |  | Solid concentration |  | 23.5 | 23.5 | 23.5 | 23.5 | 23.5 | 23.5 | 23.5 |
|  | Outer layer A | Film thickness (μm) | Center | 2.8 | 3 | 3 | 2.5 | 2.5 | 2 | 2.5 |
|  |  |  | End part | 3.7 | 3.3 | 4 | 4.5 | 5 | 5 | 5 |
|  |  | Cellulose acylate species |  | TAC | TAC | TAC | TAC | TAC | TAC | TAC |
|  |  | Plasticizer | Kind | Oligomer A | Oligomer A | Oligomer A | Oligomer A | Oligomer A | Oligomer A | Oligomer A |
|  |  |  | Addition amount | 4 | 4 | 4 | 4 | 4 | 4 | 4 |
|  |  | UV agent | Kind | — | — | — | Mixture B | Mixture B | Mixture B | Mixture B |
|  |  |  | Addition amount | — | — | — | 2 | 2 | 2 | 1.5 |
|  |  | Solid concentration |  | 20 | 20 | 20 | 20 | 20 | 20 | 20 |
|  | Outer layer B | Film thickness (μm) | Center | 2.8 | 3 | 3 | 2.5 | 2.5 | 2 | 2.5 |
|  |  |  | End part | 3.7 | 3.3 | 4 | 4.5 | 5 | 5 | 5 |
|  |  | Cellulose acylate species |  | TAC | TAC | TAC | TAC | TAC | TAC | TAC |
|  |  | Plasticizer | Kind | Oligomer A | Oligomer A | Oligomer A | Oligomer A | Oligomer A | Oligomer A | Oligomer A |
|  |  |  | Addition amount | 4 | 4 | 4 | 4 | 4 | 4 | 4 |
|  |  | UV agent | Kind | — | — | — | Mixture B | Mixture B | Mixture B | Mixture B |
|  |  |  | Addition amount | — | — | — | 2 | 2 | 2 | 1.5 |
|  |  | Solid concentration |  | 20 | 20 | 20 | 20 | 20 | 20 | 20 |
| Alignment direction *1 |  |  |  | MD | TD | TD | TD | TD | TD | TD |
| Optically anisotropic layer (DLC layer) |  |  |  | Yes | Yes | Yes | Yes | Yes | Yes | No |
| Mode of LCD |  |  |  | TN | TN | TN | TN | TN | TN | VA |
| Performance | Re |  | Center (nm) | −7 | 10 | 10 | 10 | 10 | 10 | 50 |
|  |  |  | End part (nm) | −7 | 18 | 14 | 10 | 10 | 10 | 50 |
|  |  |  | ΔRe (nm) | 0 | 8 | 4 | 0 | 0 | 0 | 0 |
|  | Rth |  | Center (nm) | 135 | 135 | 135 | 135 | 135 | 135 | 120 |
|  |  |  | End part (nm) | 135 | 147 | 143 | 135 | 135 | 135 | 120 |
|  |  |  | ΔRth (nm) | 0 | 12 | 8 | 0 | 0 | 0 | 0 |
|  | Luminescent spot |  |  | A | A | A | A | A | A | A |
|  | Position dependency of display properties |  |  | A | B | B | A | A | A | A |

*1: Alignment direction of the cellulose acylate molecule in the film

TABLE 4

|  |  |  |  | Ex. 16 | Ex. 17 | Ex. 18 | Ex. 19 | Ex. 20 | Ex. 21 | Ex. 22 |
|---|---|---|---|---|---|---|---|---|---|---|
| Layer configuration | Total film thickness (μm) |  | Center | 80 | 80 | 80 | 80 | 80 | 80 | 80 |
|  |  |  | End part | 83 | 83 | 83 | 83 | 83 | 83 | 83 |
|  | Inner layer | Film thickness (μm) | Center | 75 | 75 | 75 | 75 | 75 | 75 | 75 |
|  |  |  | End part | 73 | 73 | 73 | 73 | 73 | 73 | 73 |
|  |  | Cellulose acylate species |  | TAC | TAC | TAC | TAC | TAC | TAC | TAC |
|  |  | Plasticizer | Kind | Oligomer A | Oligomer A | Oligomer A + B | Oligomer A + C | Oligomer A + D | Oligomer A + B + C | Oligomer A + B + D |
|  |  |  | Addition amount | 13 | 13 | 6 + 6 | 6 + 6 | 6 + 6 | 6 + 3 + 3 | 6 + 3 + 3 |
|  |  | UV agent | Kind | Mixture B | Mixture C | Mixture B | Mixture B | Mixture B | Mixture B | Mixture B |
|  |  |  | Addition amount | 1.3 | 1.3 | 1.8 | 1.8 | 1.8 | 1.8 | 1.8 |
|  |  | Solid concentration |  | 23.5 | 23.5 | 23.5 | 23.5 | 23.5 | 23.5 | 23.5 |
|  | Outer layer A | Film thickness (μm) | Center | 2.5 | 2.5 | 2.5 | 2.5 | 2.5 | 2.5 | 2.5 |
|  |  |  | End part | 4.5 | 4.5 | 4.5 | 4.5 | 4.5 | 4.5 | 4.5 |
|  |  | Cellulose acylate species |  | TAC | TAC | TAC | TAC | TAC | TAC | TAC |
|  |  | Plasticizer | Kind | Oligomer A | Oligomer A | Oligomer A + B | Oligomer A + C | Oligomer A + D | Oligomer A + B + C | Oligomer A + B + D |
|  |  |  | Addition amount | 6.5 | 6.5 | 3 + 3 | 3 + 3 | 3 + 3 | 3 + 1.5 + 1.5 | 3 + 1.5 + 1.5 |
|  |  | UV agent | Kind | Mixture B | Mixture C | Mixture B | Mixture B | Mixture B | Mixture B | Mixture B |
|  |  |  | Addition amount | 0.7 | 0.7 | 0.9 | 0.9 | 0.9 | 0.9 | 0.9 |

TABLE 4-continued

|  |  |  |  | Ex. 16 | Ex. 17 | Ex. 18 | Ex. 19 | Ex. 20 | Ex. 21 | Ex. 22 |
|---|---|---|---|---|---|---|---|---|---|---|
|  | Outer layer B | Solid concentration |  | 20 | 20 | 20 | 20 | 20 | 20 | 20 |
|  |  | Film thickness (μm) | Center | 2.5 | 2.5 | 2.5 | 2.5 | 2.5 | 2.5 | 2.5 |
|  |  |  | End part | 4.5 | 4.5 | 4.5 | 4.5 | 4.5 | 4.5 | 4.5 |
|  |  | Cellulose acylate species |  | TAC | TAC | TAC | TAC | TAC | TAC | TAC |
|  |  | Plasticizer | Kind | Oligomer A | Oligomer A | Oligomer A + B | Oligomer A + C | Oligomer A + D | Oligomer A + B + C | Oligomer A + B + D |
|  |  |  | Addition amount | 6.5 | 6.5 | 3 + 3 | 3 + 3 | 3 + 3 | 3 + 1.5 + 1.5 | 3 + 1.5 + 1.5 |
|  |  | UV agent | Kind | Mixture B | Mixture C | Mixture B | Mixture B | Mixture B | Mixture B | Mixture B |
|  |  |  | Addition amount | 0.7 | 0.7 | 0.9 | 0.9 | 0.9 | 0.9 | 0.9 |
|  |  | Solid concentration |  | 20 | 20 | 20 | 20 | 20 | 20 | 20 |
| Alignment direction *1 |  |  |  | TD | TD | TD | TD | TD | TD | TD |
| Optically anisotropic layer (DLC layer) |  |  |  | Yes | Yes | Yes | Yes | Yes | Yes | Yes |
| Mode of LCD |  |  |  | TN | TN | TN | TN | TN | TN | TN |
| Performance | Re |  | Center (nm) | 9 | 8 | 10 | 10 | 10 | 8 | 10 |
|  |  |  | End part (nm) | 10 | 10 | 10 | 10 | 10 | 10 | 10 |
|  |  |  | ΔRe (nm) | 1 | 2 | 0 | 0 | 0 | 2 | 0 |
|  | Rth |  | Center (nm) | 103 | 105 | 100 | 100 | 100 | 104 | 100 |
|  |  |  | End part (nm) | 104 | 105 | 100 | 100 | 100 | 106 | 100 |
|  |  |  | ΔRth (nm) | 1 | 0 | 0 | 0 | 0 | 2 | 0 |
|  | Luminescent spot |  |  | A | A | A | A | A | A | A |
|  | Position dependency of display properties |  |  | A | A | A | A | A | A | A |

*1: Alignment direction of the cellulose acylate molecule in the film

TABLE 5

|  |  |  |  | Ex. 23 | Ex. 24 | Ex. 25 | Ex. 26 | Ex. 27 | Ex. 28 | Ex. 29 |
|---|---|---|---|---|---|---|---|---|---|---|
| Layer configuration | Total film thickness (μm) |  | Center | 80 | 80 | 80 | 80 | 80 | 80 | 80 |
|  |  |  | End part | 83 | 83 | 83 | 83 | 83 | 83 | 83 |
|  | Inner layer | Film thickness (μm) | Center | 75 | 75 | 75 | 75 | 75 | 75 | 75 |
|  |  |  | End part | 73 | 73 | 73 | 73 | 73 | 73 | 73 |
|  |  | Cellulose acylate species |  | TAC | TAC | TAC | TAC | TAC | TAC | TAC |
|  |  | Plasticizer | Kind | Oligomer A + B + C + D | Oligomer A + B | Oligomer A + C | Oligomer A + D | Oligomer A + B + D | Oligomer A + B | Oligomer A + B |
|  |  |  | Addition amount | 5 + 3 + 3 + 3 | 6 + 6 | 6 + 6 | 6 + 6 | 6 + 3 + 3 | 11 + 1 | 8 + 4 |
|  |  | UV agent | Kind | Mixture B | Mixture C | Mixture C | Mixture C | Mixture C | Mixture C | Mixture C |
|  |  |  | Addition amount | 1.8 | 2 | 2 | 2 | 2 | 2 | 2 |
|  |  | Solid concentration |  | 23.5 | 23.5 | 23.5 | 23.5 | 23.5 | 23.5 | 23.5 |
|  | Outer layer A | Film thickness (μm) | Center | 2.5 | 2.5 | 2.5 | 2.5 | 2.5 | 2.5 | 2.5 |
|  |  |  | End part | 4.5 | 4.5 | 4.5 | 4.5 | 4.5 | 4.5 | 4.5 |
|  |  | Cellulose acylate species |  | TAC | TAC | TAC | TAC | TAC | TAC | TAC |
|  |  | Plasticizer | Kind | Oligomer A + B + C + D | Oligomer A + B | Oligomer A + C | Oligomer A + D | Oligomer A + B + D | Oligomer A + B | Oligomer A + B |
|  |  |  | Addition amount | 2.5 + 1.5 + 1.5 + 1.5 | 3 + 3 | 3 + 3 | 3 + 3 | 3 + 1.5 + 1.5 | 5.5 + 0.5 | 4 + 2 |
|  |  | UV agent | Kind | Mixture B | Mixture C | Mixture C | Mixture C | Mixture C | Mixture C | Mixture C |
|  |  |  | Addition amount | 0.9 | 1 | 1 | 1 | 1 | 1 | 1 |
|  |  | Solid concentration |  | 20 | 20 | 20 | 20 | 20 | 20 | 21 |
|  | Outer layer B | Film thickness (μm) | Center | 2.5 | 2.5 | 2.5 | 2.5 | 2.5 | 2.5 | 2.5 |
|  |  |  | End part | 4.5 | 4.5 | 4.5 | 4.5 | 4.5 | 4.5 | 4.5 |
|  |  | Cellulose acylate species |  | TAC | TAC | TAC | TAC | TAC | TAC | TAC |
|  |  | Plasticizer | Kind | Oligomer A + B + C + D | Oligomer A + B | Oligomer A + C | Oligomer A + D | Oligomer A + B + D | Oligomer A + B | Oligomer A + B |
|  |  |  | Addition amount | 2.5 + 1.5 + 1.5 + 1.5 | 3 + 3 | 3 + 3 | 3 + 3 | 3 + 1.5 + 1.5 | 5.5 + 0.5 | 4 + 2 |
|  |  | UV agent | Kind | Mixture B | Mixture C | Mixture C | Mixture C | Mixture C | Mixture C | Mixture C |
|  |  |  | Addition amount | 0.9 | 1 | 1 | 1 | 1 | 1 | 1 |
|  |  | Solid concentration |  | 20 | 20 | 20 | 20 | 20 | 20 | 21 |
| Alignment direction *1 |  |  |  | TD | TD | TD | TD | TD | TD | TD |
| Optically anisotropic layer (DLC layer) |  |  |  | Yes | Yes | Yes | Yes | Yes | Yes | Yes |
| Mode of LCD |  |  |  | TN | TN | TN | TN | TN | TN | TN |
| Performance | Re |  | Center (nm) | 10 | 10 | 10 | 10 | 8 | 15 | 13 |
|  |  |  | End part (nm) | 10 | 10 | 10 | 10 | 10 | 16 | 13 |
|  |  |  | ΔRe (nm) | 0 | 0 | 0 | 0 | 2 | 1 | 0 |

TABLE 5-continued

|  |  |  | Ex. 23 | Ex. 24 | Ex. 25 | Ex. 26 | Ex. 27 | Ex. 28 | Ex. 29 |
|---|---|---|---|---|---|---|---|---|---|
|  | Rth | Center (nm) | 97 | 100 | 100 | 100 | 98 | 120 | 101 |
|  |  | End part (nm) | 99 | 100 | 100 | 100 | 100 | 122 | 101 |
|  |  | ΔRth (nm) | 2 | 0 | 0 | 0 | 2 | 2 | 0 |
|  | Luminescent spot |  | A | A | A | A | A | A | A |
|  | Position dependency of display properties |  | A | A | A | A | A | A | A |

*1: Alignment direction of the cellulose acylate molecule in the film

TABLE 6

|  |  |  |  | Ex. 30 | Ex. 31 | Ex. 32 | Ex. 33 | Ex. 34 | Ex. 35 |
|---|---|---|---|---|---|---|---|---|---|
| Layer configuration | Total film thickness (μm) |  | Center | 80 | 80 | 80 | 80 | 80 | 80 |
|  |  |  | End part | 83 | 83 | 83 | 83 | 83 | 83 |
|  | Inner layer | Film thickness (μm) | Center | 75 | 75 | 75 | 75 | 75 | 75 |
|  |  |  | End part | 73 | 73 | 73 | 73 | 73 | 73 |
|  |  | Cellulose acylate species |  | TAC | TAC | TAC | TAC | TAC | TAC |
|  |  | Plasticizer | Kind | Oligomer A + B | Oligomer A + C | Oligomer A + C | Oligomer A + C | Oligomer A + C | Oligomer A + C |
|  |  |  | Addition amount | 1 + 11 | 11 + 1 | 8 + 4 | 1 + 11 | 7 + 7 | 3.5 + 3.5 |
|  |  | UV agent | Kind | Mixture C | Mixture C | Mixture C | Mixture C | Mixture C | Mixture C |
|  |  |  | Addition amount | 2 | 2 | 2 | 2 | 2 | 2 |
|  |  | Solid concentration |  | 23.5 | 23.5 | 23.5 | 23.5 | 23.5 | 23.5 |
|  | Outer layer A | Film thickness (μm) | Center | 2.5 | 2.5 | 2.5 | 2.5 | 2.5 | 2.5 |
|  |  |  | End part | 4.5 | 4.5 | 4.5 | 4.5 | 4.5 | 4.5 |
|  |  | Cellulose acylate species |  | TAC | TAC | TAC | TAC | TAC | TAC |
|  |  | Plasticizer | Kind | Oligomer A + B | Oligomer A + C | Oligomer A + C | Oligomer A + C | Oligomer A + C | Oligomer A + C |
|  |  |  | Addition amount | 0.5 + 5.5 | 5.5 + 0.5 | 4 + 2 | 0.5 + 5.5 | 3.5 + 3.5 | 1.8 + 1.8 |
|  |  | UV agent | Kind | Mixture C | Mixture C | Mixture C | Mixture C | Mixture C | Mixture C |
|  |  |  | Addition amount | 1 | 1 | 1 | 1 | 1 | 1 |
|  |  | Solid concentration |  | 20 | 20 | 20 | 20 | 20 | 20 |
|  | Outer layer B | Film thickness (μm) | Center | 2.5 | 2.5 | 2.5 | 2.5 | 2.5 | 2.5 |
|  |  |  | End part | 4.5 | 4.5 | 4.5 | 4.5 | 4.5 | 4.5 |
|  |  | Cellulose acylate species |  | TAC | TAC | TAC | TAC | TAC | TAC |
|  |  | Plasticizer | Kind | Oligomer A + B | Oligomer A + C | Oligomer A + C | Oligomer A + C | Oligomer A + C | Oligomer A + C |
|  |  |  | Addition amount | 0.5 + 5.5 | 5.5 + 0.5 | 4 + 2 | 0.5 + 5.5 | 3.5 + 3.5 | 1.8 + 1.8 |
|  |  | UV agent | Kind | Mixture C | Mixture C | Mixture C | Mixture C | Mixture C | Mixture C |
|  |  |  | Addition amount | 1 | 1 | 1 | 1 | 1 | 1 |
|  |  | Solid concentration |  | 20 | 20 | 20 | 20 | 20 | 20 |
| Alignment direction *1 |  |  |  | TD | TD | TD | TD | TD | TD |
| Optically anisotropic layer (DLC layer) |  |  |  | Yes | Yes | Yes | Yes | Yes | Yes |
| Mode of LCD |  |  |  | TN | TN | TN | TN | TN | TN |
| Performance | Re |  | Center (nm) | 7 | 16 | 12 | 7 | 12 | 6 |
|  |  |  | End part (nm) | 7 | 17 | 12 | 7 | 12 | 6 |
|  |  |  | ΔRe (nm) | 0 | 1 | 0 | 0 | 0 | 0 |
|  | Rth |  | Center (nm) | 90 | 125 | 100 | 87 | 102 | 80 |
|  |  |  | End part (nm) | 92 | 126 | 100 | 90 | 104 | 81 |
|  |  |  | ΔRth (nm) | 2 | 1 | 0 | 3 | 2 | 1 |
|  | Luminescent spot |  |  | A | A | A | A | A | A |
|  | Position dependency of display properties |  |  | A | A | A | A | A | A |

*1: Alignment direction of the cellulose acylate molecule in the film

TABLE 7

|  |  |  | Example 36 |
|---|---|---|---|
| L Layer configuration | Total film thickness (μm) | Center | 80 |
|  |  | End part | 83 |
|  | Inner layer | Film thickness (μm) | Center | 75 |

TABLE 7-continued

|  |  |  |  | Example 36 |
|---|---|---|---|---|
|  |  |  | End part | 74 |
|  |  | Polymer species |  | Norbornene-base polymer |
|  |  | Plasticizer | Kind | Oligomer A |
|  |  |  | Addition amount | 7 |
|  |  | UV agent | Kind | Mixture B |
|  |  |  | Addition amount | 3.5 |
|  |  | Solid concentration |  | 23.5 |
|  | Outer layer A | Film thickness (μm) | Center | 2.5 |
|  |  |  | End part | 4.5 |
|  |  | Polymer species |  | Norbornene-base polymer |
|  |  | Plasticizer | Kind | Oligomer A |
|  |  |  | Addition amount | 4 |
|  |  | UV agent | Kind | Mixture B |
|  |  |  | Addition amount | 2 |
|  |  | Solid concentration |  | 20 |
|  | Outer layer B | Film thickness (μm) | Center | 2.5 |
|  |  |  | End part | 4.5 |
|  |  | Polymer species |  | Norbornene-base polymer |
|  |  | Plasticizer | Kind | Oligomer A |
|  |  |  | Addition amount | 4 |
|  |  | UV agent | Kind | Mixture B |
|  |  |  | Addition amount | 2 |
|  |  | Solid concentration |  | 20 |
|  | Alignment direction *2 |  |  | TD |
|  | Optically anisotropic layer (DLC layer) |  |  | Yes |
|  | Mode of LCD |  |  | TN |
| Performance | Re |  | Center (nm) | 7 |
|  |  |  | End part (nm) | 7 |
|  |  |  | ΔRe (nm) | 0 |
|  | Rth |  | Center (nm) | 150 |
|  |  |  | End part (nm) | 150 |
|  |  |  | ΔRth (nm) | 0 |
|  | Luminescent spot |  |  | A |
|  | Position dependency of display properties |  |  | A |

*2: Alignment direction of the norbornene-base polymer molecule in the film

TABLE 8

|  |  |  |  | Comparative Ex. 1 | Comparative Ex. 2 |
|---|---|---|---|---|---|
| Layer configuration | Total film thickness (μm) |  | Center | 80 | 80 |
|  |  |  | End part | 83 | 80 |
|  | Inner layer | Film thickness (μm) | Center | 74 | 74 |
|  |  |  | End part | 77 | 74 |
|  |  | Cellulose acylate species |  | TAC | TAC |
|  |  | Plasticizer | Kind | Oligomer A | Oligomer A |
|  |  |  | Addition amount | 10 | 10 |
|  |  | UV agent | Kind | Mixture B | Mixture B |
|  |  |  | Addition amount | 4 | 4 |
|  |  | Solid concentration |  | 23.5 | 23.5 |
|  | Outer layer A | Film thickness (μm) | Center | 3 | 3 |
|  |  |  | End part | 3 | 3 |
|  |  | Cellulose acylate species |  | TAC | TAC |
|  |  | Plasticizer | Kind | Oligomer A | Oligomer A |
|  |  |  | Addition amount | 4 | 4 |
|  |  | UV agent | Kind | — | — |
|  |  |  | Addition amount | — | — |
|  |  | Solid concentration |  | 20 | 20 |
|  | Outer layer B | Film thickness (μm) | Center | 3 | 3 |
|  |  |  | End part | 3 | 3 |
|  |  | Cellulose acylate species |  | TAC | TAC |
|  |  | Plasticizer | Kind | Oligomer A | Oligomer A |
|  |  |  | Addition amount | 4 | 4 |
|  |  | UV agent | Kind | — | — |
|  |  |  | Addition amount | — | — |
|  |  | Solid concentration |  | 20 | 20 |
|  | Alignment direction *1 |  |  | TD | TD |
|  | Optically anisotropic layer (DLC layer) |  |  | Yes | Yes |
|  | Mode of LCD |  |  | TN | TN |
| Performance | Re |  | Center (nm) | 10 | 10 |
|  |  |  | End part (nm) | 22 | 10 |
|  |  |  | ΔRe (nm) | 12 | 0 |
|  | Rth |  | Center (nm) | 135 | 135 |

TABLE 8-continued

|  | Comparative Ex. 1 | Comparative Ex. 2 |
| --- | --- | --- |
| End part (nm) | 152 | 135 |
| ΔRth (nm) | 17 | 0 |
| Luminescent spot | A | C |
| Position dependency of display properties | C | A |

*1: Alignment direction of the cellulose acylate molecule in the film

From the results shown in the foregoing tables, it can be understood that all of the laminate films of the Examples in which the thickness of the outer layer changes in the width direction, and the both end parts are thick are excellent in uniformity of the optical properties; and that the uniformity of the optical properties are reflected for a reduction of the position dependency of the display properties. Also, it can be understood that in view of the fact that the both end parts are thick, scratches due to tightness of winding are reduced, and even when an optically anisotropic layer is formed, a luminescent spot is not produced.

On the other hand, it can be understood that since the laminate film of Comparative Example 2 is uniform in the film thickness in the width direction, though the uniformity of the optical properties is high, scratches due to tightness of winding are produced; and that when an optically anisotropic layer is formed, a lot of luminescent spots are produced. It can be understood that in the laminate film of Comparative Example 1, the total thickness is distributed in the width direction, and the both end parts are thick, whereas the central part is thin; however, since the distribution in the total thickness is obtained by a change of the thickness of the inner layer in the width direction, the effect for unifying the optical properties is inferior to that in the Examples.

The invention claimed is:

1. A laminate film comprising:
an inner layer formed of a composition comprising a polymer material as a main Component; and
an outer layer formed of a composition comprising a polymer material as a main component and laminated on at least one surface of the inner layer,
wherein a film thickness of the outer layer differs depending upon a position in the width direction of the laminate film, and
wherein a variation in the width direction of at least one of retardation in plane Re and retardation along the thickness direction Rth is not more than 10 nm.

2. The laminate film according to claim 1, wherein a total film thickness expressed by a total sum of a film thickness of the inner layer and a film thickness of the outer layer differs depending upon a position in the width direction of the laminate film.

3. The laminate film according to claim 1, wherein the total thickness of both end parts in the width direction is thick, and the total thickness in a central part is thin.

4. The laminate film according to claim 1, wherein at least one of the inner layer and the outer layer comprises at least one additive.

5. The laminate film according to claim 4, wherein the at least one additive is an aromatic group-containing oligomer.

6. The laminate film according to claim 5, wherein the at least one additive is an ultraviolet ray absorber having an absorption maximum at from 250 to 400 nm.

7. The laminate film according to claim 1, wherein each of the inner layer and the outer layer comprises at least one additive, and the at least one additive in the inner layer and the at least one additive in the outer layer are different from each other in at least one of a kind and a concentration.

8. The laminate film according to claim 1, wherein the polymer material is a cellulose acylate.

9. The laminate film according to claim 1, wherein the polymer material is a norbornene base polymer.

10. The laminate film according to claim 1, wherein the laminate film is longitudinal, and a molecule of the polymer material is aligned in a direction orthogonal to the longitudinal direction.

11. An optically compensatory film comprising the laminate film according to claim 1 and an optically anisotropic layer formed of a composition comprising a polymerizable liquid crystal compound.

12. A polarizing plate comprising at least a polarizer and the laminate film according to claim 1 or an optically compensatory film according to claim 11.

13. A liquid crystal display device comprising at least the polarizing plate according to claim 12.

14. The liquid crystal display device according to claim 13, which is of a TN mode.

* * * * *